(12) United States Patent
Chung et al.

(10) Patent No.: US 10,664,010 B2
(45) Date of Patent: May 26, 2020

(54) ELECTRONIC DEVICE AND OPERATING METHOD THEREOF

(71) Applicant: Samsung Electronics Co., Ltd., Gyeonggi-do (KR)

(72) Inventors: Jae-Woong Chung, Gyeonggi-do (KR); Deok-Hee Jeong, Seoul (KR)

(73) Assignee: Samsung Electronics Co., Ltd (KR)

( * ) Notice: Subject to any disclaimer, the term of this patent is extended or adjusted under 35 U.S.C. 154(b) by 649 days.

(21) Appl. No.: 14/469,439

(22) Filed: Aug. 26, 2014

(65) Prior Publication Data
US 2015/0062097 A1 Mar. 5, 2015

(30) Foreign Application Priority Data
Aug. 28, 2013 (KR) .......................... 10-2013-0102739

(51) Int. Cl.
| | |
|---|---|
| *G06F 1/16* | (2006.01) |
| *G06F 3/0488* | (2013.01) |
| *H04N 5/232* | (2006.01) |
| *H04M 1/725* | (2006.01) |
| *G06F 3/0481* | (2013.01) |

(Continued)

(52) U.S. Cl.
CPC .......... *G06F 1/1626* (2013.01); *G06F 1/1677* (2013.01); *G06F 3/0481* (2013.01); *G06F 3/0482* (2013.01); *G06F 3/0487* (2013.01); *G06F 3/04883* (2013.01); *G06F 3/04886* (2013.01); *H04M 1/72519* (2013.01); *H04N 5/23293* (2013.01); *G06F 2200/1633* (2013.01); *G06F 2200/1634* (2013.01)

(58) Field of Classification Search
CPC .. G06F 1/1626; G06F 1/1677; G06F 3/04883; G06F 3/0481; G06F 3/0482; G06F 3/0487; G06F 3/04886; G06F 2200/1633; G06F 2200/1634; H04M 1/72519; H04N 5/23293

See application file for complete search history.

(56) References Cited

U.S. PATENT DOCUMENTS

| | | | | |
|---|---|---|---|---|
| 5,289,393 | A * | 2/1994 | Kaya ..................... | G06F 3/0489 708/112 |
| 6,389,124 | B1 * | 5/2002 | Schnarel ............. | H04M 1/2473 379/142.01 |

(Continued)

FOREIGN PATENT DOCUMENTS

| | | |
|---|---|---|
| KR | 1020110028148 | 3/2011 |
| KR | 1020120096723 | 8/2012 |

OTHER PUBLICATIONS

Google, "Why The S View Cover is Essential" (Galaxy S4 View Cover), (https://brucemoon.net/1198142290, IT/ Smart Phones, Jun. 21, 2013, 36 pages.

(Continued)

*Primary Examiner* — Sejoon Ahn
(74) *Attorney, Agent, or Firm* — The Farrell Law Firm, P.C.

(57) ABSTRACT

A method of operating an electronic device having an openable cover is provided. The method includes activating an application, detecting an opening/closing state of the cover, and transitioning between a plurality of display modes of the activated application in response to the opening/closing state of the cover.

19 Claims, 58 Drawing Sheets

(51) Int. Cl.
*G06F 3/0482* (2013.01)
*G06F 3/0487* (2013.01)

(56) References Cited

U.S. PATENT DOCUMENTS

| | | | | |
|---|---|---|---|---|
| 6,760,696 B1* | 7/2004 | Goldberg | G06F 1/1626 | 704/201 |
| 6,868,283 B1* | 3/2005 | Bonansea | G06F 3/0481 | 455/550.1 |
| 7,023,428 B2* | 4/2006 | Pihlaja | G06F 3/0488 | 345/157 |
| 7,028,264 B2* | 4/2006 | Santoro | G06F 3/0481 | 715/729 |
| 7,123,945 B2* | 10/2006 | Kokubo | H04M 1/72522 | 345/169 |
| 7,783,982 B1* | 8/2010 | Reynolds | G06F 3/04886 | 715/719 |
| 7,983,723 B2* | 7/2011 | Dunko | G06F 1/1616 | 455/575.1 |
| 8,031,184 B2* | 10/2011 | Kim | G06F 3/04886 | 345/173 |
| 8,205,211 B2* | 6/2012 | Kusuda | G06F 9/485 | 715/700 |
| 8,635,544 B2* | 1/2014 | Kim | G06F 3/0488 | 715/764 |
| 8,644,011 B2* | 2/2014 | Parkinson | B29C 33/485 | 224/191 |
| 8,707,175 B2* | 4/2014 | Lee | G06F 3/04817 | 715/702 |
| 8,774,869 B2* | 7/2014 | Park | G06F 3/0481 | 455/557 |
| 8,798,609 B2* | 8/2014 | Jeon | G06F 3/04817 | 379/88.11 |
| 8,917,221 B2* | 12/2014 | de Paz | G06F 1/1616 | 345/1.1 |
| 8,922,509 B2* | 12/2014 | Sato | G06F 1/1616 | 345/1.1 |
| 9,026,178 B2* | 5/2015 | Nii | H04M 1/0237 | 345/204 |
| 9,122,340 B2* | 9/2015 | Jung | G06F 3/0414 | |
| 9,152,985 B2* | 10/2015 | Wakabayashi | G06Q 10/101 | |
| 9,176,660 B2* | 11/2015 | Kang | G06F 3/0486 | |
| 9,288,388 B2* | 3/2016 | Son | H04N 5/23219 | |
| 9,294,596 B2* | 3/2016 | Kim | H04M 1/0266 | |
| 9,344,548 B2* | 5/2016 | Lee | G06F 3/04845 | |
| 9,357,118 B2* | 5/2016 | Moller | G06F 1/1686 | |
| 9,384,014 B2* | 7/2016 | Kim | G06F 9/4445 | |
| 9,395,833 B2* | 7/2016 | Lee | G06F 3/041 | |
| 9,398,133 B2* | 7/2016 | Jo | H04M 1/67 | |
| 9,477,370 B2* | 10/2016 | Sun | G06F 3/0482 | |
| 2002/0086702 A1 | 7/2002 | Lai et al. | | |
| 2004/0248621 A1* | 12/2004 | Schon | G06F 1/1616 | 455/566 |
| 2008/0129699 A1* | 6/2008 | Cho | H04M 1/0208 | 345/168 |
| 2008/0165144 A1* | 7/2008 | Forstall | G06F 1/1626 | 345/173 |
| 2008/0174570 A1* | 7/2008 | Jobs | G06F 3/0488 | 345/173 |
| 2008/0214239 A1* | 9/2008 | Hashimoto | G06F 3/0481 | 455/557 |
| 2009/0160733 A1* | 6/2009 | Chiba | G06F 3/1423 | 345/1.3 |
| 2010/0298033 A1* | 11/2010 | Lee | G06F 1/1616 | 455/566 |
| 2011/0065474 A1 | 3/2011 | Won et al. | | |
| 2011/0248983 A1* | 10/2011 | Kim | G03B 21/14 | 345/212 |
| 2011/0292009 A1* | 12/2011 | Wang | G06F 1/1601 | 345/207 |
| 2011/0294542 A1 | 12/2011 | Ray et al. | | |
| 2012/0001829 A1* | 1/2012 | Anttila | G06F 3/1431 | 345/1.1 |
| 2012/0129496 A1* | 5/2012 | Park | G06F 3/0488 | 455/411 |
| 2012/0212430 A1 | 8/2012 | Jung et al. | | |
| 2012/0274540 A1* | 11/2012 | Inami | G06F 3/1438 | 345/1.1 |
| 2013/0079062 A1* | 3/2013 | Sirpal | G06F 3/1438 | 455/566 |
| 2013/0157631 A1* | 6/2013 | Wang | H04M 1/6066 | 455/415 |
| 2013/0182138 A1* | 7/2013 | Cho | G06F 9/4445 | 348/211.3 |
| 2013/0229324 A1* | 9/2013 | Zhang | G09G 5/00 | 345/1.3 |
| 2013/0241802 A1* | 9/2013 | Honda | H04M 1/72561 | 345/1.3 |
| 2013/0282637 A1* | 10/2013 | Costigan | G06N 5/022 | 706/46 |
| 2014/0128131 A1* | 5/2014 | Sin | H04M 1/185 | 455/575.8 |
| 2014/0247229 A1* | 9/2014 | Cho | G06F 1/1616 | 345/173 |
| 2015/0062097 A1* | 3/2015 | Chung | G06F 1/1626 | 345/184 |
| 2016/0218765 A1* | 7/2016 | Meyer | H04B 1/3888 | |

OTHER PUBLICATIONS

Korean Office Action dated Sep. 30, 2019 issued in counterpart application No. 10-2013-0102739, 25 pages.

* cited by examiner

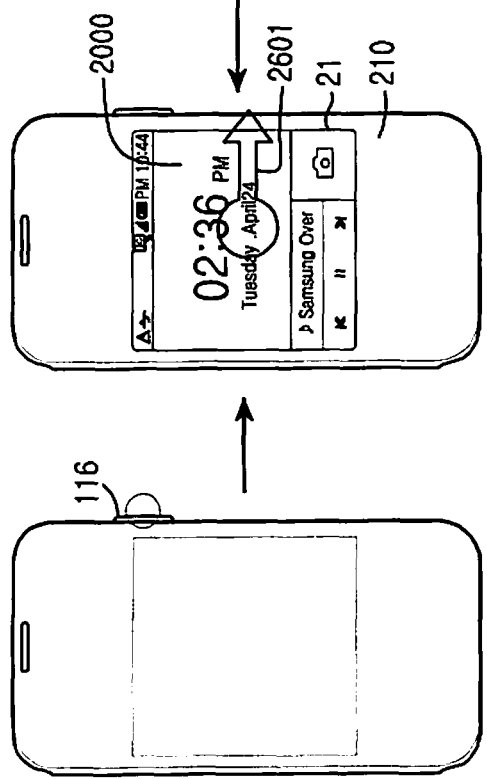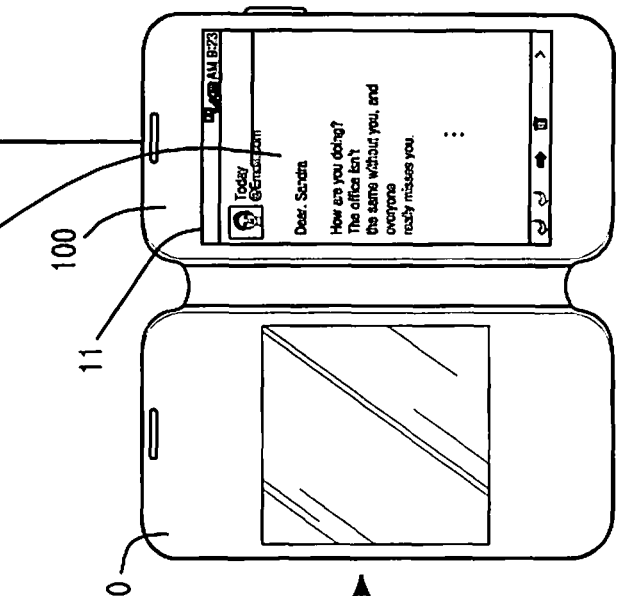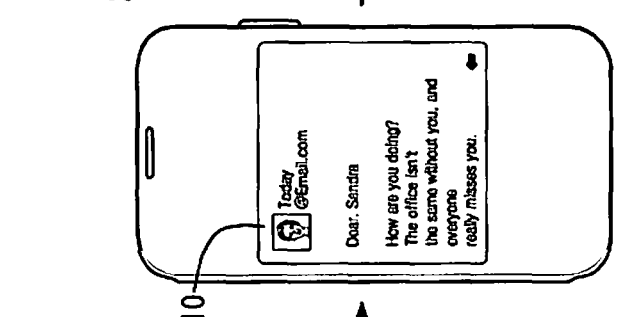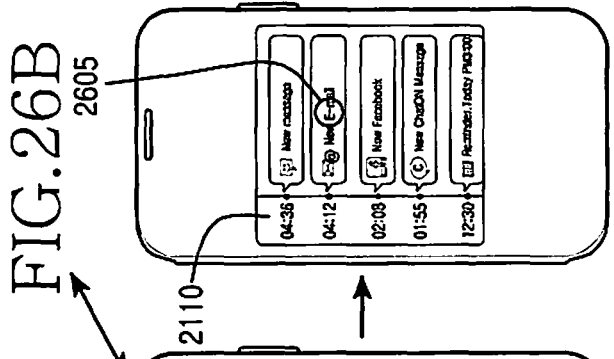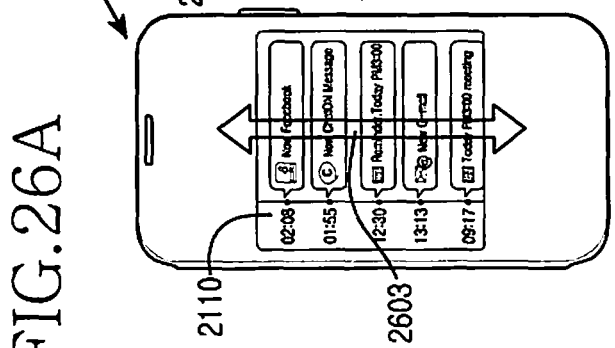

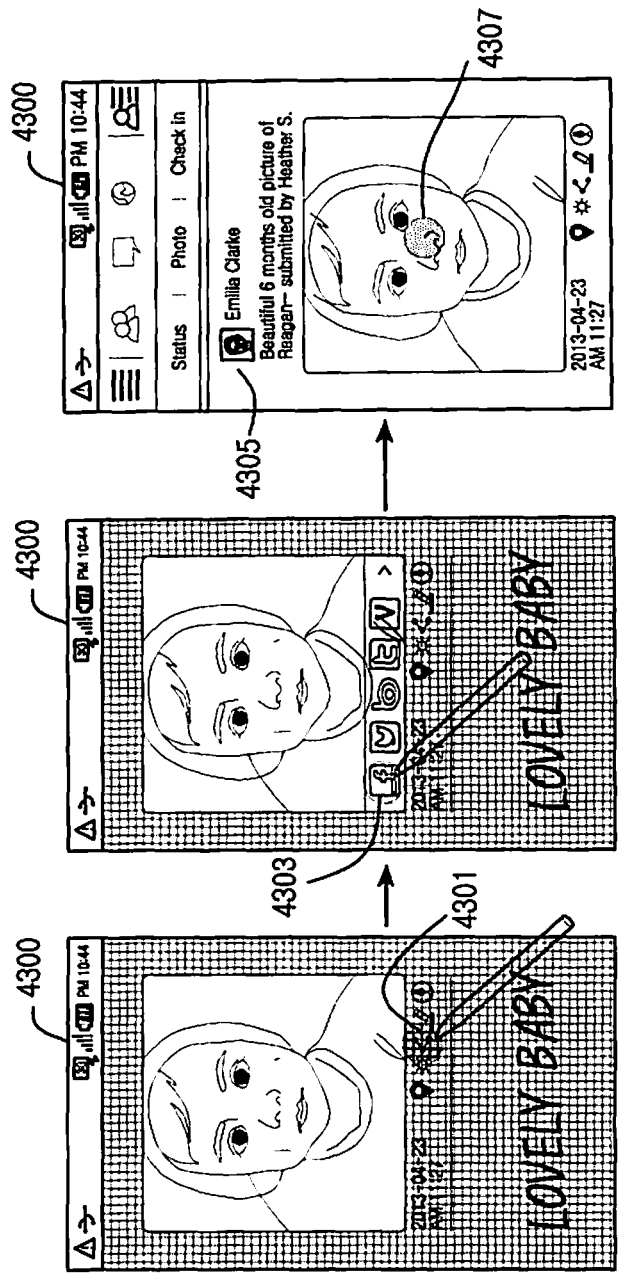

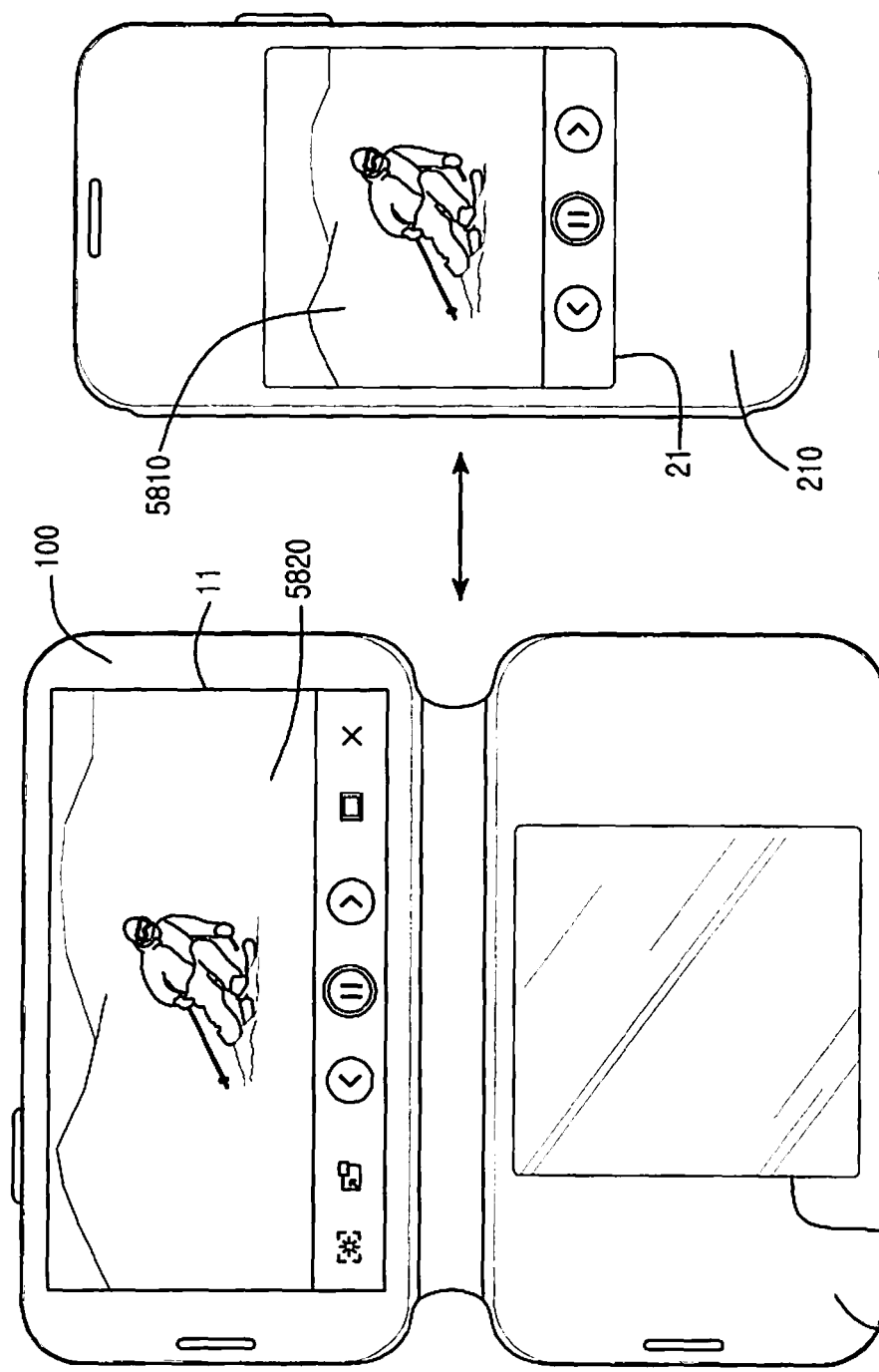

ELECTRONIC DEVICE AND OPERATING METHOD THEREOF

PRIORITY

This application claims priority under 35 U.S.C. § 119(a) to Korean Patent Application filed on Aug. 28, 2013 in the Korean Intellectual Property Office and assigned Serial No. 10-2013-0102739, the entire contents of which are hereby incorporated by reference.

BACKGROUND

1. Field of the Invention

Various embodiments of the present invention relates generally to an electronic device and operating method thereof.

2. Description of the Related Art

With the development of electronics communication industries in recent years, an electronic device has become a necessity of modern life as an important means for delivering information which changes rapidly. In addition, a Graphical User Interface (GUI) was developed to provide a high-quality display for an electronic device.

In general, an electronic device has one display which displays a variety of information. Since high-definition, large-sized screens have become readily available, the display of an electronic device is now expected to be a high-definition display.

SUMMARY

The present invention has been made to address at least the above-mentioned problems and disadvantages, and to provide at least the advantages described below. Accordingly, an aspect of the present invention is to control an electronic device while its cover is closed.

According to an aspect of the present invention, a method of operating an electronic device is provided. The method includes activating an application in the electronic device, detecting an opening/closing state of a cover of the electronic device, and transitioning between a plurality of display modes of the activated application based on the opening/closing state of the cover.

According to another aspect of the present invention, a method of operating an electronic device having an openable cover is provided. The method includes activating a first application in a closing state of the cover, displaying the activated first application on a display area corresponding to a window of the cover; deactivating the first application in response to an opening of the cover, activating a second application in association with the first application, and displaying the activated second application on a full screen.

According to another aspect of the present invention, a method of operating an electronic device having an openable cover is provided. The method includes displaying at least one object in a display area corresponding to a window of the cover when the cover is closed, detecting a touch input related to the at least one object, and performing a function based on the touch input.

According to another aspect of the present invention, an electronic device is provided. The electronic device includes a touch screen, a cover arranged to cover or uncover the touch screen, and having a window which exposes an area of the touch screen when the touch screen is covered, at least one sensor arranged to detect an opening/closing state of the cover, a memory arranged to store information related to a plurality of applications which are driven by at least one processor, and the at least one processor configured to transition between a plurality of display modes of an activated application in response to the opening/closing state of the cover, and control the activated application in response to a touch input in a transitioned display mode.

According to another aspect of the present invention, an electronic device is provided. The electronic device includes a touch screen a cover arranged to cover or uncover the touch screen, and having a window which exposes an area of the touch screen when the touch screen is covered by the cover, at least one sensor arranged to detect an opening/closing state of the cover, a memory arranged to store information related to a plurality of applications which are driven by at least one processor, and the at least one processor configured to activate a first application in a closing state of the cover, display the activated first application on a display area corresponding to the window of the cover, deactivate the first application in response to the opening of the cover and activate a second application in association with the first application, and display the activated second application on a full screen.

BRIEF DESCRIPTION OF THE DRAWINGS

The above and other aspects, features and advantages of the present invention will be more apparent from the following detailed description when taken in conjunction with the accompanying drawings, in which:

FIGS. 26A to 26F illustrate a process of displaying a notice application of an electronic device according to an embodiment of the present invention;

FIGS. 43A to 43C illustrate a process of sharing a photo note page according to an embodiment of the present invention;

FIGS. 58A to 58B illustrate display modes of a video playback application according to an embodiment of the present invention.

DETAILED DESCRIPTION OF EMBODIMENTS OF THE PRESENT INVENTION

Figure 1:
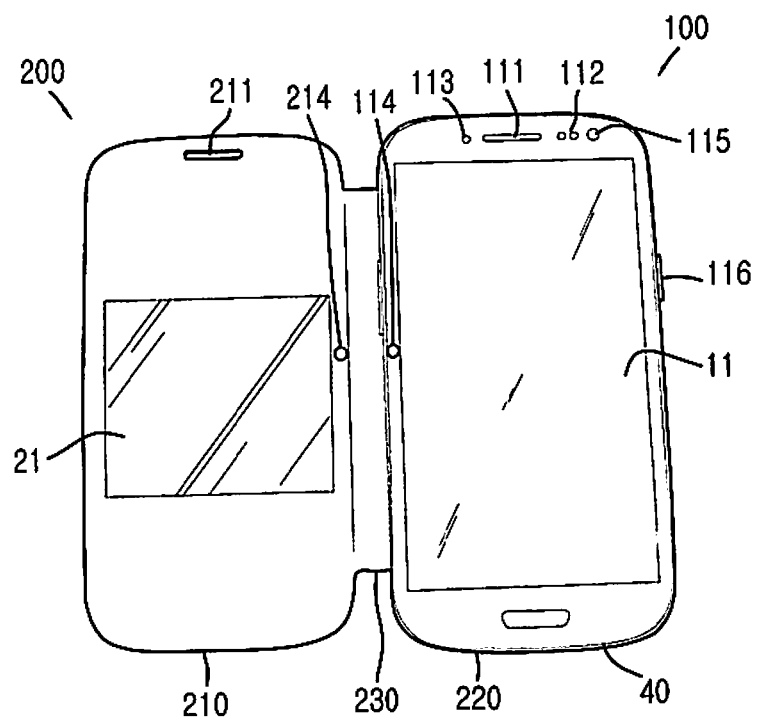
FIGS. 1 to 3 are perspective views illustrating a connection state between an electronic device and a cover device according to an embodiment of the present invention.

The following detailed description with reference to the accompanying drawings, where like numerals reference like parts, is provided to assist in a comprehensive understanding of the embodiments of the present invention as defined by the claims and their equivalents. It includes various details to assist in that understanding but these are to be regarded as mere examples. Accordingly, those of ordinary skill in the art will recognize that various changes and modifications of the embodiments described herein can be made without departing from the scope and spirit of the present invention. In addition, descriptions of well-known functions and constructions are omitted for clarity and conciseness.

Before describing the present invention, it is advantageous to set forth definitions of certain words and phrases used to describe the present invention as follows: the terms "include" and "comprise," as well as derivatives thereof, mean inclusion without limitation; the term "or" is inclusive, meaning and/or; the phrases "associated with" and "associated therewith," as well as derivatives thereof, mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, where such a device may be implemented in hardware, firmware or software, or some combination of at least two of the same. It should be noted that the functionality associated with any particular controller may be centralized or distributed, whether locally or remotely. Definitions for certain words and phrases are provided throughout the description of the present invention, and those of ordinary skill in the art should understand that in many, if not most instances, such definitions apply to prior, as well as future, uses of such defined words and phrases.

The terms and words used in the following description and claims are not limited to their dictionary meanings, but are merely used to enable a clear and consistent understanding of the present invention. Accordingly, it should be apparent to those skilled in the art that the following description of embodiments of the present invention is provided for illustration purposes only and not for the purpose of limiting the disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

By the term "substantially" it is meant that the recited characteristic, parameter, or value need not be achieved exactly, but that deviations or variations, including for example, tolerances, measurement error, measurement accuracy limitations and other factors known to those of skill in the art, may occur in amounts that do not preclude the effect the characteristic was intended to provide.

Figure 2:
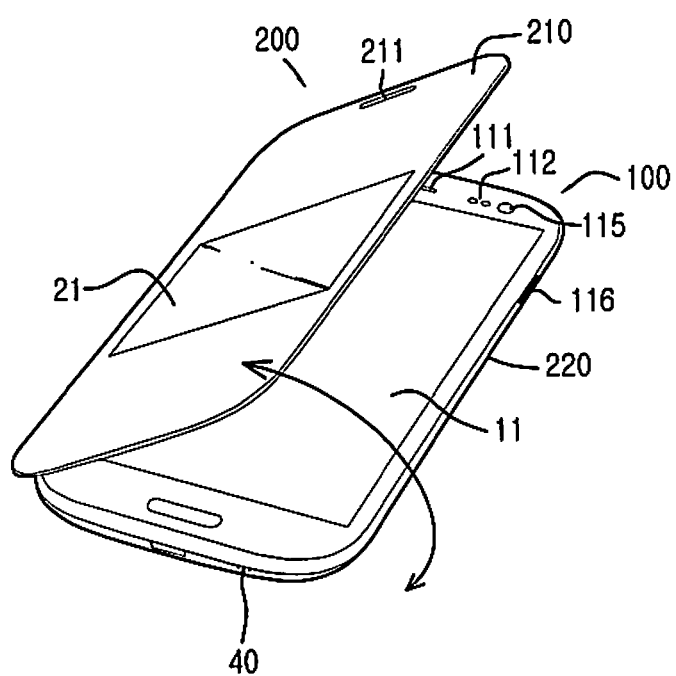
Figure 3:
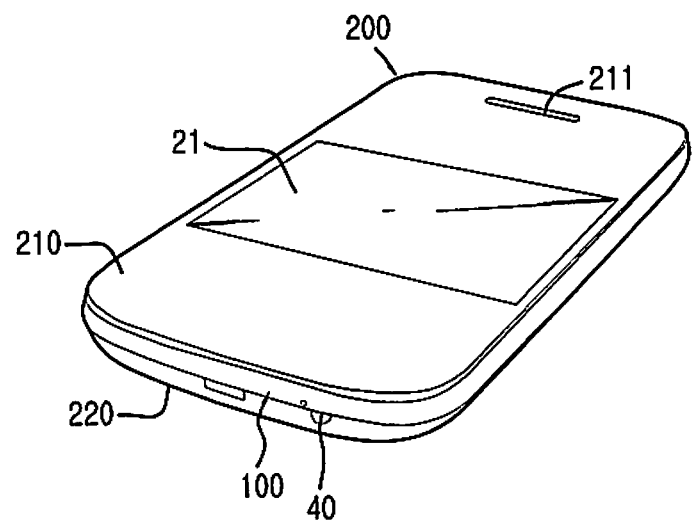

FIGS. 1 to 3 are perspective views illustrating a connection state between an electronic device and a cover device according to an embodiment of the present invention.

Referring to FIGS. 1 to 3, a cover device 200 includes a second cover portion 220 capable of forming a rear portion of an electronic device 100. The cover device 200 includes a first cover portion 210 capable of opening and closing a front portion of the electronic device 100 in a rotatable manner. A touch screen 11, a speaker 111, a proximity sensor or gesture sensor 112, a Red, Green, Blue (RGB) sensor 113, a hall sensor 114, and a camera 115 are disposed to the front portion of the electronic device 100. The cover device 200 includes a connection member 230 for connecting the first cover portion 210 and the second cover portion 220. The connection member 230 covers one lateral portion (i.e., a portion which connects the front portion and the rear portion) of the electronic device 100. The first cover portion 210 of the cover device 200 includes a through-hole 211 corresponding to the speaker 111 of the electronic device 100. The first cover portion 210 of the cover device 200 includes a magnet 214 corresponding to the hall sensor 114 of the electronic device 100. The first cover portion 210 of the cover device 200 includes a transparent window 21.

The electronic device 100 identifies an opening/closing of the first cover portion 210 of the cover device 200 from detection information by using at least one sensor (e.g., the proximity sensor or gesture sensor 112, the hall sensor 114, etc.). For example, if the first cover portion 210 of the cover device 200 is closed, the hall sensor 114 of the electronic device 100 responds to the magnet 214 of the first cover portion 210. The electronic device 100 controls a screen display (e.g., determines a display area or transitions to a display mode) in response to the opening/closing of the first cover portion 210 of the cover device 200. The electronic device 100 determines a first display area (e.g., a screen area that is viewed through the window 21) of the touch screen 11 as a display area in response to the closing of the first cover portion 210. The electronic device 100 determines a second display area (e.g., a full screen area) of the touch screen 11 as the display area in response to the opening of the first cover portion 210. The electronic device 100 displays an image interface to the determined display area in response to a pre-set event (e.g., a pressing of the power button 116 or a detachment of a stylus 40). For example, the electronic device 100 may display a variety of notice information (e.g., a current time, a remaining battery amount, a communication environment state, etc.) to the determined display area in response to the pressing of the power button 116. The electronic device 100 displays an image interface related to a memo function to the determined display area in response to the detachment of the stylus 40. The electronic device 100 displays an image interface related to a notice such as a message reception, a call reception, an alarm, etc., to the determined display area. A touch panel or a pen sensor (i.e., a digitizer) may be provided to the touch screen 11 of the electronic device 100. The electronic device 100 detects a touch gesture through the determined display area, and controls the display in response to the touch gesture. The electronic device 100 regulates touch sensitivity according to whether the first cover portion 210 is open or closed. For example, if the first cover portion is closed, the electronic device 100 regulates the touch sensitivity and executes a mode related to a hovering touch. In a state where the first cover portion 210 is closed, a user may generate a touch gesture (e.g., a single touch, a multi touch, a flicking, etc.) regarding an operation control on a surface of the window 21 of the first cover portion 210.

Figure 4:
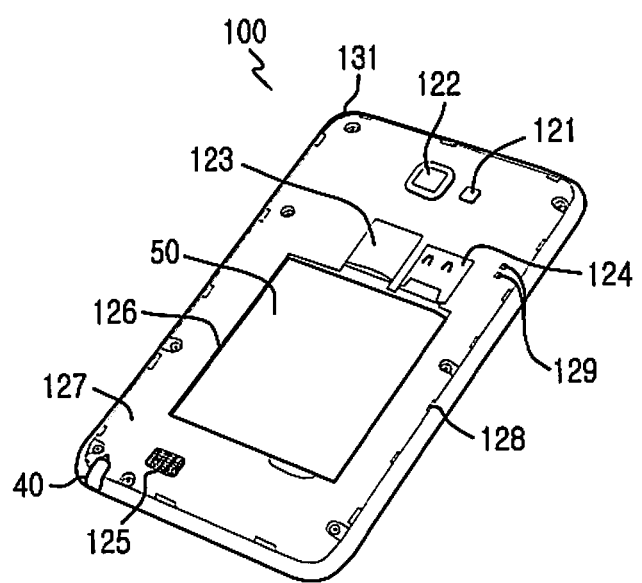
FIG. 4 is a perspective view of an electronic device according to an embodiment of the present invention.

FIG. 4 is a perspective view of an electronic device according to an embodiment of the present invention.

Referring to FIG. 4, an electronic device 100 includes a flash 121, a camera 122, memory sockets 123 and 124 (e.g., a socket for a Secure Digital (SD) card, a socket for a Subscriber Identification Module (SIM) card), a speaker 125, a first detachable container 126 for a battery 50, a second detachable container 127 for a stylus 40, hook joining notches 128, and terminals 129. The hook joining notches 128 are joined with the second cover portion 220 of the cover device 200. The terminals 129 are disposed to a location for connecting an identification (ID) chip module 30 (see FIG. 5) of the second cover portion 220. The terminals 129 use various types of electrical connection means such as a C-clip, a conductive PORON® tape, etc.

When the cover device 200 is placed on the electronic device 100, the electronic device 100 confirms the ID chip module 30. The electronic device 100 detects unique state information (e.g., a color of the cover, a location of the window 21, a size of the window 21, a shape of the window 21, etc.) for the cover device 200 and recorded in the confirmed ID chip module 30, and outputs a variety of content based on a feature of the cover device 200 applied to the electronic device 100. Such content may be output in a visual manner such as a User Interface (UI), etc., an audible manner such as a voice, a sound, etc., or a tactile manner such as a vibration, etc. The electronic device 100 displays a unique UI to an area of the touch screen 11 of the electronic device 100 through the window 21 of the cover device 200 on the basis of the unique state information of the currently placed cover device 200 from the ID chip module 30. The electronic device 100 displays the area of the touch screen 11 by using the same color as the cover device 200 through the window 21 of the cover device 200 on the basis of the unique state information of the currently placed cover device 200 from the ID chip module 30. According to the type of the cover device 200, the electronic device 100 detects different ID chip modules included in the cover device 200, extracts unique state information, and outputs corresponding content, UI, etc.

Figure 5:
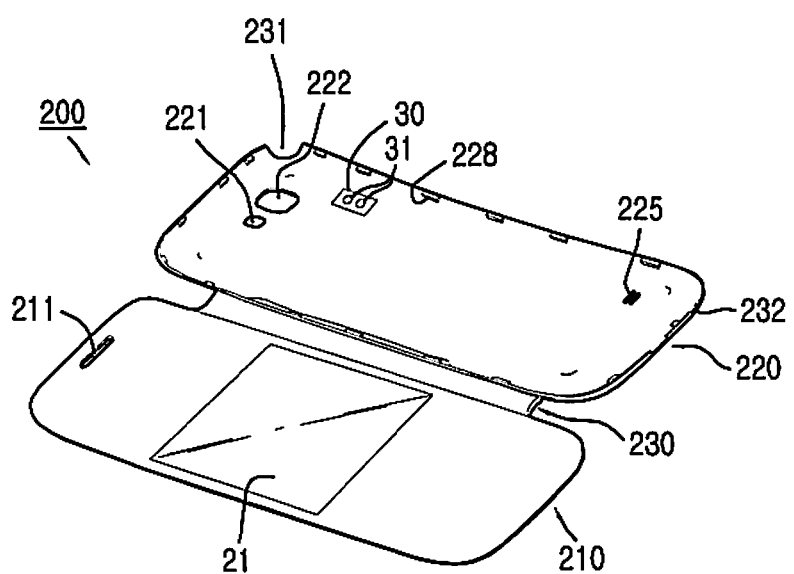
FIG. 5 is a perspective view of a cover device according to an embodiment of the present invention.

FIG. 5 is a perspective view of a cover device according to an embodiment of the present invention.

Referring to FIG. 5, the cover device 200 includes the first cover portion 210, the second cover portion 220, and the connection member 230. The first cover portion 210 includes the through-hole 211 corresponding to the speaker 111 of the electronic device 100. The first cover portion 210 includes the window 21 which has a size and shape (e.g., a square) and through which the touch screen 11 of the electronic device 100 is viewed. The second cover portion 220 includes a through-hole 221 corresponding to the flash 121 of the electronic device 100. The second cover portion 220 includes a through-hole 222 corresponding to the camera 122 of the electronic device 100. The second cover portion 220 includes a through-hole 225 corresponding to the speaker 125 of the electronic device 100. The second cover portion 220 includes a notch 231 corresponding to an antenna (e.g., a Digital Multimedia Broadcasting (DMB) antenna 131 of FIG. 4) that may be extended externally from the electronic device 100. The second cover portion 220 includes a notch 232 corresponding to the detachable stylus 40 of the electronic device 100. The second cover portion 220 includes hooks 228 corresponding to the hook joining notches 128 of the electronic device 100. The second cover portion 220 includes the ID chip module corresponding to the terminals 129 of the electronic device 100. The ID chip module 30 includes unique state information (e.g., a color of the cover, a location of the window 21, a size of the window 21, a shape of the window 21, etc.) of the cover device 200 applied to the electronic device 100. The ID chip module 30 may be constructed in one unit and thus may be fixedly attached to the second cover portion 220.

Figure 6:
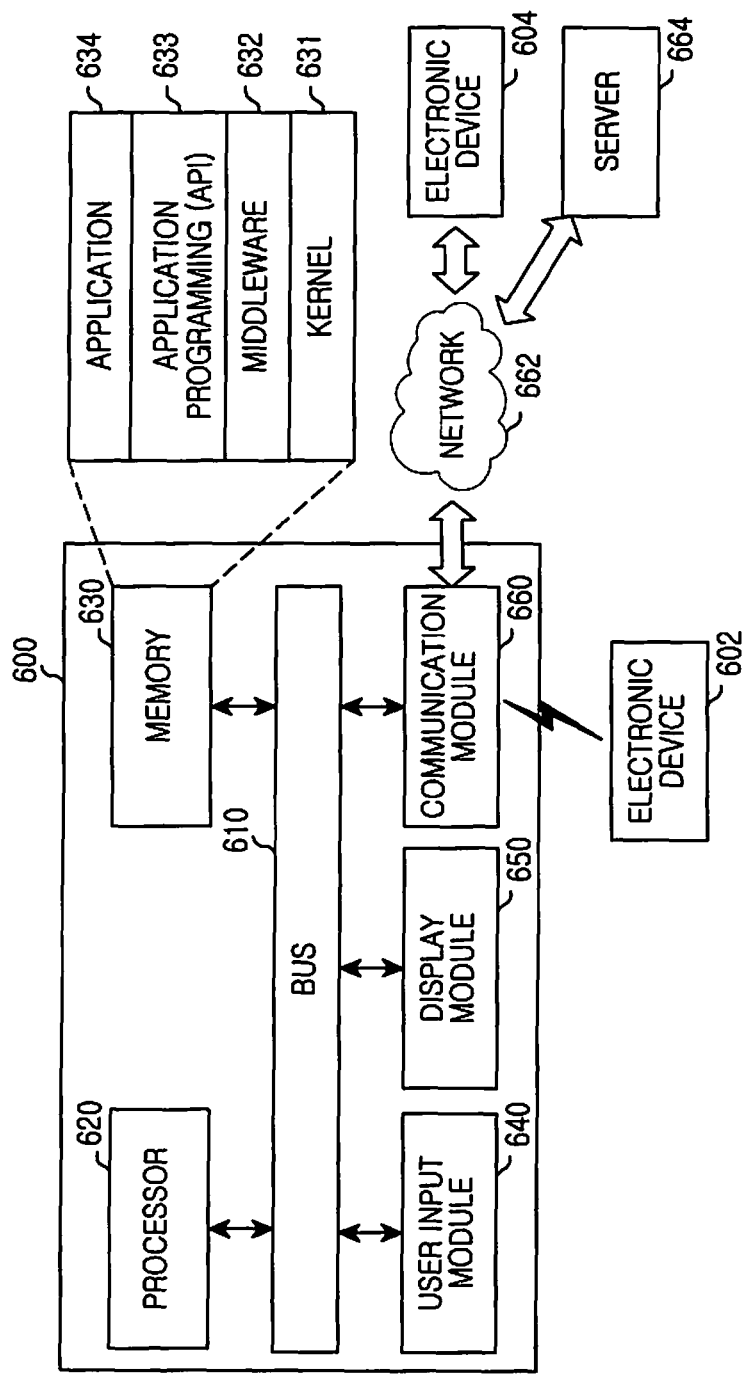
FIG. 6 is a block diagram of an electronic device according to various embodiments of the present invention.

FIG. 6 is a block diagram of an electronic device 100 according to various embodiments of the present invention.

The electronic device 100 according to the various embodiments of the present invention includes a device having a communication function. For example, the electronic device includes one or more combinations of various devices such as a smart phone, a tablet Personal Computer (PC), a mobile phone, a video phone, an e-book reader, a desktop PC, a laptop PC, a netbook computer, a Personal Digital Assistant (PDA), a Portable Multimedia Player (PMP), a Moving Picture Experts Group 1 (MPEG-1) Audio Layer 3 (MP3) player, a mobile medical device, an electronic bracelet, an electronic necklace, an electronic accessory, a camera, a wearable device, an electronic clock, a wrist watch, a smart white appliance (e.g., a refrigerator, an air conditioner, a cleaner, an artificial intelligent robot, a TeleVision (TV), a Digital Video Disk (DVD) player, an audio, an oven, a microwave oven, a washing machine, an air purifier, an electronic picture frame, etc.), various medical devices (e.g., Magnetic Resonance Angiography (MRA), Magnetic Resonance Imaging (MRI), Computed Tomography (CT), imaging equipment, ultrasonic instrument, etc.), a navigation device, a Global Positioning System (GPS) receiver, an Event Data Recorder (EDR), a Flight Data Recorder (FDR), a set-top box, a TV box (e.g., Samsung HomeSync™, Apple TV™, or Google TV™), an electronic dictionary, a car infotainment device, an electronic equipment for a ship (e.g., a vessel navigation device, a gyro compass, etc.), avionics, a security device, an electronic costume, an electronic key, a camcorder, game consoles, a Head-Mounted Display (HMD), a flat panel display device, an electronic album, a furniture or a part of a building/construction including a communication function, an electronic board, an electronic signature receiving device, a projector, etc. It is apparent to those ordinarily skilled in the art that the electronic device 100 according to the various embodiments of the present invention is not limited to the aforementioned devices.

Referring to FIG. 6, an electronic device 600 includes a bus 610, a processor 620, a memory 630, a user input module 640, a display module 650, and a communication module 660.

The bus 610 includes a circuit for connecting the aforementioned elements and for delivering communication (e.g., a control message) between the aforementioned elements.

The processor 620 receives an instruction, for example, through the bus 610 from other elements (e.g., the memory 630, the user input module 640, the display module 650, the communication module 660, etc.) described above, and interprets the received instruction and executes an arithmetic operation or data processing according to the interpreted instruction.

The memory 630 stores an instruction or data received from the processor 620 or other elements (e.g., the user input module 640, the display module 650, the communication module 660, etc.) or generated by the processor or other elements. The memory 530 includes program modules, for example, a kernel 631, a middleware 632, an Application Programming Interface (API) 633, an application 634, etc. Each of the aforementioned program modules may be configured in software, firmware, hardware, or at least two or more of combinations thereof.

The kernel 631 controls or manages system resources (e.g., the bus 610, the processor 620, the memory 630, etc.) used to execute an operation or function implemented in the remaining other programming modules, for example, the middleware 632, the API 633, or the application 634. The kernel 631 provides a controllable or manageable interface by accessing individual elements of the electronic device 600 in the middleware 632, the API 633, or the application 634.

The middleware 632 performs an intermediary role so that the API 633 or the application 634 communicates with the kernel 631 to exchange data. Regarding task requests received from a plurality of applications 634, for example, for at least one of the plurality of applications 634, the middleware 632 performs load balancing for the task request by using a method of assigning a priority capable of using a system resource (e.g., the bus 610, the processor 620, the memory 630, etc.) of the electronic device 600.

The API 633 includes at least one interface or function for file control, window control, video processing, or character control, etc., for example, as an interface capable of controlling a function provided by the application 634 in the kernel 631 or the middleware 632.

The user input module 640 receives an instruction or data, for example, from a user and delivers it to the processor 620 or the memory 630 through the bus 610. The display module 650 displays images, video, or data, etc., to the user.

The communication module 660 connects a communication between a different electronic device 602 and the electronic device 600. The communication module 660 supports a near-field communication protocol (e.g., Wireless Fidelity (WiFi), Bluetooth (BT), Near Field Communication (NFC), or a network communication 662 (e.g., Internet, Local Area Network (LAN), Wide Area Network (WAN), telecommunication network, cellular network, satellite network, Plain Old Telephone Service (POTS), etc.). Each of the different electronic devices 602 and 604 is either the same (e.g., the same type) as or different (e.g., a different type) from the electronic device 600.

Figure 7:
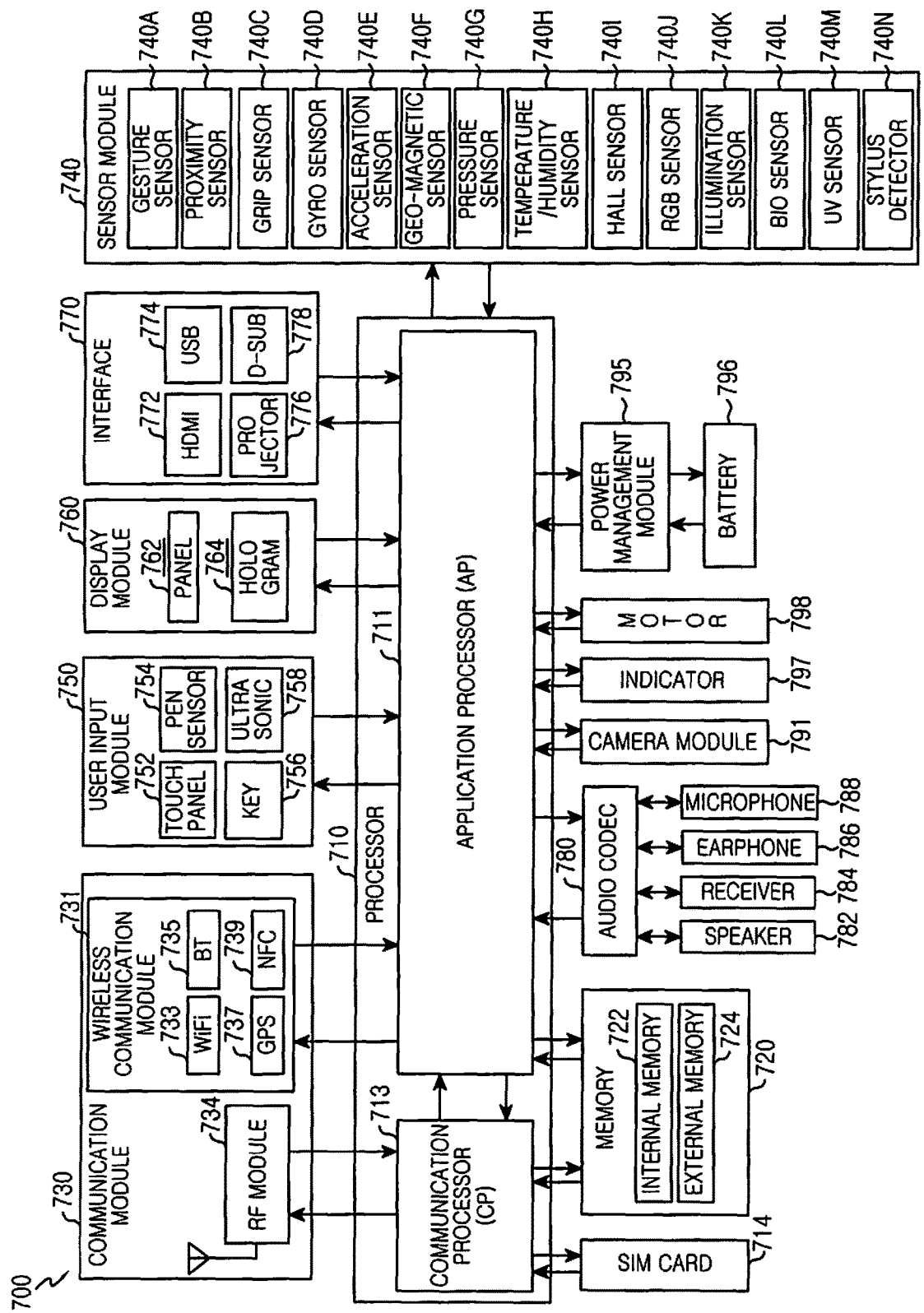
FIG. 7 is a block diagram of hardware according to various embodiments of the present invention.

FIG. 7 is a block diagram of hardware 700 according to various embodiments of the present invention. The hardware 700 may be, for example, the electronic device 600 in FIG. 6.

Referring to FIG. 7, the hardware 700 includes one or more processors 710, a Subscriber Identification Module (SIM) card 714, a memory 720, a communication module 730, a sensor module 740, a user input module 750, a display module 760, an interface 770, an audio codec 780, a camera module 791, a power management module 795, a battery 796, an indicator 797, and a motor 798.

The processor 710 (e.g., the processor 620 of FIG. 6) includes one or more Application Processors (APs) 711 and one or more Communication Processors (CPs) 713. The processor 710 may be, for example, the processor 620 of FIG. 6. Although it is illustrated in FIG. 7 that the AP 711 and the CP 713 are included in the processor 710, the AP 711 and the CP 713 may be included respectively in different integrated circuit (IC) packages. The AP 711 and the CP 713 may be included in one IC package.

The AP 711 controls a plurality of hardware or software elements connected to the AP 711 by driving an operating system or an application program, and processes a variety of data including multimedia data and performs an arithmetic operation. The AP 711 may be implemented, for example, with a System on Chip (SoC). The processor 710 may further include a Graphic Processing Unit (GPU, not shown).

The CP 713 performs a function of managing a data link and changing a communication protocol in a communication between an electronic device (e.g., the electronic device 600) including the hardware 700 and different electronic devices connected through a network. The CP 713 may be implemented, for example, with an SoC. The CP 713 performs at least a part of a multimedia control function. The CP 713 identifies and authenticates a user equipment in a communication network, for example, by using a subscriber identity module (e.g., the SIM card 714). The CP 713 provides a service including a voice call, a video call, a text message, packet data, or the like to a user.

The CP 713 controls a data transmission/reception of the communication module 730. Although elements such as the CP 713, the power management module 795, the memory 720, etc., are illustrated as separate elements in FIG. 7, the AP 711 may also be implemented such that at least one part (e.g., the CP 713) of the aforementioned elements is included.

The AP 711 or the CP 713 loads an instruction or data, which is received from each non-volatile memory connected thereto or at least one of different elements, to a volatile memory and processes the instruction or data. The AP 711 or the CP 713 stores data, which is received from at least one of different elements or generated by at least one of different elements, into the non-volatile memory.

The SIM card 714 is a card in which a SIM is implemented, and is inserted in a slot of the electronic device 100. The SIM card 714 includes unique identification information (e.g., an Integrated Circuit Card IDentifier (ICCID)) or subscriber information (e.g., an International Mobile Subscriber Identity (IMSI)).

The memory 720 includes an internal memory 722 or an external memory 724. The memory 720 may be, for example, the memory 730 of FIG. 6. The internal memory 722 includes, for example, at least one of a volatile memory (e.g., a Dynamic RAM (DRAM), a Static RAM (SRAM), a Synchronous Dynamic RAM (SDRAM), etc.) or a non-volatile memory (e.g., a One Time Programmable ROM (OTPROM), a Programmable ROM (PROM), an Erasable and Programmable ROM (EPROM), an Electrically Erasable and Programmable ROM (EEPROM), a Mask ROM, a Flash ROM, a NAND flash memory, a NOR flash memory, etc.). The internal memory 722 may have a form of a Solid State Drive (SSD). The external memory 724 further includes, for example, Compact Flash (CF), Secure Digital (SD), Micro Secure Digital (Micro-SD), Mini Secure digital (Mini-SD), extreme Digital (30), memory stick, etc.

The communication module 730 includes a wireless communication module 731 or a Radio Frequency (RF) module 734. The communication module may be, for example, the communication module 660 of FIG. 6. The wireless communication module 731 includes, for example, WiFi 733, BlueTooth (BT) 735, Global Positioning System (GPS) 737, or near field communication (NFC) 739. For example, the wireless communication module 731 may provide a wireless communication function by using a radio frequency. In addition or in general, the wireless communication module 731 includes a network interface (e.g., a LAN card), modem, or the like for connecting the hardware 700 to a network (e.g., Internet, LAN, WAN, telecommunication network, cellular network, satellite network, POTS, or the like).

The RF module 734 serves to transmit/receive data, for example, to transmit/receive an RF signal or a paged electronic signal. Although not shown, the RF module 734 includes, for example, a transceiver, a Power Amp Module (PAM), a frequency filter, a Low Noise Amplifier (LNA), etc. The RF module further includes a component for transmitting/receiving a radio wave on a free space in wireless communication, for example, a conductor, a conducting wire, etc.

The sensor module 740 includes, for example, at least one of a gesture sensor 740A, a proximity sensor 740B, a grip sensor 740C, a gyro sensor 740D, an acceleration sensor 740E, a geo-magnetic sensor 740F, a pressure sensor 740G, a temperature/humidity sensor 740H, a hall sensor 740I, a Red, Green, Blue (RGB) sensor 740J, an illumination sensor 740K, a bio sensor 740L, an Ultra Violet (UV) sensor 740M, and a stylus detector 740N. The sensor module measures a physical quantity or detects an operation state of the electronic device 100, and thus converts the measured or detected information into an electric signal. In addition/in general, the sensor module 740 includes, for example, an E-node sensor (not shown), an ElectroMyoGraphy (EMG) sensor (not shown), an ElectroEncephaloGram (EEG) sensor (not shown), an ElectroCardioGram (ECG) sensor (not shown), a fingerprint sensor, etc. The sensor module 740 further includes a control circuit for controlling at least one or more sensors included therein.

The user input module 750 includes a touch panel 752, a (digital) pen sensor 754, a key 756, and an ultrasonic input unit 758. The user input module may be, for example, the user input module 640 of FIG. 6. The touch panel recognizes a touch input, for example, by using at least one of an electrostatic type, a pressure-sensitive type, and an ultrasonic type. The touch panel 752 further includes a controller (not shown).

In case of the electrostatic type, not only direct touch but also proximity recognition is possible. The touch penal 752 further includes a tactile layer. Here, the touch panel 752 provides the user with a tactile reaction.

The pen sensor 754 may be implemented, for example, by using the same or similar method of receiving a touch input of the user or by using an additional sheet for recognition. The key 756 includes, for example, a keypad or a touch key. The ultrasonic input unit 758 is a device by which a user's equipment detects a sound wave through a microphone (e.g., a microphone 788) by using a pen which generates an ultrasonic signal, and is a device capable of radio recognition. The hardware 700 may use the communication module 730 to receive a user input from an external device (e.g., a network, a computer, or a server) connected thereto.

The display module 760 includes a panel 762 or a hologram 764. The display module 760 includes, for example, the display module 650 of FIG. 6. The panel 762 includes, for example, a Liquid-Crystal Display (LCD), an Active-Matrix Organic Light-Emitting Diode (AM-OLED), etc. The panel 762 may be implemented, for example, in a flexible, transparent, or wearable manner. The panel 762 may be constructed as one module with the touch panel 752. The hologram 764 may use an interference of light and show a stereoscopic image in the air. The display module 760 further includes a control circuit for controlling the panel 762 or the hologram 764.

The interface 770 includes, for example, a High-Definition Multimedia Interface (HDMI) 772, a Universal Serial Bus (USB) 774, a projector 776, or a D-subminiature (D-sub) 778. In addition or in general, the interface 770 includes, for example, Secure Digital (SD)/Multi-Media Card (MMC) (not shown) or Infrared Data Association (IrDA) (not shown).

The audio codec 780 bilaterally converts a voice and electronic signal. The audio codec 780 converts audio information which is input or output, for example, through a speaker 782, a receiver 784, an earphone 786, the microphone 788, etc.

The camera module 791 is a device for image and video capturing, and according to one embodiment of the present invention, includes one or more image sensors (e.g., a front lens or a rear lens), an Image Signal Processor (ISP) (not shown), and a flash Light Emitting Diode (LED) (not shown).

The power management module 795 manages power of the hardware 700. Although not shown, the power management module 795 includes, for example, a Power Management Integrated Circuit (PMIC), a charger Integrated Circuit (IC), and a battery gauge.

The PMIC may be placed, for example, inside an IC or SoC semiconductor. Charging may be classified into wired charging and wireless charging. The charger IC charges a battery, and avoids an over-voltage or over-current flow from a charger. The charger IC further includes a charger IC for at least one of wired charging and wireless charging. Wireless charging may be classified, for example, as a magnetic resonance type, a magnetic induction type, or an electromagnetic type. Wireless charging includes, for example, a coil loop, a resonant circuit, a rectifier, etc.

The battery gauge measures, for example, a residual quantity of the battery 796 and a voltage, current, and temperature during charging. The battery generates electricity to supply a power source, and may be, for example, a rechargeable battery.

The indicator 797 indicates a state, for example, a booting state, a message state, a charging state, etc., of the hardware 700 or a part thereof (e.g., the AP 711). The motor 798 converts an electric signal into a mechanical vibration.

Although not shown, the hardware 700 may include a processing unit (e.g., a GPU) for supporting mobile TV. The processing unit for supporting mobile TV processes media data according to a protocol of, for example, Digital Multimedia Broadcasting (DMB), Digital Video Broadcasting (DVB), media flow, etc.

Names of the aforementioned elements of the hardware according to the present invention may vary depending on a type of electronic device. The hardware of the present invention may include at least one of the aforementioned elements. Some of the elements may be omitted, or additional other elements may be further included. In addition, some of the elements of the hardware of the present invention may be combined and constructed to one entity, so as to equally perform functions of corresponding elements before combination.

Figure 8:
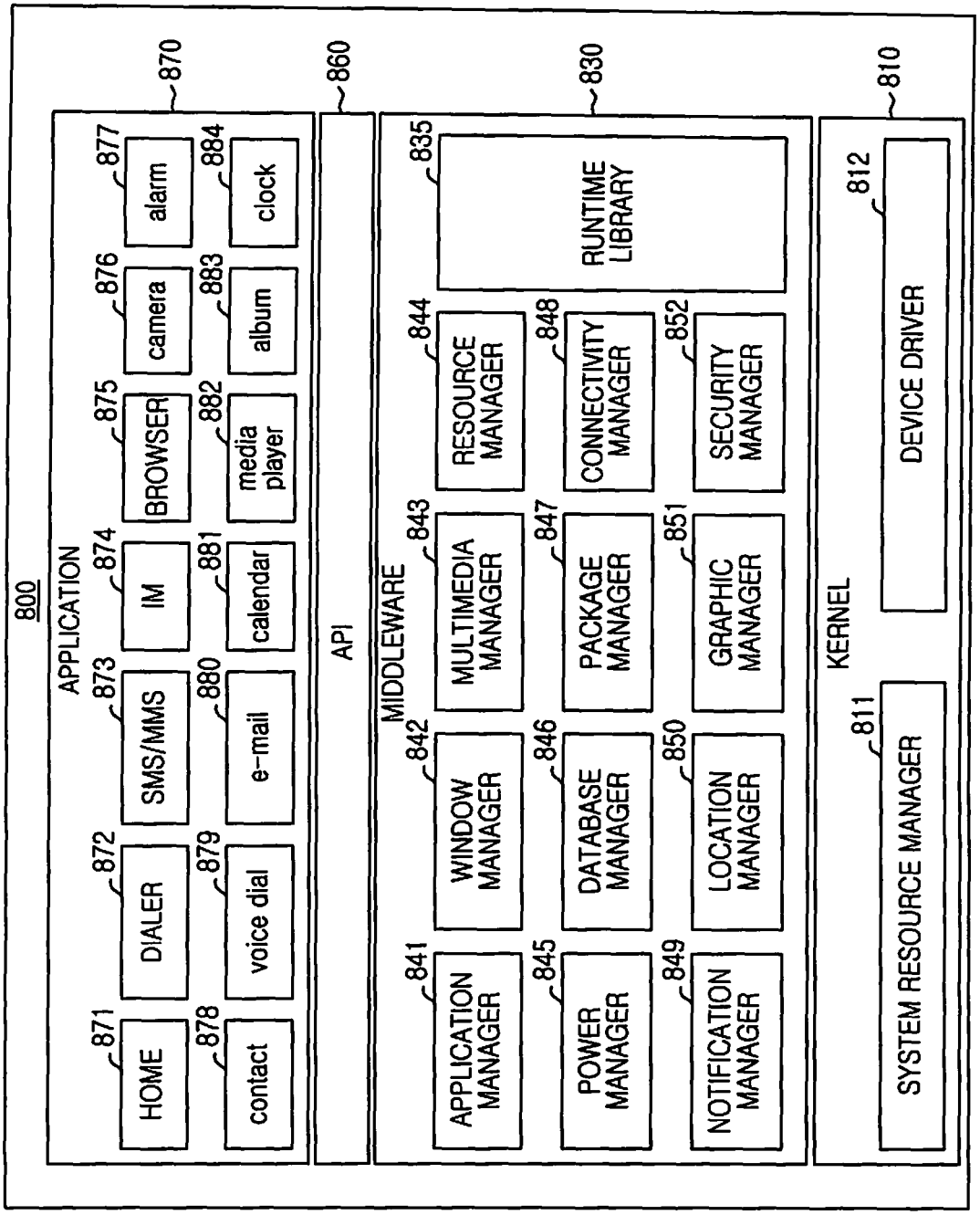
FIG. 8 is a block diagram of a programming module according to various embodiments of the present invention.

FIG. 8 is a block diagram of a programming module according to various embodiments of the present invention. A programming module 800 is included (e.g., stored) in the electronic device 600 (e.g., the memory 630) of FIG. 6. At least one part of the programming module 800 includes software, firmware, hardware, or a combination of at least two or more of them. The programming module 800 includes an Operating System (OS) implemented in a hardware (e.g., the hardware 700) and controlling a resource related to an electronic device (e.g., the electronic device 100) or various applications (e.g., an application 870) driven on the OS. For example, the OS may be Android, iOS, Windows, Symbian, Tizen, Bada, etc.

Referring to FIG. 8, the programming module 800 includes a kernel 810, a middleware 830, an Application Programming Interface (API) 860, and an application 870.

The kernel 810 (e.g., the kernel 631) includes a system resource manager and a device driver 812. The system resource manager 811 includes, for example, a process managing unit, a memory managing unit, a file system managing unit, and the like. The system resource manager 811 performs control, allocation, retrieval, and the like of the system resource. The device driver 812 includes, for example, a display driver, a camera driver, a Bluetooth driver, a shared memory driver, a USB driver, a keypad driver, a WiFi driver, or an audio driver. In addition, the device driver 812 may include an Inter-Process Communication (IPC) driver (not shown).

The middleware 830 includes a plurality of modules pre-implemented to provide a function commonly required by the application 870. In addition, the middleware 830 provides a function through the API 860 so that the application may effectively use a limited system resource in the electronic device. For example, as illustrated in FIG. 8, the middleware 830 (e.g., the middleware 632) includes at least one of a runtime library 835, an application manager 841, a window manager 842, a multimedia manager 843, a resource manager 844, a power manager 845, a database manager 846, a package manager 847, a connectivity manager 848, a notification manager 849, a location manager 850, a graphic manager 851, and a security manager 852.

The runtime library 835 includes, for example, a library module used by a compiler to add a new function through a programming language while the application 870 is executed. The runtime library 835 performs a function for input/output, memory management, arithmetic function, etc.

The application manager 841 manages, for example, a life cycle of at least one application among the applications 870. The window manager 842 manages a Graphical User Interface (GUI) resource used in a screen. The multimedia manager 843 recognizes a format required to reproduce various media files, and uses a code suitable for the format to perform encoding or decoding of the media file. The resource manager 844 manages a resource such as source code, memory, storage space, etc., of at least any one of the applications 870.

The power manager 845 manages a battery or power using a Basic Input/Output System (BIOS), etc., and provides power information, etc., required for the operation. The database manager 846 generates, searches, or changes a database used in at least one application among the applications 870. The package manager 847 manages installation and update of an application distributed in a form of a package file.

The connectivity manager 848 manages a wireless connection, for example, WiFi, Bluetooth, etc. The notification manager 849 displays or gives notification of an event such as an incoming message, an appointment, a proximity notice, etc., in a manner that does not disturb the user. The location manager 850 manages location information of the electronic device. The graphic manager 851 manages a graphic effect provided to the user or a user interface related thereto. The security manager 852 provides a general security function required for system security, user authentication, etc. If the electronic device (e.g., the electronic device 100) has a telephone function, the middleware 830 further includes a telephony manager (not shown) for managing a voice or video telephony function of the electronic device.

The middleware 830 generates and uses a new middleware module by combining various functions of the aforementioned internal modules. The middleware 830 provides a module for each operating system type to provide a differentiated function. The middleware 830 may dynamically delete some of the existing elements or may add new elements. Some of the elements described in an embodiment of the present invention may be omitted, or other elements may be further included or may be replaced with elements having other names for performing a similar function.

The API 860 (e.g., the API 633) is a set of API programming functions, which are provided with other configurations according to the operating system. For example, in the case of Android or iOS, one API set is provided for each platform, and in the case of Tizen, two or more API sets are provided.

The application 870 (e.g., the application 634) includes, for example, a preloaded application or a third party application. The application 870 includes at least one of Home 871, Dialer 872, SMS/MMS 873, IM 874, Browser 875, Camera 876, Alarm 877, Contact 878, Voice dial 879, E-mail 880, Calendar 881, Media player 882, Album 883 and Clock 884, etc.

At least some parts of the programming module 800 may be implemented with an instruction stored in a computer-readable storage media. If it is executed by one or more processors (e.g., the processor 710), the one or more processors performs a function corresponding to the instruction. The computer-readable storage media may be, for example, the memory 760. At least some parts of the programming module 800 may be implemented (e.g., executed), for example, by the processor 710. At least some parts of the programming module 800 may include, for example, modules, programs, routines, sets of instructions, processes, etc., for performing one or more functions.

Names of elements of the programming module (e.g., the programming module 800) according to the present invention may vary depending on a type of operating system. In addition, the programming module according to the present invention may further include at least one or more elements among the aforementioned elements, or may omit some of them, or may further include additional other elements.

Figure 9:
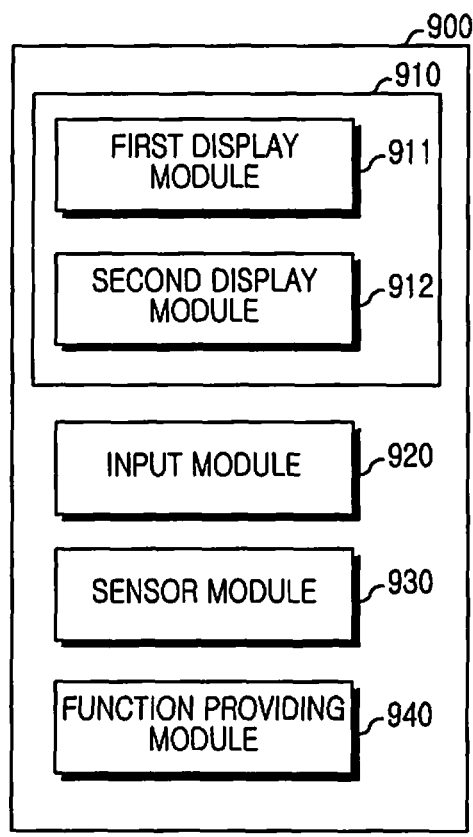
FIG. 9 is a block diagram of a function module according to various embodiments of the present invention.

FIG. 9 is a block diagram of a function module according to various embodiments of the present invention.

Referring to FIG. 9, a function module 900 includes a display module 910, an input module 920, a sensor module 930, and a function providing module 940. The display module 910 includes a first display module 911 and a second display module 912. The first display module 911 displays at least one object to a first display area of the touch screen 11 corresponding to the window 21 of the first cover portion 210 in response to a closing of the first cover portion 210. The object may be related to at least one of a call reception, a message reception, a pressing of a specific button (e.g., a power button), an arrival of a specific time (e.g., an alarm, a wakeup call), and a detachment of the stylus 40. The object may be acquired from a camera (e.g., the camera module 791). The object (e.g., a web page) may be acquired from an external network. The second display module 912 displays a function based on a touch input to a second display area (e.g., a full area of the touch screen 11) different from the first display area of the touch screen 11 in response to an opening of the first cover portion 210. The function based on the touch input may be a video- or audio-related function. The input module 920 confirms a touch input (e.g., a single touch, a multi touch, a drag and release, a flicking, etc.) related to the object. The touch input may be a hovering touch input. The sensor module 930 provides the function based on the touch input. The sensor module 930 detects the opening/closing of the first cover portion 210. The sensor module 930 includes at least one sensor (e.g., the gesture sensor 740A, the proximity sensor 740B, the grip sensor 740C, the gyro sensor 740D, the acceleration sensor 740E, the geo-magnetic sensor 740F, the pressure sensor 740G, the temperature/humidity sensor 740H, the hall sensor 740I, the Red, Green, Blue (RGB) sensor 740J, the illumination sensor 740K, the bio sensor 740L, the Ultra Violet (UV) sensor 740M, and the stylus detector 740N).

Figure 10:
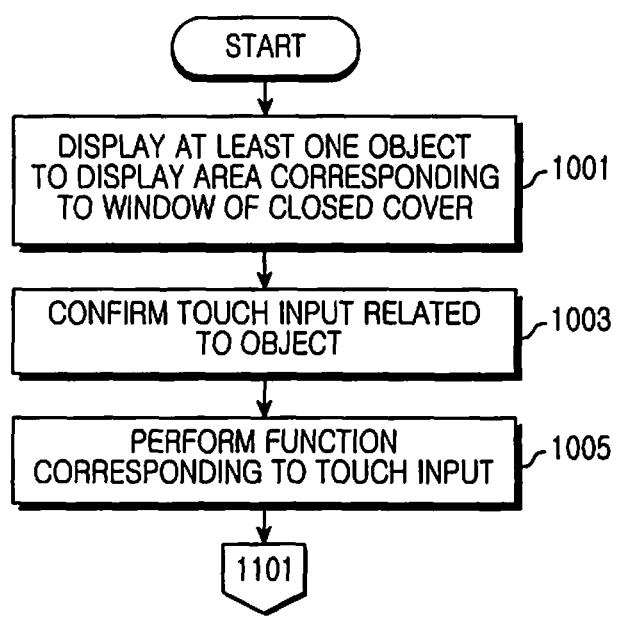
FIG. 10 is a flowchart illustrating a process of performing a function according to an embodiment of the present invention.

FIG. 10 is a flowchart illustrating a process of performing a function according to an embodiment of the present invention.

In step 1001, the processor 710 (e.g., the first display module 911) displays at least one object to a display area corresponding to the window 21 of a closed first cover portion 210.

The object may be related to at least one of a call reception, a message reception, a pressing of a specific button (e.g., a power button), an arrival of a specific time (e.g., an alarm, a wakeup call), and a detachment of the stylus 40. The object may be acquired from a camera (e.g., the camera module 791). The object (e.g., a web page) may be acquired from an external network. In step 1003, the processor 710 (e.g., the input module 920) confirms a touch input related to the object. In step 1005, the processor 710 (e.g., the function providing module 940) performs the function based on the touch input. The function based on the touch input may be a video- or audio-related function.

Figure 11:
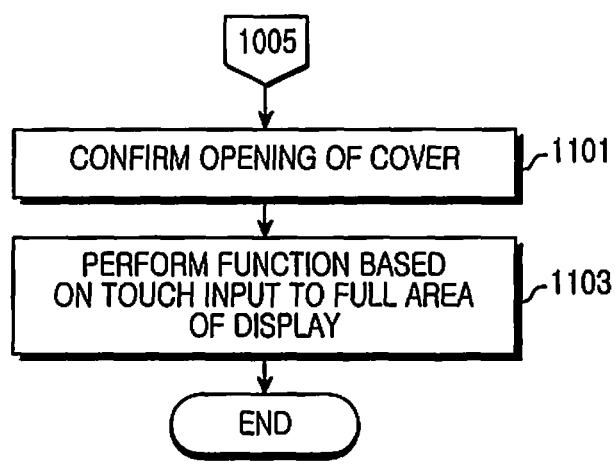
FIG. 11 is a flowchart illustrating an operation performed after step 1005 of FIG. 10 according to an embodiment of the present invention.

FIG. 11 is a flowchart illustrating an operation performed after step 1005 of FIG. 10 according to an embodiment of the present invention.

Referring to FIG. 11, in step 1101, the processor 710 (e.g., the sensor module 930) detects an opening of the first cover portion 210 after a touch input. In step 1103, the processor 710 (e.g., the function providing module 940) performs a function based on the touch input to a full area of the touch screen 11 in response to the opening of the first cover portion 210.

Figure 12:
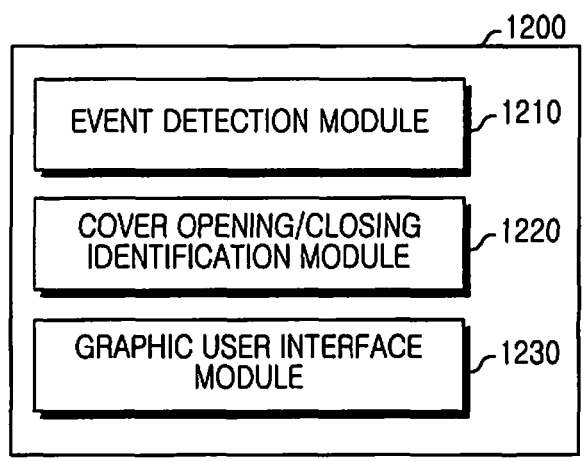
FIG. 12 is a block diagram of a display module according to various embodiments of the present invention.

FIG. 12 is a block diagram of a display module according to various embodiments of the present invention.

Referring to FIG. 12, a display module 1200 includes an event detection module 1210, a cover opening/closing identification module 1220, and a graphic user interface module 1230.

The event detection module 1210 detects an image-related event. The event detection module 1210 detects an event by using a user input module (e.g., the touch panel 752, the pen sensor 754, the key 756, or the ultra sonic 758). For example, the event detection module 1210 may detect an event corresponding to a pressing of the power button 116. The event detection module 1210 may detect a touch gesture (e.g., a single touch, a multi touch, a touch and drag, a flicking, etc.) for the touch panel 752 or the pen sensor 754. The event detection module 1210 may detect an event corresponding to detection information from at least one sensor (e.g., the gesture sensor 740A, the proximity sensor 740B, the grip sensor 740C, the gyro sensor 740D, the acceleration sensor 740E, the geo-magnetic sensor 740F, the pressure sensor 740G, the temperature/humidity sensor 740H, the hall sensor 740I, the Red, Green, Blue (RGB) sensor 740J, the illumination sensor 740K, the bio sensor 740L, the Ultra Violet (UV) sensor 740M, and the stylus detector 740N) of the sensor module 740. For example, the event detection module 1210 may detect an event corresponding to a detachment of the stylus 40 from a response of the stylus detector 740N. The event detection module 1210 may detect an event corresponding to a message reception, a call reception, an arrival of a specific time (e.g., an alarm, a wakeup call), etc.

The event detection module 1210 (e.g., the sensor module 930) identifies whether a cover (e.g., the first cover portion 210 of the cover device 200) is open or closed by using at least one sensor. For example, the cover opening/closing identification module 1220 may identify whether the cover (e.g., the first cover portion 210) is open or closed from a response of the hall sensor 740I. The cover opening/closing identification module 1220 may identify whether the cover (e.g., the first cover portion 210) is open or closed from a response of the proximity sensor 740B. The cover opening/closing identification module 1220 may identify whether the cover (e.g., the first cover portion 210) is open or closed from a response of the illumination sensor 740K.

The graphic user interface module 1230 configures a display area on the touch screen 11 in response to whether the first cover portion 210 is open or closed. For example, the graphic user interface module 1230 may determine a full area of the touch screen 11 to the display area in response to the opening of the first cover portion 210. The graphic user interface module 1230 may determine some areas (e.g., a display area corresponding to the window 21 of the first cover portion 210) of the touch screen 11 to be the display area in response to the closing of the first cover portion 210. The graphic user interface module 1230 may display an image interface corresponding to an event to the determined display area.

Figure 13:
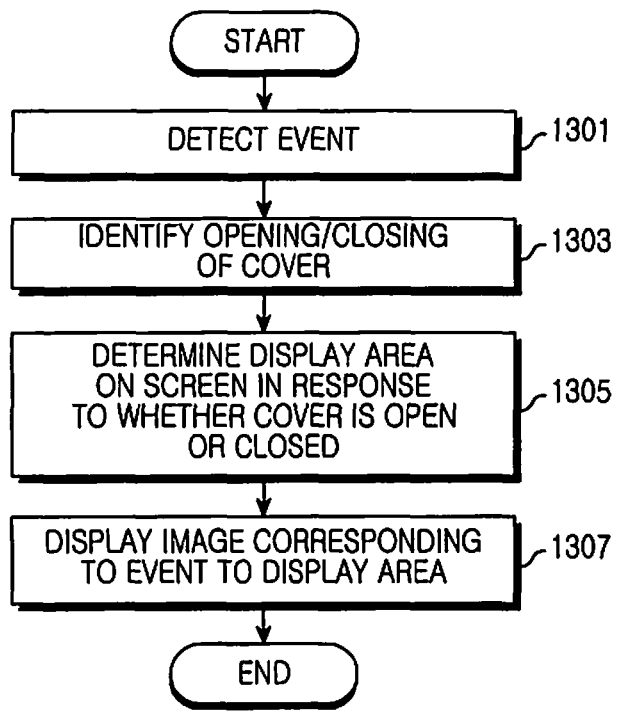
FIG. 13 is a flowchart illustrating a display process of an electronic device according to an embodiment of the present invention.

FIG. 13 is a flowchart illustrating a display process of an electronic device according to an embodiment of the present invention.

Referring to FIG. 13, in step 1301, the processor 710 (e.g., the event detection module 1210) detects an image-related event. In step 1303, the processor 710 (e.g., the cover opening/closing identification module 1220) identifies whether the first cover portion 210 is open or closed. In step 1305, the processor 710 (e.g., the graphic user interface module 1230) determines a display area on the touch screen 11 in response to whether the first cover portion 210 is open or closed. In step 1307, the processor 710 (e.g., the graphic user interface module 1230) displays an image interface corresponding to the detected image-related event to the display area.

Figure 14:
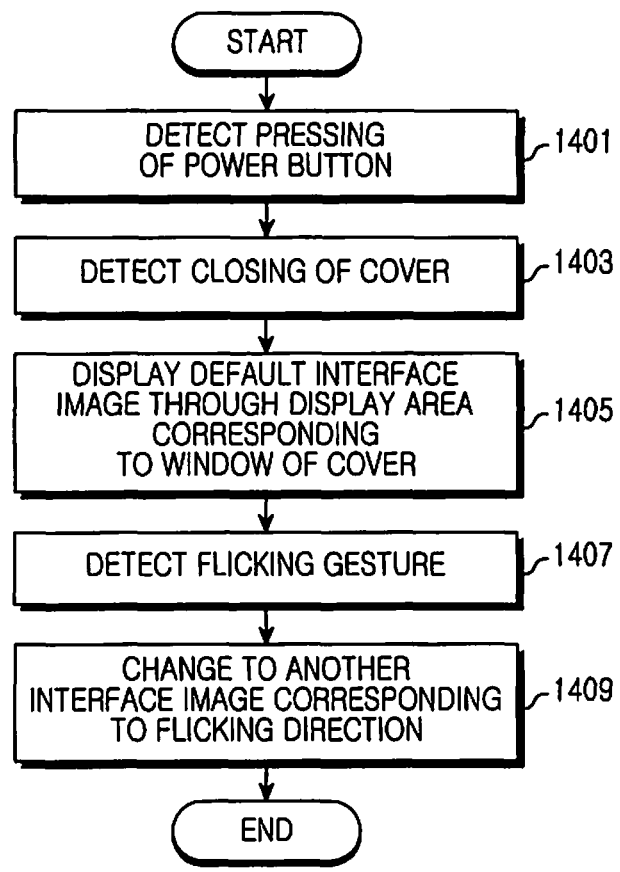
FIG. 14 is a flowchart illustrating a display process of an electronic device according to various embodiments of the present invention.

FIG. 14 is a flowchart illustrating a display process of an electronic device according to various embodiments of the present invention.

Referring to FIG. 14, in step 1401, the processor 710 (e.g., the event detection module 1210) detects a pressing of the power button 116. In step 1403, the processor 710 (e.g., the cover opening/closing identification module 1220) detects a closing of first cover portion 210. In step 1405, the processor 710 (e.g., the graphic user interface module 1230) displays a default image interface through a display area corresponding to the window 21 of the first cover portion 210. In step 1407, the processor 710 (e.g., the event detection module 1210) detects a flicking gesture in the default image interface. In step 1409, the processor 710 (e.g., the graphic user interface module 1230) changes to another image interface corresponding to a flicking direction.

Figure 15:
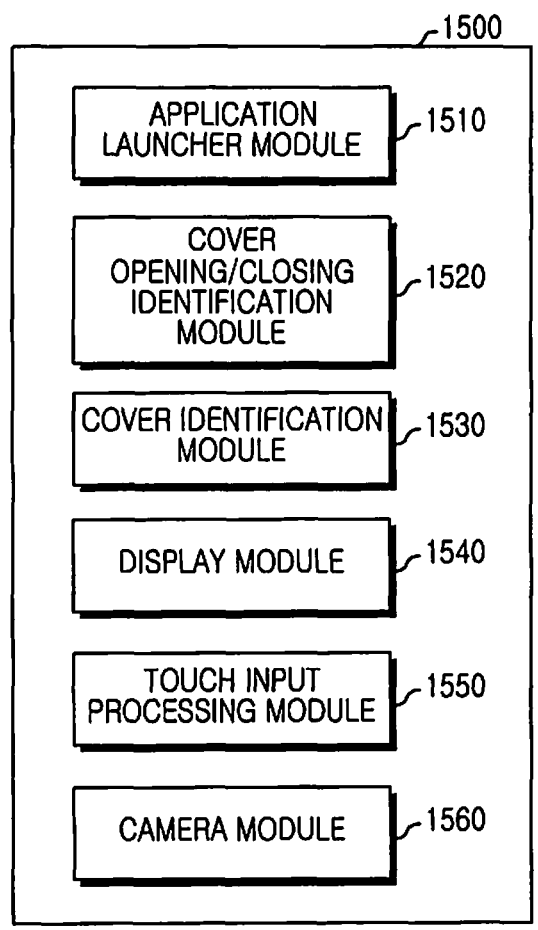
FIG. 15 is a block diagram illustrating a display module of an application according to various embodiments of the present invention.

FIG. 15 is a block diagram illustrating a display module of an application according to various embodiments of the present invention.

Referring to FIG. 15, an application display module 1500 includes an application launcher module 1510, a cover opening/closing identification module 1520, a cover identification module 1530, a display module 1540, a touch input processing module 1550, and a camera module 1560.

The application launcher module 1510 displays at least one object (e.g., icon) to a display area corresponding to the window 21 of the first cover portion in response to a pre-set input (e.g., a pressing of the power button 116) in a closing state of the first cover portion 210, and activates an application in response to a touch input (e.g., an icon selection) for at least one object. The application launcher module 1510 activates the application in response to at least one pre-set event (e.g., a call reception, a message reception, a pressing of a specific button, a specific touch gesture, an arrival of a specific time, a detachment of a stylus, etc.). The application launcher module 1510 deactivates the application in response to the closing of the first cover portion 210 while an extended display mode of the activated application is performed in a state where the first cover portion 210 is open. The cover opening/closing identification module 1520 identifies the opening/closing of the first cover portion 210 by using at least one sensor. The cover identification module 1530 identifies a type of the cover by using cover-related information (e.g., a color of the cover, a location of the window 21, a shape of the window 21, a size of the window 21, etc.) provided from the ID chip module 30 of the cover. The display module 1540 selects a display mode for determining a display area corresponding to the window 21 of the first cover portion 210 in response to the type of the cover. The display module 1540 transitions between display modes of the activated application in response to the opening/closing of the first cover portion 210. For example, the display module 1540 may perform a first display mode which uses a first display area corresponding to the window 21 of the first cover portion 210 in response to the closing of the first cover portion 210. The display module 1540 may perform a second display mode which uses a second display area (e.g., a display area larger than the first display area) different from the first display area in response to the opening of the first cover portion 210. The touch input processing module 1550 controls a display in response to a touch input in the display modes of the activated application. The camera module 1560 acquires an image from the camera.

Figure 16:
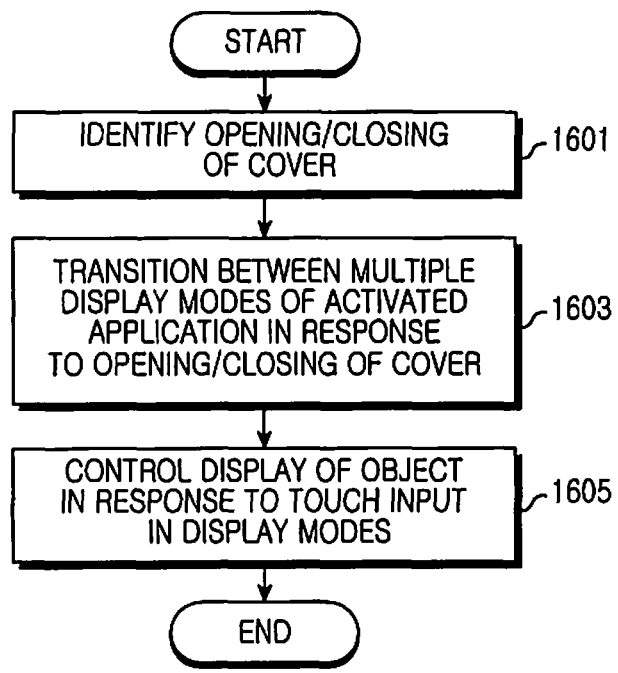
FIG. 16 is a flowchart illustrating a process of displaying an application according to an embodiment of the present invention.

FIG. 16 is a flowchart illustrating a process of displaying an application according to an embodiment of the present invention.

Referring to FIG. 16, in step 1601, the processor 710 (e.g., the cover opening/closing identification module 1520) identifies an opening/closing of the first cover portion 210. In step 1603, the processor 710 (e.g., the display module 1540) transitions between a plurality of display modes of an activated application in response to the opening/closing of the cover (e.g., the first cover portion 210). A first display mode of an application related to the closing of the first cover portion 210 determines a first display area corresponding to an area of the window 21 of the first cover portion 210. A second display mode of an application related to the opening of the first cover portion 210 determines a second display area (e.g., a full area of the touch screen 11) different from the first display area. In step 1605, the processor 710 (e.g., the touch input processing module 1550) controls a display in response to a touch input in display modes of an activated application.

Figure 17:
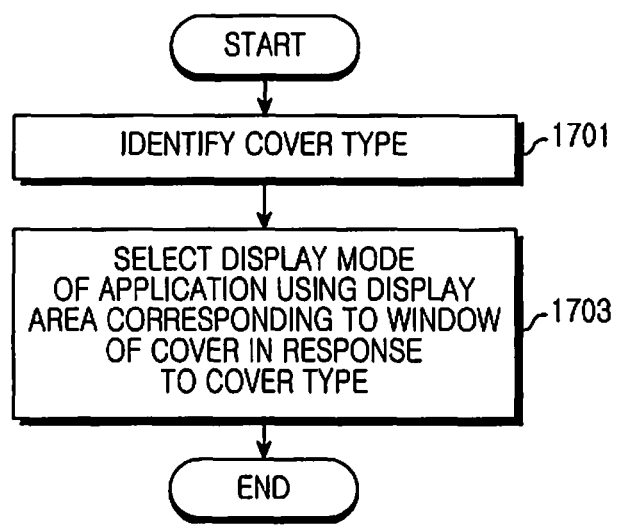
FIG. 17 is a flowchart illustrating a process of selecting a display mode of an application according to an embodiment of the present invention.

FIG. 17 is a flowchart illustrating a process of selecting a display mode of an application according to an embodiment of the present invention.

Referring to FIG. 17, in step 1701, the processor 710 (e.g., the cover identification module 1530) identifies a type of the cover device 200 on the basis of information from the ID chip module 30 of the cover device 200. In step 1703, the processor 710 (e.g., the display module 1540) selects a display mode of an application which uses a display area corresponding to an area of the window 21 of the first cover portion 210 in response to the type of the cover.

Figure 18:
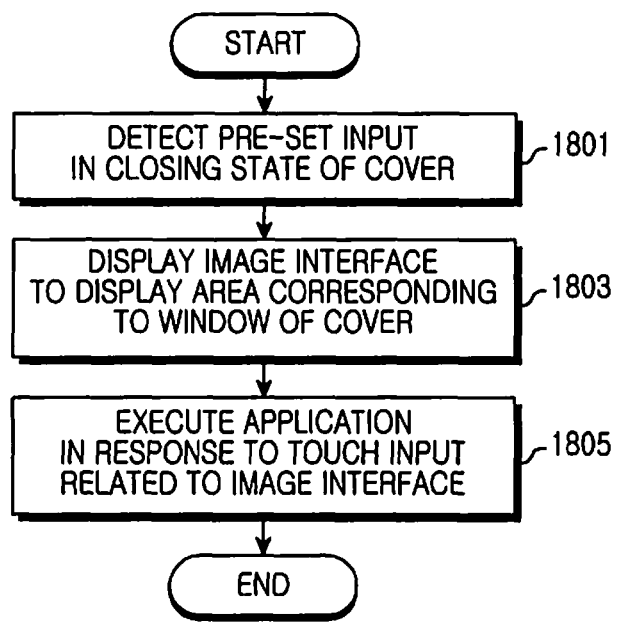
FIG. 18 and FIG. 19 are flowcharts illustrating a process of activating an application according to an embodiment of the present invention.

FIG. 18 is a flowchart illustrating a process of activating an application according to an embodiment of the present invention.

Referring to FIG. 18, in step 1801, the processor 710 (e.g., the application launcher module 1510) detects a pre-set input (e.g., a pressing of the power button 116) in a closing state of the first cover portion 210. In step 1803, the processor 710 (e.g., the application launcher module 1510) displays an image interface to a display area corresponding to the window 21 of the first cover portion 210. In step 1805, the processor 710 (e.g., the application launcher module 1510) activates an application in response to a touch input (e.g., an icon selection, a flicking gesture, etc.) for the image interface.

Figure 19:
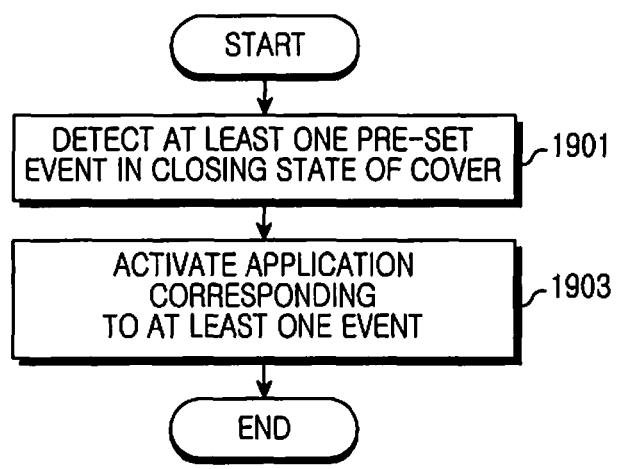

FIG. 19 is a flowchart illustrating a process of activating an application according to an embodiment of the present invention.

Referring to FIG. 19, in step 1901, the processor 710 (e.g., the application launcher module 1510) detects at least one pre-set event (e.g., a call reception, a message reception, a pressing of a specific button, a specific touch gesture, an arrival of a specific time (i.e., an alarm, a wakeup call), a stylus detachment, etc.) in a closing state of the first cover portion 210. In step 1903, the processor 710 (e.g., the application launcher module 1510) activates an application corresponding to the at least one event.

Figure 20:
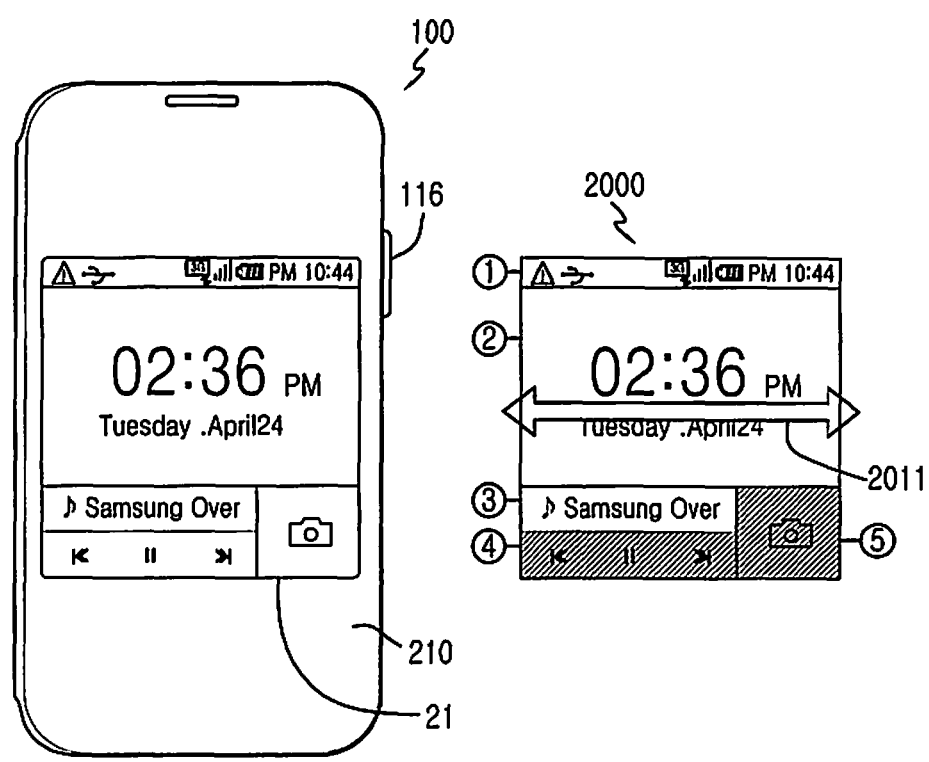
FIG. 20 illustrates a default image interface in a closing state of a cover according to an embodiment of the present invention.

FIG. 20 illustrates a default image interface in a closing state of a cover according to an embodiment of the present invention.

Referring to FIG. 20, when the power button 116 is pressed in a state where the first cover portion 210 is closed, the electronic device 100 displays a default image interface 2000 through a display area of the touch screen 11 corresponding to the window 21 of the first cover portion 210. The default image interface 2000 includes a status bar ①, a time/date ②, a playback list ③, a music control button ④, or a camera button ⑤. The status bar ① includes information related to mail, a Short Message Service (SMS), or a call. The music control button ④ includes a button related to a playback, a pause, a stop, a next song, a previous song, etc. If there is a left or right flicking gesture 2011 by a user in the default image interface 2000, the electronic device 100 activates a specific application, and performs a reduced display mode of the activated application. The reduced display mode of the application displays an image interface to a display area corresponding to the window 21 of the first cover portion 210. If there is a single touch gesture of the user with respect to the camera button ⑤, the electronic device 100 activates a camera application, and performs a reduced display mode of the activated camera application. The reduced display mode of the camera application displays an image interface related to image capturing to a display area corresponding to the window 21 of the first cover portion 210. If there is a single touch gesture of the user with respect to the music control button ④, the electronic device 100 performs a control related to a music playback of a music playback application which is activated (e.g., which operates in a background).

Figure 21:
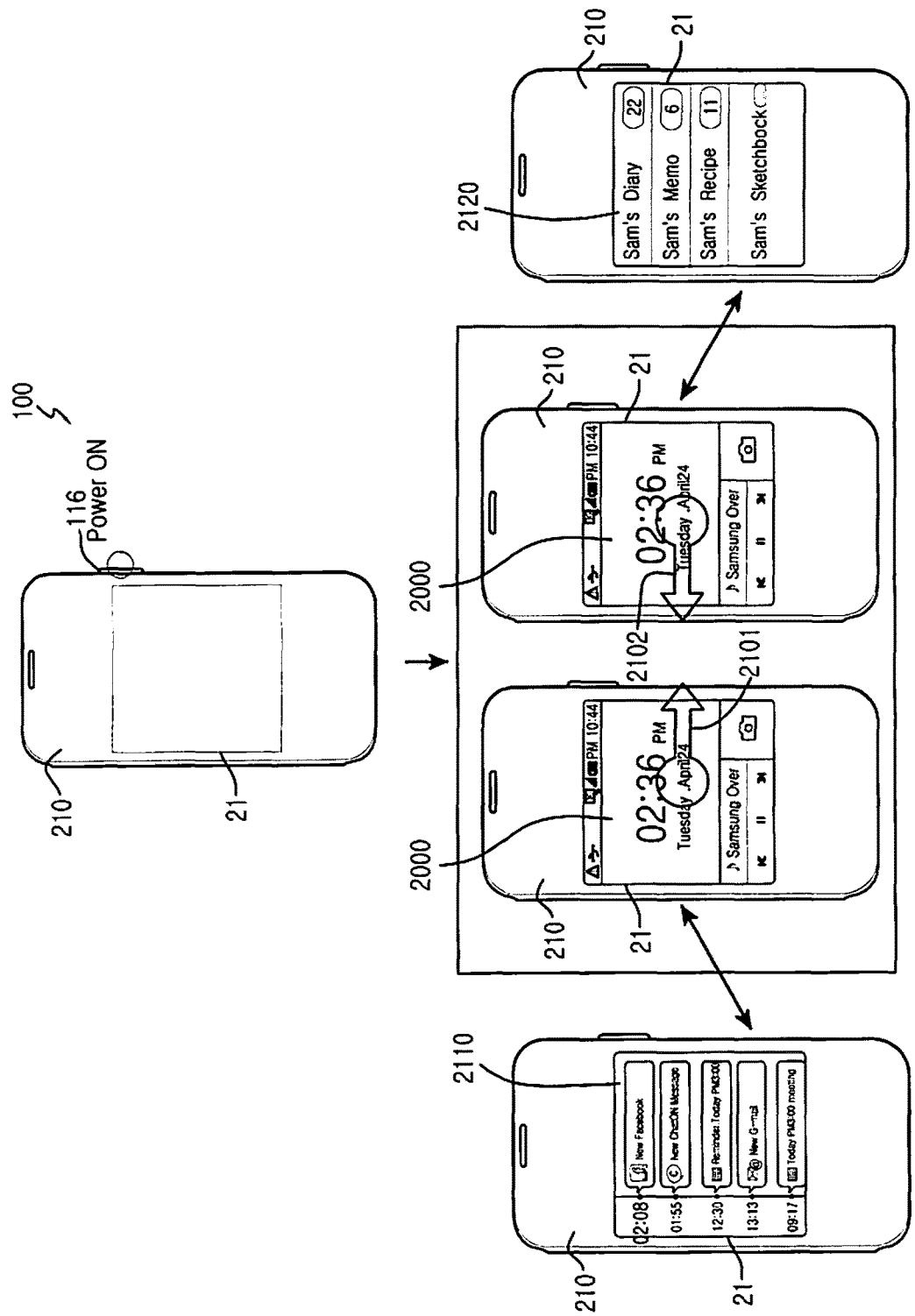
FIG. 21 illustrates a process of executing an application according to an embodiment of the present invention.

FIG. 21 illustrates a process of executing an application according to an embodiment of the present invention.

Referring to FIG. 21, if the power button 116 is pressed in a state where the first cover portion 210 is closed, the electronic device 100 displays the default image interface 2000 through a display area of the touch screen 11 corresponding to the window 21 of the first cover portion 210. If there is a right flicking gesture 2101 by a user in the default image interface 2000, the electronic device 100 transitions to a reduced display mode 2110 of a notice application in the default image interface 2000. If there is a left flicking gesture 2102 by the user in the default image interface 2000, the electronic device 100 transitions to a reduced display mode 2120 of a note application in the default image interface 2000. The reduced display mode 2110 of the notice application displays an image interface including items of various notice types (e.g., a mail, a Social Network Service (SNS) message, a schedule, etc.). The reduced display mode 2120 of the note application displays an image interface including various items for each note.

Figure 22:
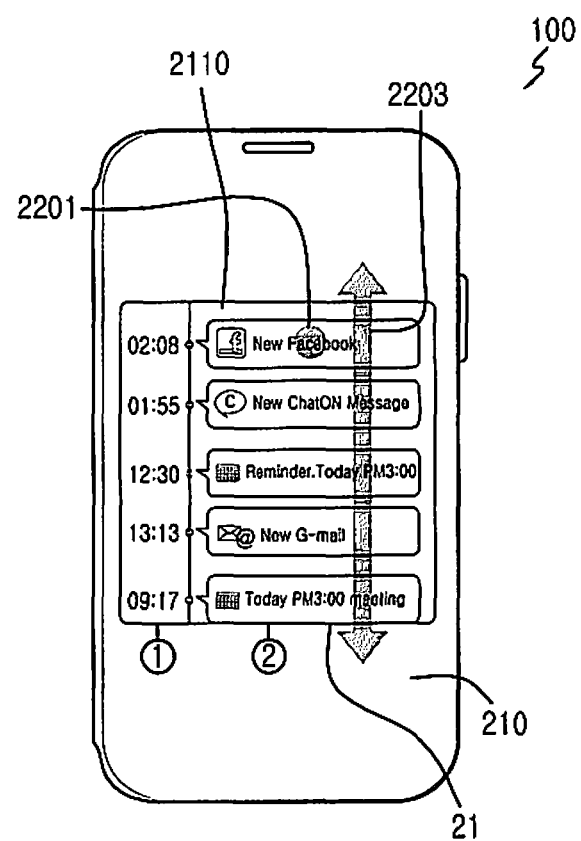
FIG. 22 illustrates a reduced display mode of a notice application according to an embodiment of the present invention.

FIG. 22 illustrates a reduced display mode of a notice application according to an embodiment of the present invention.

Referring to FIG. 22, the reduced display mode 2010 of the notice application displays an image interface including a time line ① and a notice item (or notification) ②. The time line ① may be aligned from up to down according to a time sequence of a notice arrival. The notice item ② may include a type of notice (e.g., an SNS, a Short Message Service (SMS), mail, a reminder, or a call). If a user selects one of the notice items ② by using a single touch gesture 2201, the electronic device 100 displays the content of the selected notice item through a display area corresponding to the window 21 of the first cover portion 210. If the user performs an upward or downward flicking gesture 2203 on the notice item ②, the electronic device 100 scrolls the notice items in an upward or downward direction.

Figure 23A:
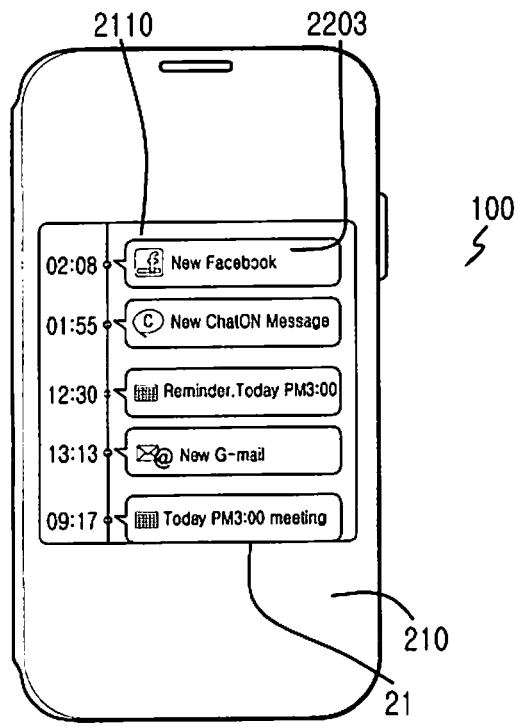
FIGS. 23A to 23B and FIGS. 24A to 24C illustrate display modes of a notice application according to an embodiment of the present invention.
Figure 23B:
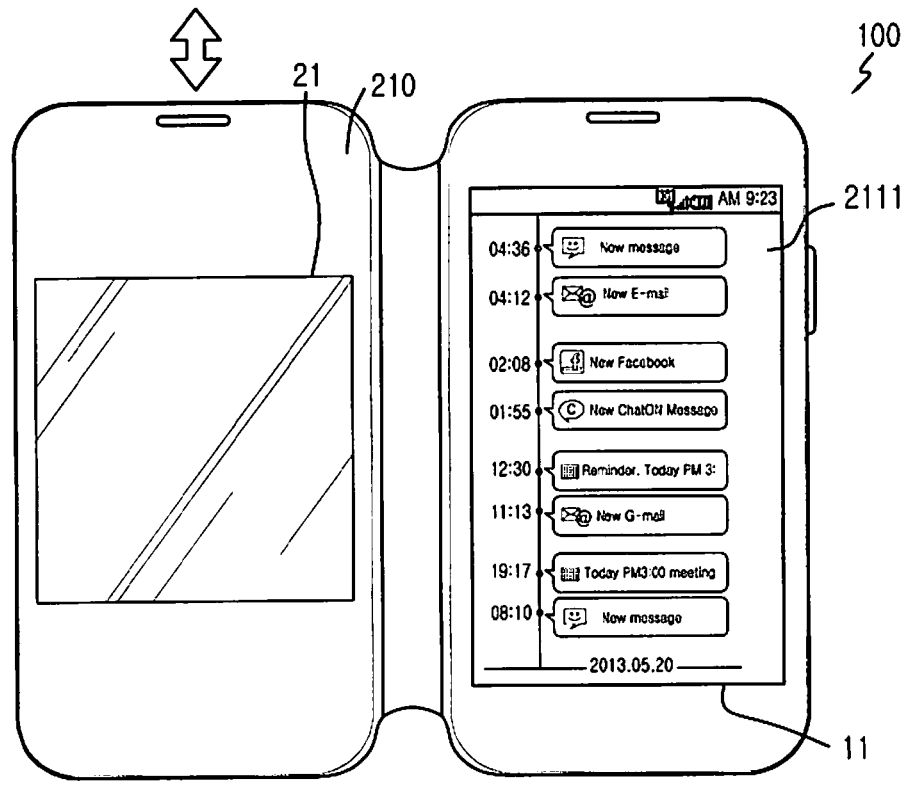

FIGS. 23A to 23B illustrate display modes of a notice application according to an embodiment of the present invention. The electronic device 100 performs a reduced display mode or enlarged display mode of the notice application in response to whether the first cover portion 210 is open or closed.

Referring to FIG. 23A, the electronic device 100 performs a reduced display mode 2110 of the notice application through a display area corresponding to the window 21 of the first cover portion 210 in response to the closing of the first cover portion 210. Referring to FIG. 23B, the electronic device 100 performs an enlarged display mode 2111 of the notice application through a full area of the touch screen 11 of the electronic device 100 in response to the opening of the first cover portion 210. The enlarged display mode 2111 of the notice application displays an image interface including an object and function more extended than the reduced display mode 2010 of the notice application.

Figures 24A, 24B:
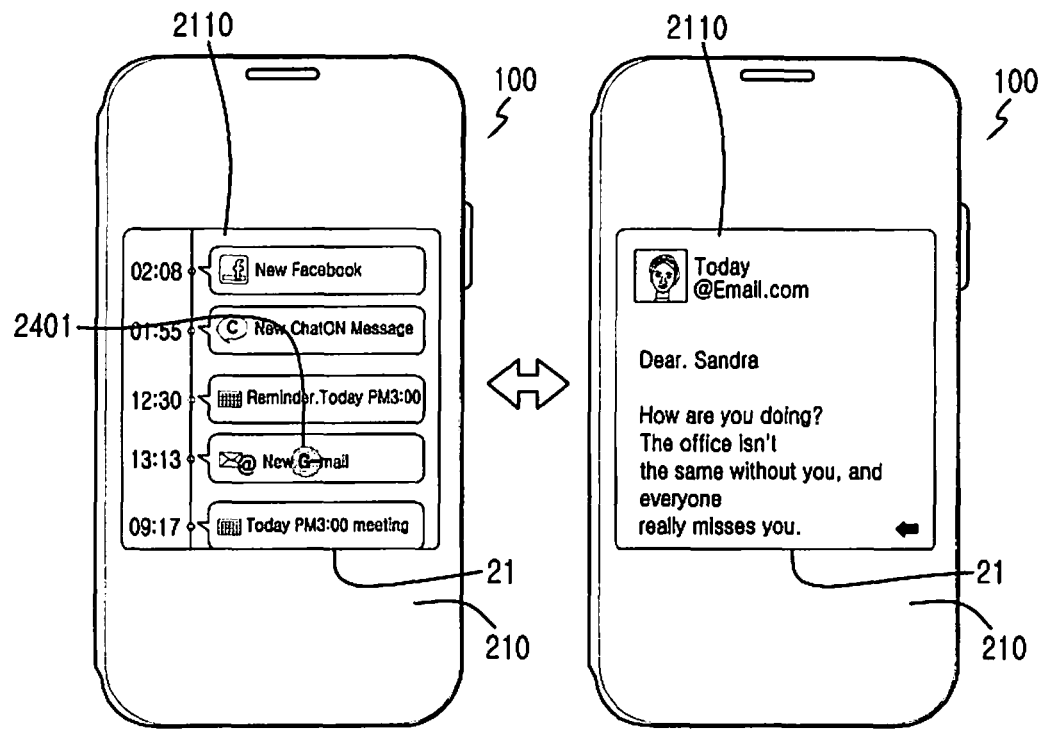
Figure 24C:
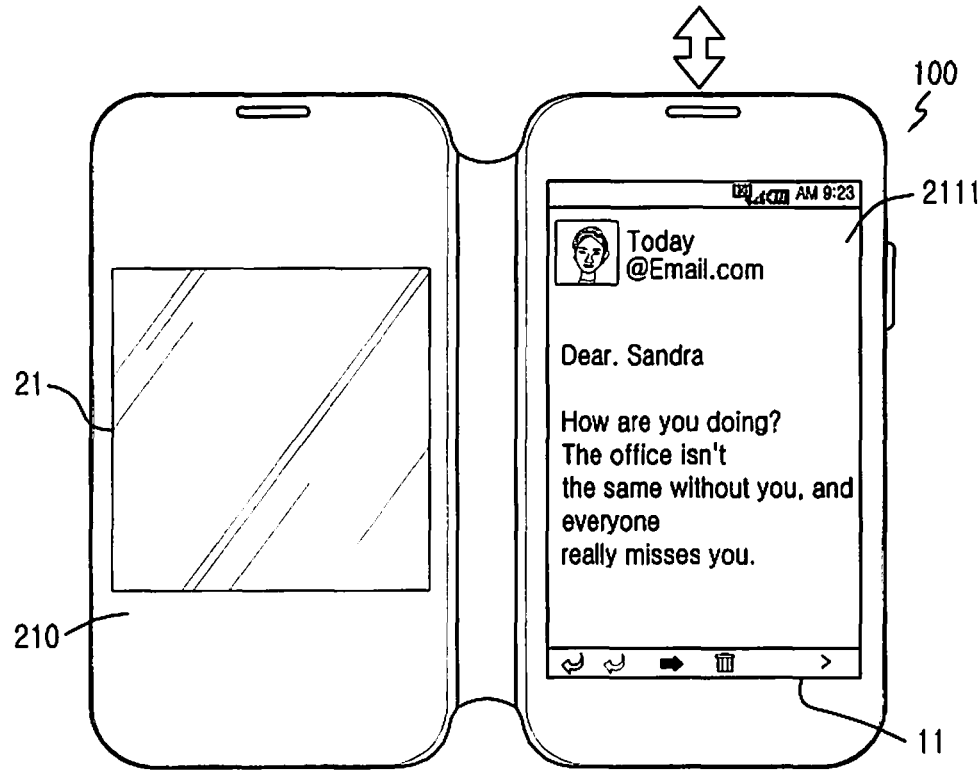

FIGS. 24A to 24C illustrate display modes of a notice application according to an embodiment of the present invention.

Referring to FIG. 24A, the electronic device 100 performs a reduced display mode 2110 of the notice application through a display area corresponding to the window 21 of the first cover portion 210 in response to the closing of the first cover portion 210. If a user selects a notice item 2401 by using a single touch gesture, referring to FIG. 24B, the reduced display mode 2110 displays the content of the selected notice item. Referring to FIG. 24C, the electronic device performs an enlarged display mode 2111 of the notice application in response to the opening of the first cover portion 210, and displays the content of the selected notice item. The enlarged display mode 2111 displays an image interface having a function or object more extended than the reduced display mode 2010.

Figure 25:
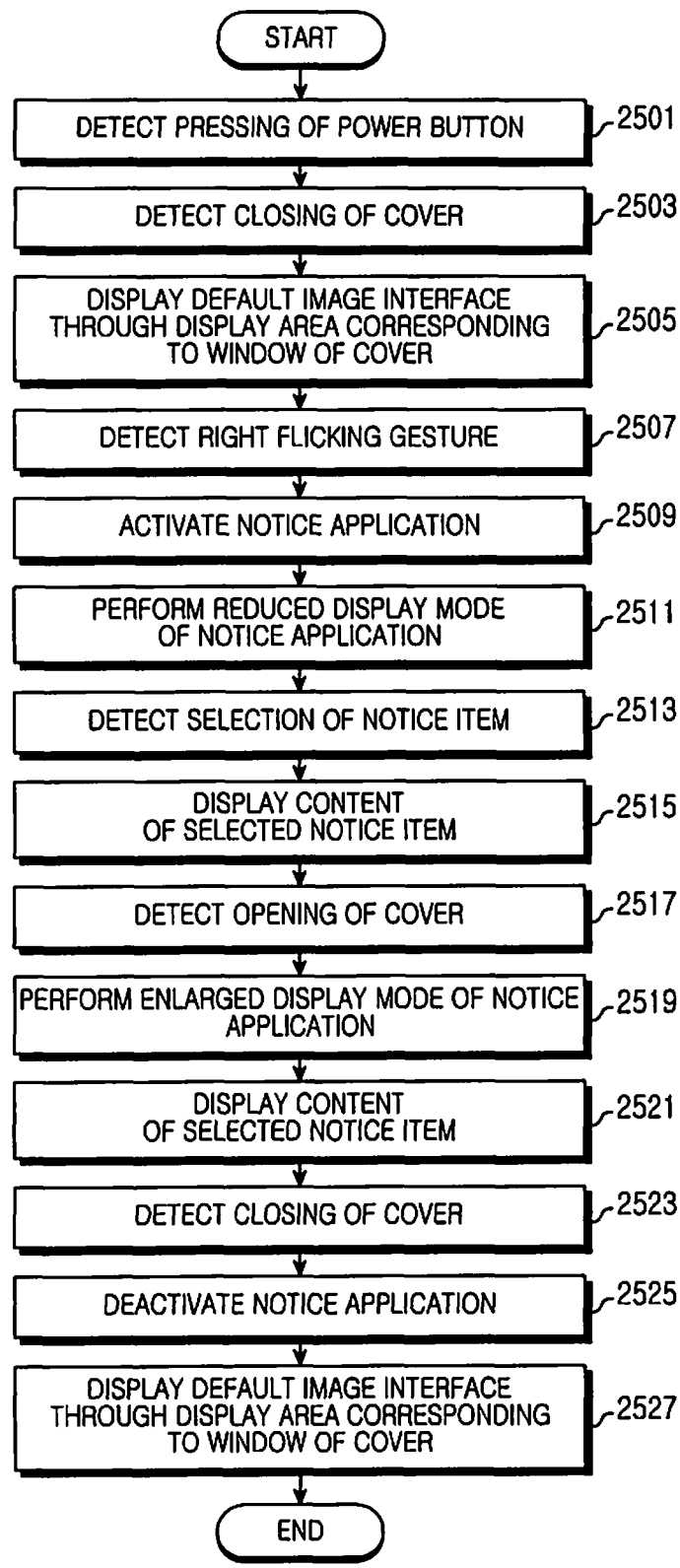
FIG. 25 is a flowchart illustrating a process of displaying a notice application according to various embodiments of the present invention.

FIG. 25 is a flowchart illustrating a process of displaying a notice application according to various embodiments of the present invention.

Referring to FIG. 25, in step 2501, the processor 710 (e.g., the application launcher module 1510) detects a pressing of the power button 116. In step 2503, the processor 710 (e.g., the cover opening/closing identification module 1520) detects a closing of the first cover portion 210. In step 2505, the processor 710 (e.g., the application launcher module 1510) displays the default image interface 2000 through a display area of the touch screen 11 corresponding to the window 21 of the first cover portion 210. In step 2507, the processor 710 (e.g., the application launcher module 1510) detects a right flicking gesture. In step 2509, the processor 710 (e.g., the application launcher module 1510) activates the notice application. In step 2511, the processor 710 (e.g., the display module 1540) performs a reduced display mode of the notice application. In step 2513, the processor 710 (e.g., the touch input processing module 1550) detects a selection of a notice item in the reduced display mode of the notice application. In step 2515, the processor 710 (e.g., the touch input processing module 1550) displays the content of the selected notice item to the reduced display mode of the notice application. In step 2517, the processor 710 (e.g., the cover opening/closing identification module 1520) detects an opening of the cover. In step 2519, the processor 710 (e.g., the display module 1540) performs an enlarged display mode of the notice application. In step 2521, the processor 710 (e.g., the display module 1540) displays the content of the selected notice item in the enlarged display mode of the notice application. In step 2523, the processor 710 (e.g., the cover opening/closing identification module 1520) detects a closing of the first cover portion 210. In step 2525, the processor 710 (e.g., the application launcher module 1510) deactivates the notice application. In step 2527, the processor 710 (e.g., the application launcher module 1510) displays a default image interface through a display area corresponding to the window 21 of the first cover portion 210.

FIGS. 26A to 26F illustrate a process of displaying a notice application of an electronic device according to an embodiment of the present invention.

Referring to FIG. 26A, the electronic device 100 detects a pressing of the power button 116 by a user in a closing state of the first cover portion 210. Referring to FIG. 26B, the electronic device 100 displays the default image interface 2000 through a display area corresponding to the window 21 of the first cover portion 210 in response to the pressing of the power button 116. The electronic device 100 detects a right flicking gesture 2601 in the default image interface 2000. Referring to FIG. 26C, the electronic device 100 activates a notice application in response to the right flicking gesture 2601, and transitions to the reduced display mode 2110 of the activated notice application. The reduced display mode 2110 of the notice application determines a display area corresponding to the window 21 of the first cover portion 210. The reduced display mode 2110 of the notice application scrolls notice items in response to an upward or downward flicking gesture 2603 by the user. Referring to FIG. 26D, the reduced display mode 2110 of the notice application selects a notice item in response to a single touch gesture 2605 by the user. Referring to FIG. 26E, the reduced display mode 2110 of the notice application displays the content of the selected notice item in response to the selection of the notice item. Referring to FIG. 26F, the electronic device 100 detects an opening of the first cover portion 210, and transition from the reduced display mode of the notice application to the enlarged display mode of the notice application. The enlarged display mode 2111 of the notice application determines a full area of the touch screen 11. The enlarged display mode 2111 displays the content of the notice item selected and displayed in the previous reduced display mode 2110. The enlarged display mode 2111 displays an image interface having a function or object more extended than the reduced display mode 2110. The electronic device 100 deactivates the notice application in response to the closing of the first cover portion 210 while performing the enlarged display mode 2111 of the notice application, and displays the default image interface 2000 to a display area corresponding to the window 21 of the first cover portion 210.

Figure 27:
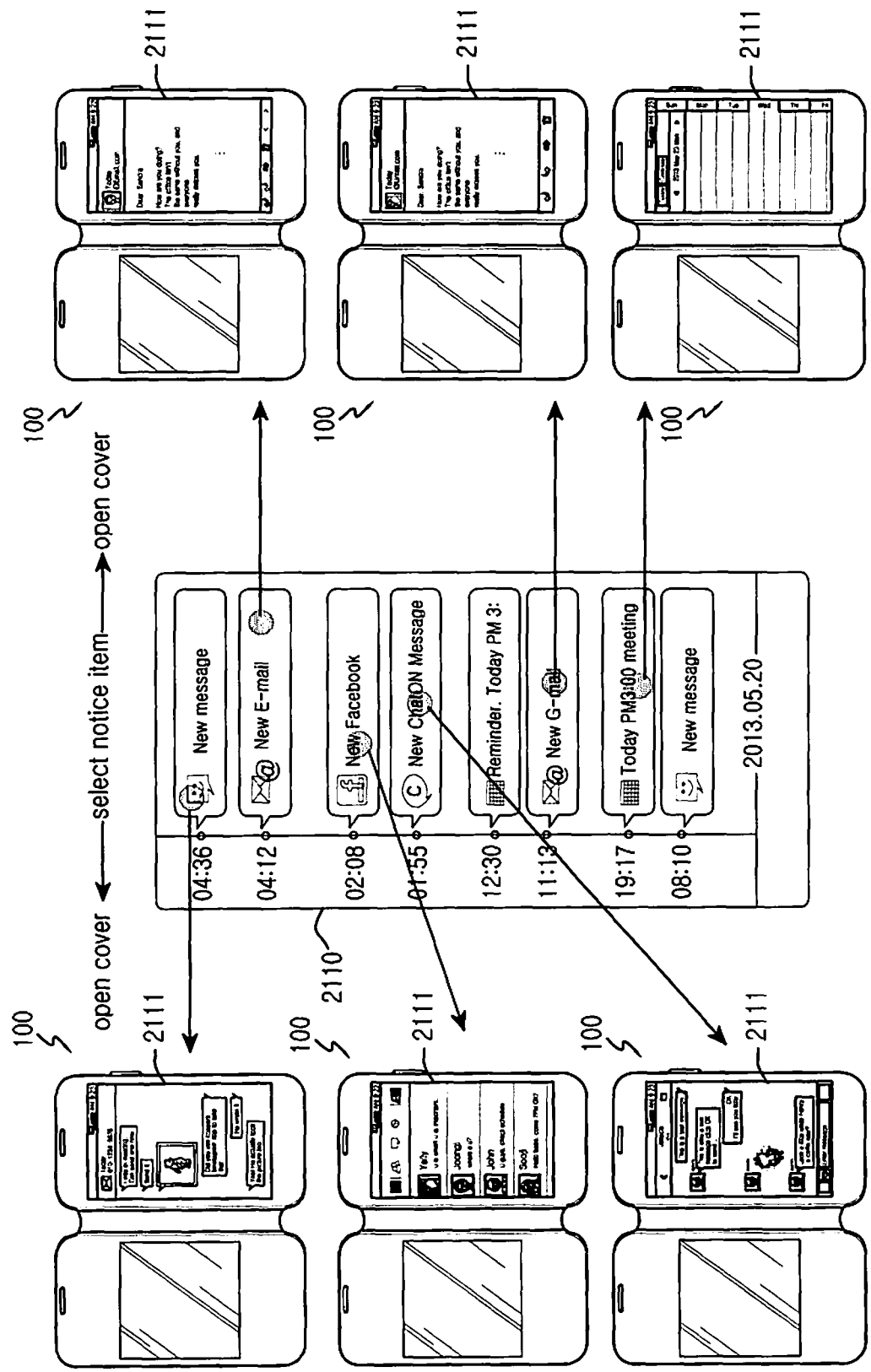
FIG. 27 illustrates an enlarged display mode of a notice application according to an embodiment of the present invention.

FIG. 27 illustrates an enlarged display mode of a notice application according to an embodiment of the present invention.

Referring to FIG. 27, the electronic device 100 performs the reduced display mode 2110 of the notice application in a closing state of the first cover portion 210, and displays an image interface to a display area corresponding to the window 21 of the first cover portion 210. The reduced display mode 2110 of the notice application displays an image interface including various notice items. Although not shown, the reduced display mode 2110 of the notice application displays the content thereof through an image interface conforming to a notice type (e.g., an SNS, an SMS, mail, a reminder, or a call) of a selected notice item in response to a selection of the notice item. When the first cover portion 210 is open, the electronic device 100 transitions to the enlarged display mode 2111 of the notice application which determines a full area of the touch screen 11 and displays the content of the notice item previously selected in the reduced display mode through a suitable image interface.

Figure 28:
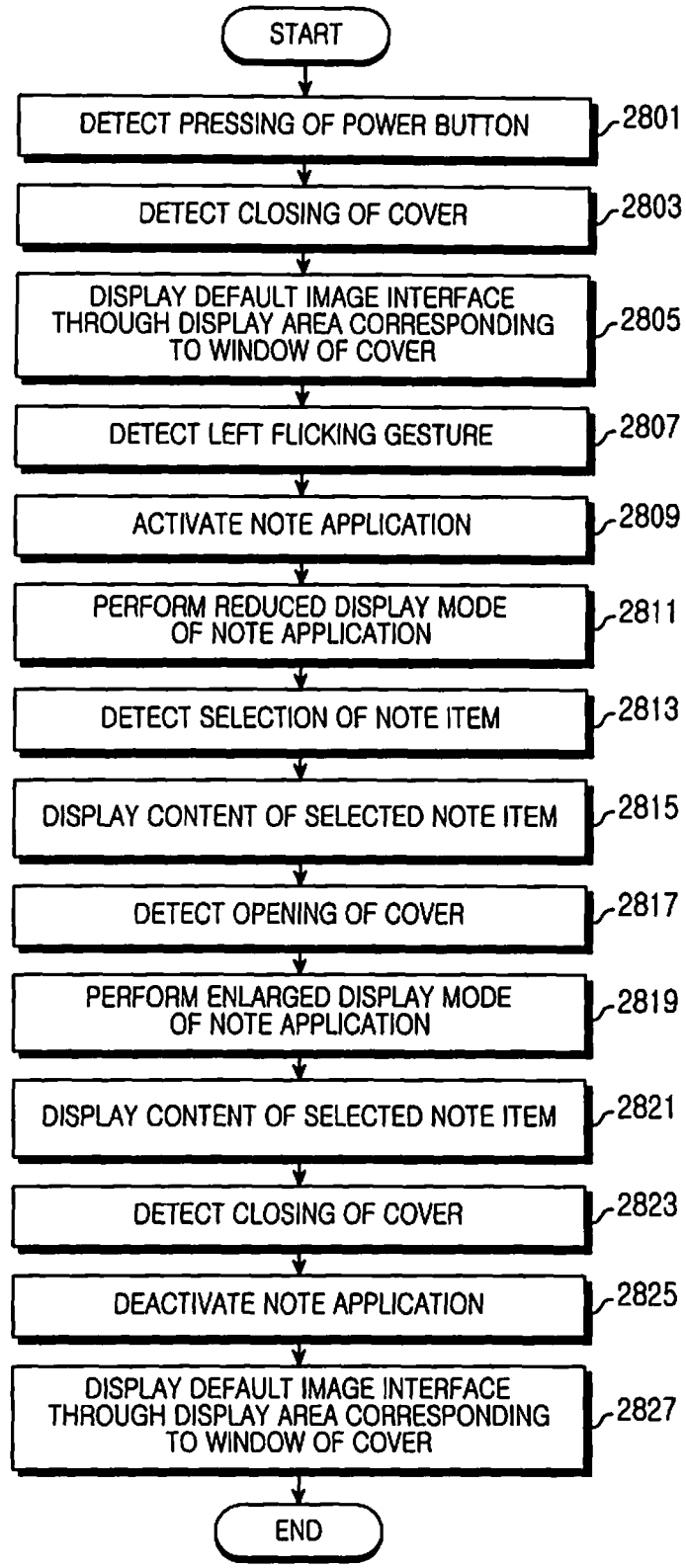
FIG. 28 is a flowchart illustrating a process of displaying a note application according to various embodiments of the present invention.

FIG. 28 is a flowchart illustrating a process of displaying a note application according to various embodiments of the present invention.

Referring to FIG. 28, in step 2801, the processor 710 (e.g., the application launcher module 1510) detects a pressing of the power button 116. In step 2803, the processor 710 (e.g., the cover opening/closing identification module 1520) detects a closing of the first cover portion 210. In step 2805, the processor 710 (e.g., the application launcher module 1510) displays the default image interface 2000 through a display area of the touch screen 11 corresponding to the window 21 of the first cover portion 210. In step 2807, the processor 710 (e.g., the application launcher module 1510) detects a left flicking gesture. In step 2809, the processor 710 (e.g., the application launcher module 1510) activates a note application. In step 2811, the processor 710 (e.g., the display module 1540) performs a reduced display mode of the note application. In step 2813, the processor 710 (e.g., the touch input processing module 1550) detects a selection of a note item in the reduced display mode of the note application. In step 2815, the processor 710 (e.g., the touch input processing module 1550) displays the content of the selected note item to the reduced display mode of the note application. In step 2817, the processor 710 (e.g., the cover opening/closing identification module 1520) detects an opening of the first cover portion 210. In step 2819, the processor 710 (e.g., the display module 1540) performs the enlarged display mode of the note application. In step 2821, the processor 710 (e.g., the display module 1540) displays the content of the selected note item in the enlarged display mode of the note application. In step 2823, the processor 710 (e.g., the cover opening/closing identification module 1520) detects a closing of the first cover portion 210. In step 2825, the processor 710 (e.g., the application launcher module 1510) deactivates the note application. In step 2827, the processor 710 (e.g., the application launcher module 1510) displays a default image interface through a display area corresponding to the window of the first cover portion 210.

FIGS. 29A to 29F illustrate a process of displaying a note application of an electronic device according to an embodiment of the present invention.

Figure 29:
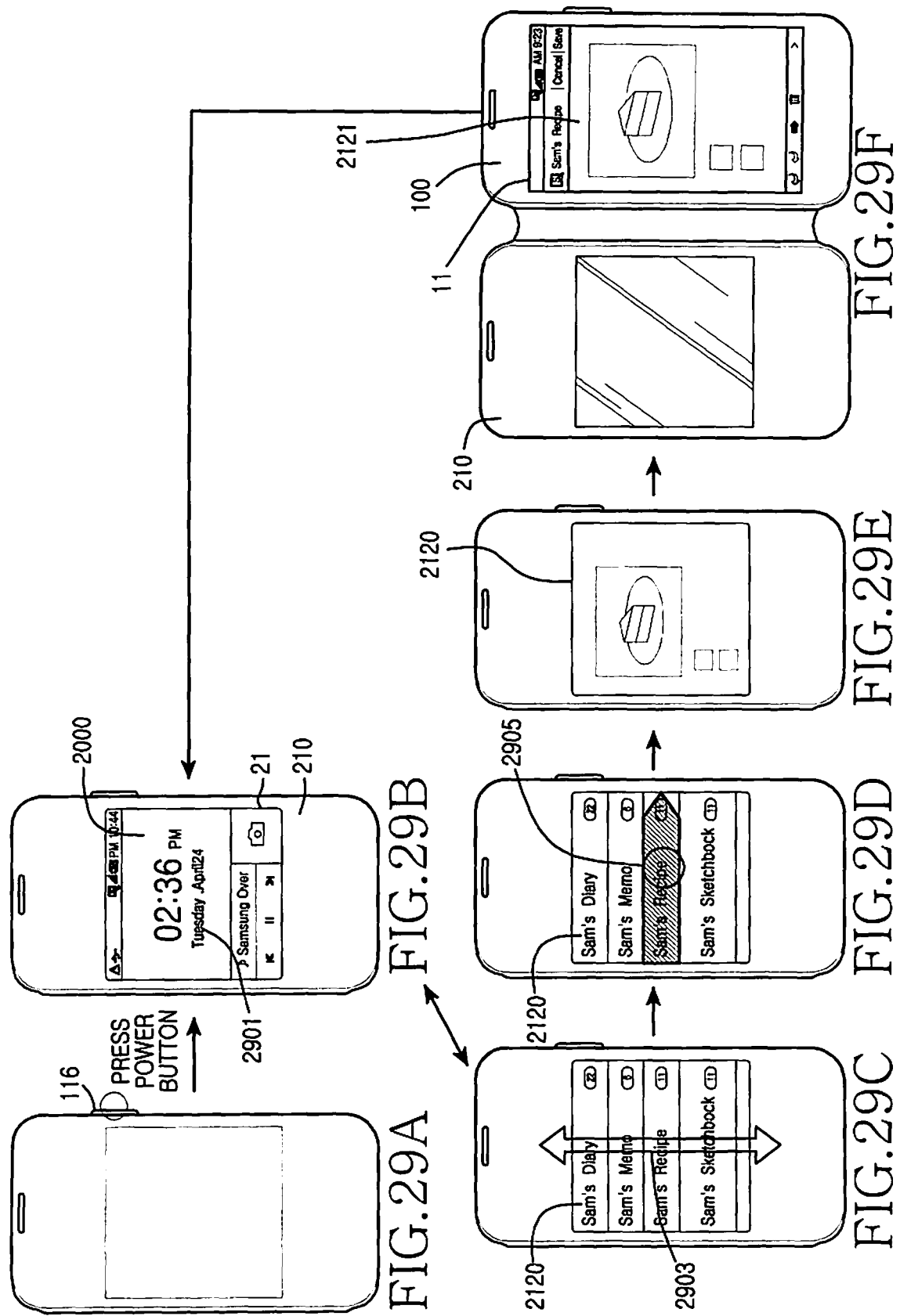
FIGS. 29A to 29F illustrate a process of displaying a note application of an electronic device according to an embodiment of the present invention.

Referring to FIG. 29A, the electronic device 100 detects a pressing of the power button 116 by a user in a closing state of the first cover portion 210. Referring to FIG. 29B, the electronic device 100 displays the default image interface 2000 through a display area corresponding to the window 21 of the first cover portion 210 in response to a pressing of the power button 116 in the closing state of the first cover portion 210. The electronic device 100 detects a left flicking gesture 2901 in the default image interface 2000. Referring to FIG. 29C, the electronic device 100 activates a note application in response to the left flicking gesture 2901, and transitions from the default image interface 2000 to the reduced display mode 2120 of the activated note application. The reduced display mode 2120 of the note application determines a display area corresponding to the window 21 of the first cover portion 210. The reduced display mode 2120 of the note application scrolls note items in response to an upward or downward flicking gesture 2903 by the user. Referring to FIG. 29D, the reduced display mode 2120 of the note application selects a note item in response to a single touch gesture 2905 by the user. Referring to FIG. 29E, the reduced display mode of the note application displays the content of the note item selected in response to the selection of the note item. Referring to FIG. 29F, the electronic device 100 detects an opening of the first cover portion 210, and transitions from the reduced display mode of the note application to the enlarged display mode of the note application. The enlarged display mode 2121 of the note application configures a full area of the touch screen 11. The enlarged display mode 2121 may display the content of the note item selected and displayed in the previous reduced display mode 2120. The enlarged display mode 2121 displays an image interface having a function or object extended from the reduced display mode 2120. The electronic device 100 deactivates a note application in response to the closing of the first cover portion 210 while performing the enlarged display mode 2121 of the note application, and displays the default image interface 2000 to a display area corresponding to the window 21 of the first cover portion 210.

Figure 30:
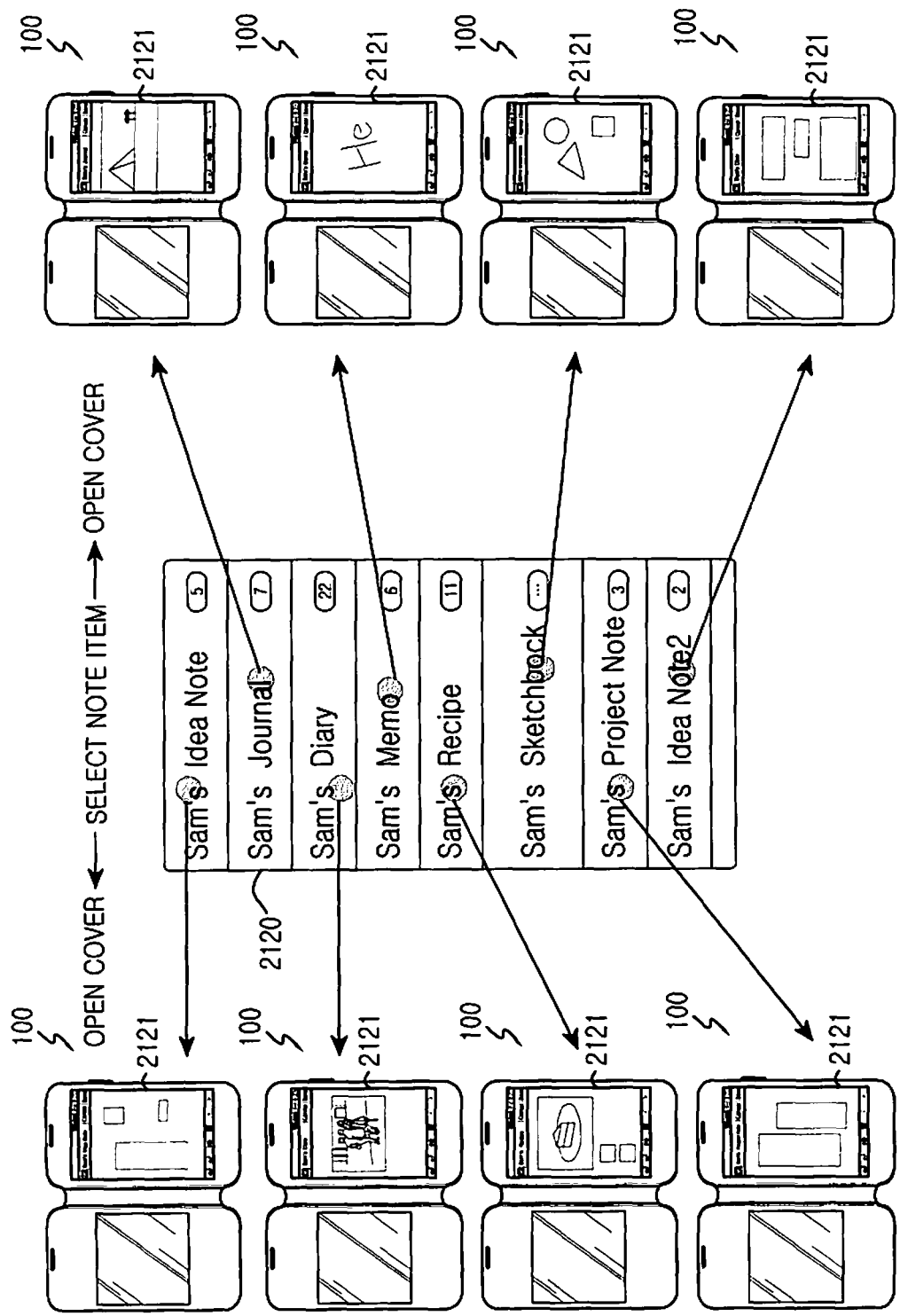
FIG. 30 illustrates an enlarged display mode of a note application according to an embodiment of the present invention.

FIG. 30 illustrates an enlarged display mode of a note application according to an embodiment of the present invention.

Referring to FIG. 30, the electronic device 100 performs the reduced display mode 2120 of the note application in a closing state of the cover 210, and displays an image interface to a display area corresponding to the window 21 of the first cover portion 210. The reduced display mode 2120 of the note application displays an image interface including various note items. Although not shown, the reduced display mode 2120 of the note application display the content thereof through an image interface conforming to a type of the note item selected in response to a selection of a note item. When the first cover portion 210 is open, the electronic device 100 transitions to the enlarged display mode 2121 of the note application which determines a full area of the touch screen 11 and display a content of the note item previously selected in the reduced display mode through a suitable image interface.

Figure 31:
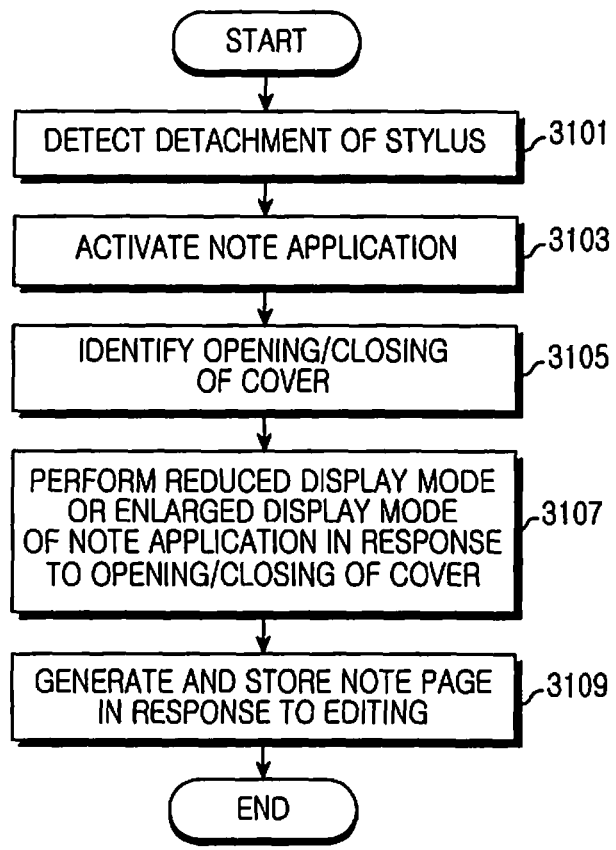
FIG. 31 is a flowchart illustrating a process of displaying a note application according to various embodiments of the present invention.

FIG. 31 is a flowchart illustrating a process of displaying a note application according to various embodiments of the present invention.

Referring to FIG. 31, in step 3101, the processor 710 (e.g., the application launcher module 1510) detects a detachment of the stylus 40. In step 3103, the processor 710 (e.g., the application launcher module 1510) activates the note application. In step 3105, the processor 710 (e.g., the cover opening/closing identification module 1502) identifies an opening/closing of the first cover portion 210. In step 3107, the processor 710 (e.g., the display mode 1540) performs a reduced display mode and enlarged display mode of the note application in response to the opening/closing of the first cover portion 210. In step 3109, the processor 710 (e.g., the touch input processing module 1550) generates and stores a note page in response to editing.

Figure 32:
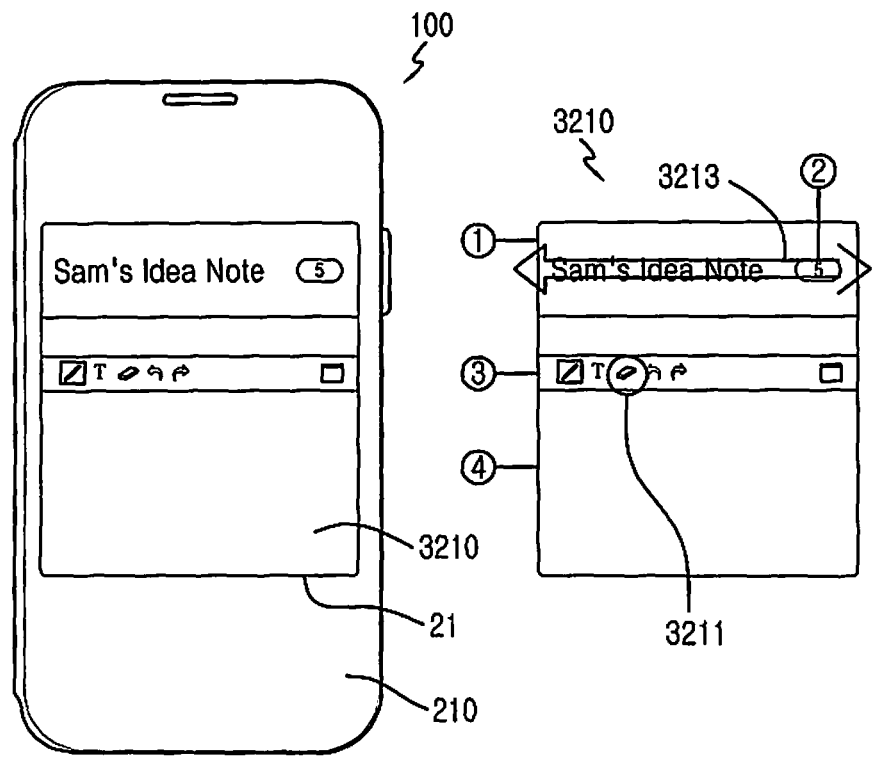
FIG. 32 illustrates a reduced display mode of a note application according to an embodiment of the present invention.

FIG. 32 illustrates a reduced display mode of a note application according to an embodiment of the present invention.

Referring to FIG. 32, the electronic device 100 activates the note application in response to a detachment of the stylus 40 in a closing state of the first cover portion 210, and performs a reduced display mode of the activated note application. The reduced display mode of the note application determines a display area corresponding to the window 21 of the first cover portion 210, and displays an image interface to this area. A reduced display mode 3210 of the note application displays an image interface including a note category ①, a page number ②, a toolbar ③, or a memo page ④. The reduced display mode 3210 of the note application scrolls a type of a note (e.g., an idea note, a diary, a sketch book, a memo, etc.) for storing a memo in response to a left or right flicking gesture 3213 by a user in the note category ①. The page number ② includes a page number stored in the note. The toolbar ③ includes various tools (e.g., a pen, a text, an eraser, a saving, etc.) applied to an editing. In the toolbar ③, a corresponding tool is selected by using a single touch gesture 3211 of the user. The memo page ④ includes an area in which handwriting is possible.

FIGS. 33A to 33E illustrate a reduced display mode of a note application according to an embodiment of the present invention.

Figures 33A, 33B, 33C, 33D, 33E:
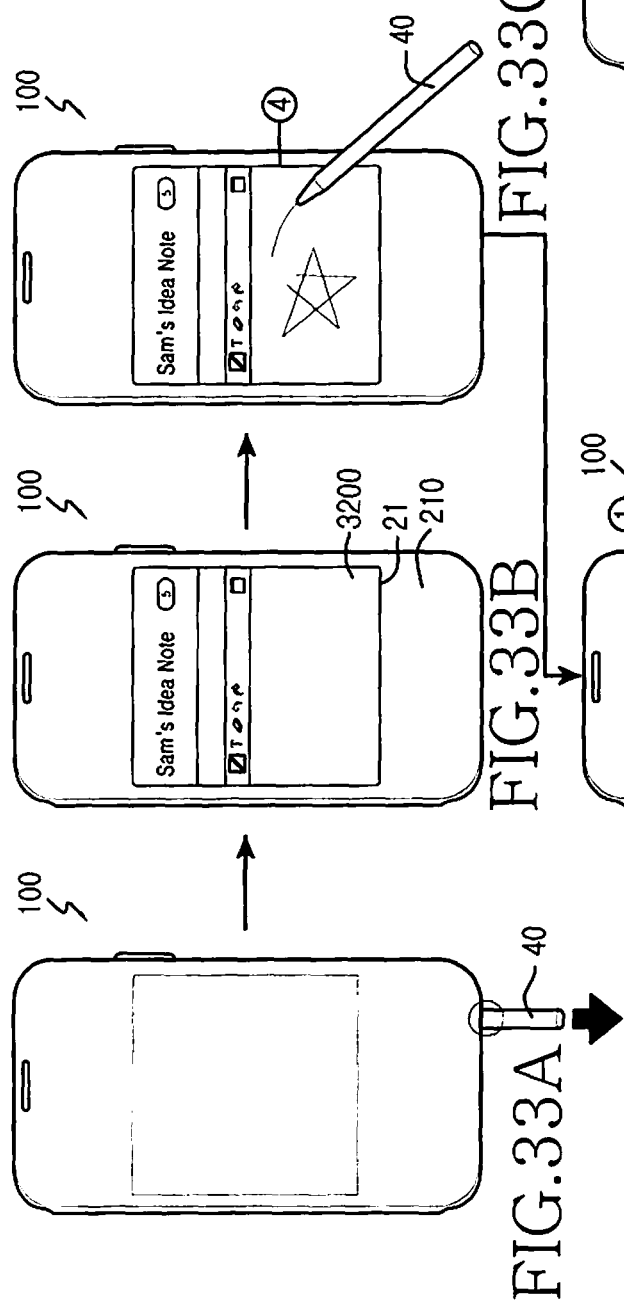
FIGS. 33A to 33E illustrate a reduced display mode of a note application according to an embodiment of the present invention.

Referring to FIG. 33A, the electronic device 100 detects a detachment of the stylus 40 in a closing state of the first cover portion 210. Referring to FIG. 33B, the electronic device 100 activates the note application in response to the detachment of the stylus 40, and performs a reduced display mode 3200 of the activated note application. The reduced display mode 3200 of the note application displays an image interface through a display area corresponding to the window 21 of the first cover portion 210. Referring to FIG. 33C, the reduced display mode 3200 of the note application displays a memo based on a touch gesture in a memo page ④. Referring to FIG. 33D, the reduced display mode 3200 of the note application determines a type of a note for storing a memo in response to a flicking gesture in the note category ①. The reduced display mode 3200 of the note application detects a selection of a saving tool 3301 of the toolbar ③. Referring to FIG. 33E, the reduced display mode 3200 of the note application displays an updated note item.

Figure 34A:
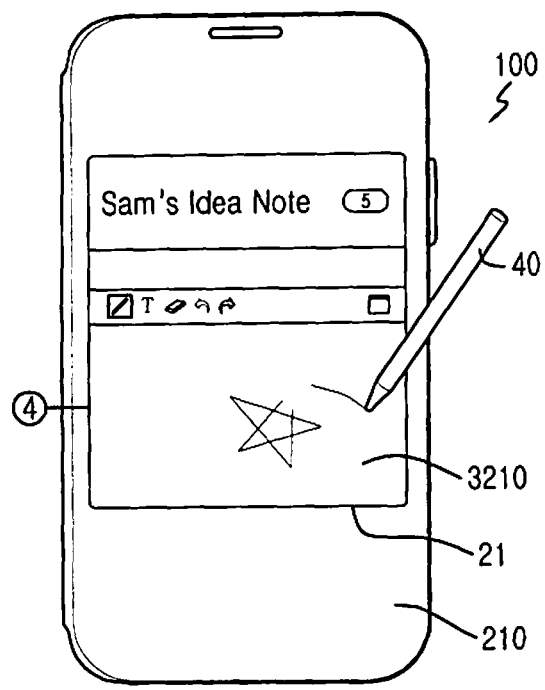
FIGS. 34A to 34B illustrate display modes of a note application according to an embodiment of the present invention.
Figure 34B:
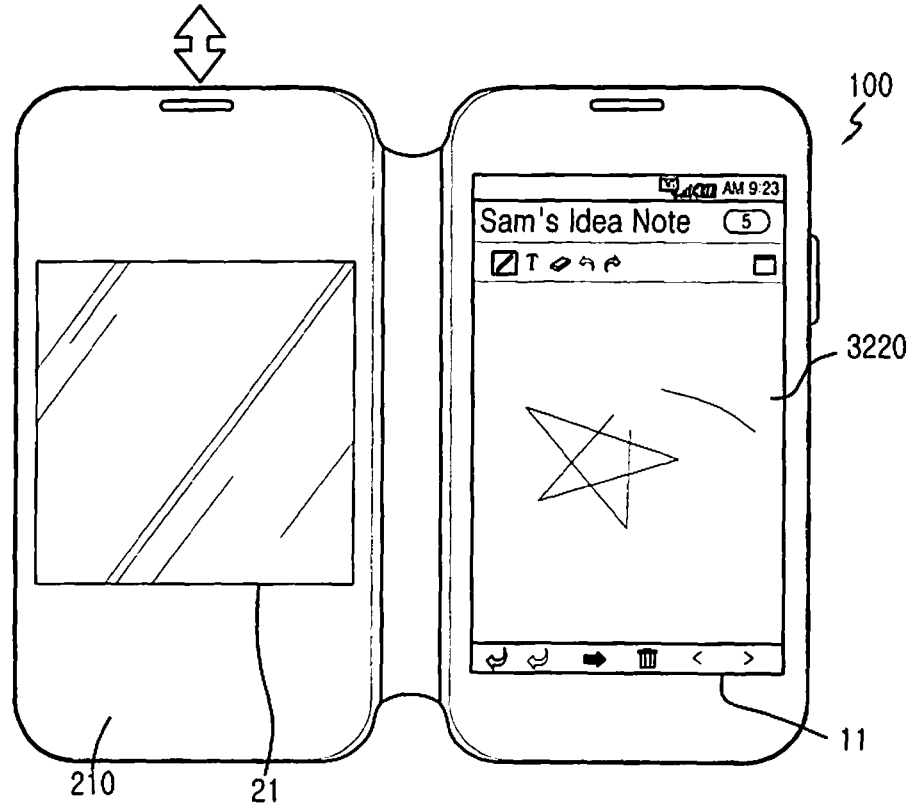

FIGS. 34A to 34B illustrate display modes of a note application according to an embodiment of the present invention.

Referring to FIG. 34A, the electronic device 100 activates the note application in response to a detachment of the stylus 40 in a closing state of the first cover portion 210, and performs a reduced display mode of the activated note application. The reduced display mode 3210 of the note application displays an image interface to a display area corresponding to the window 21 of the first cover portion 210. The reduced display mode 3210 of the note application displays a memo based on a touch gesture in a memo page a Referring to FIG. 34B, when the first cover portion 210 is open, the electronic device 100 transitions from the reduced display mode 3210 of the note application to the enlarged display mode 3220. The enlarged display mode 3220 of the note application displays an image interface including an object and function more extended than the reduced display mode 3210 through a full area of the touch screen 11. The enlarged display mode 3220 of the note application displays an input memo in the reduced display mode 3210.

Figure 35:
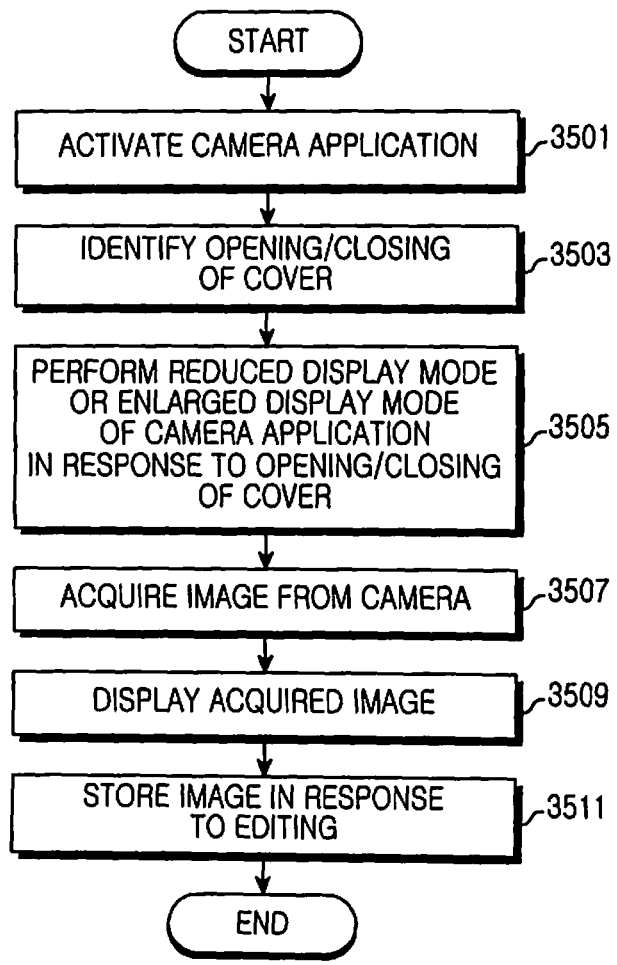
FIG. 35 is a flowchart illustrating a process of displaying a camera application according to various embodiment of the present invention.

FIG. 35 is a flowchart illustrating a process of displaying a camera application according to various embodiment of the present invention.

In step 3501, the processor 710 (e.g., the application launcher module 1510) activates the camera application. In step 3503, the processor 710 (e.g., the cover opening/closing identification module 1520) identifies an opening/closing of the first cover portion 210. In step 3505, the processor 710 (e.g., the display module 1540) performs a reduced display mode or enlarged display mode of the camera application in response to the opening/closing of the first cover portion 210. In step 3507, the processor 710 (e.g., the camera module 1570) acquires an image from a camera. In step 3509, the processor 710 (e.g., the display module 1540) displays the acquired image. In step 3511, the processor 710 (e.g., the touch input processing module 1550) stores the image in response to editing.

Figures 36A, 36B:
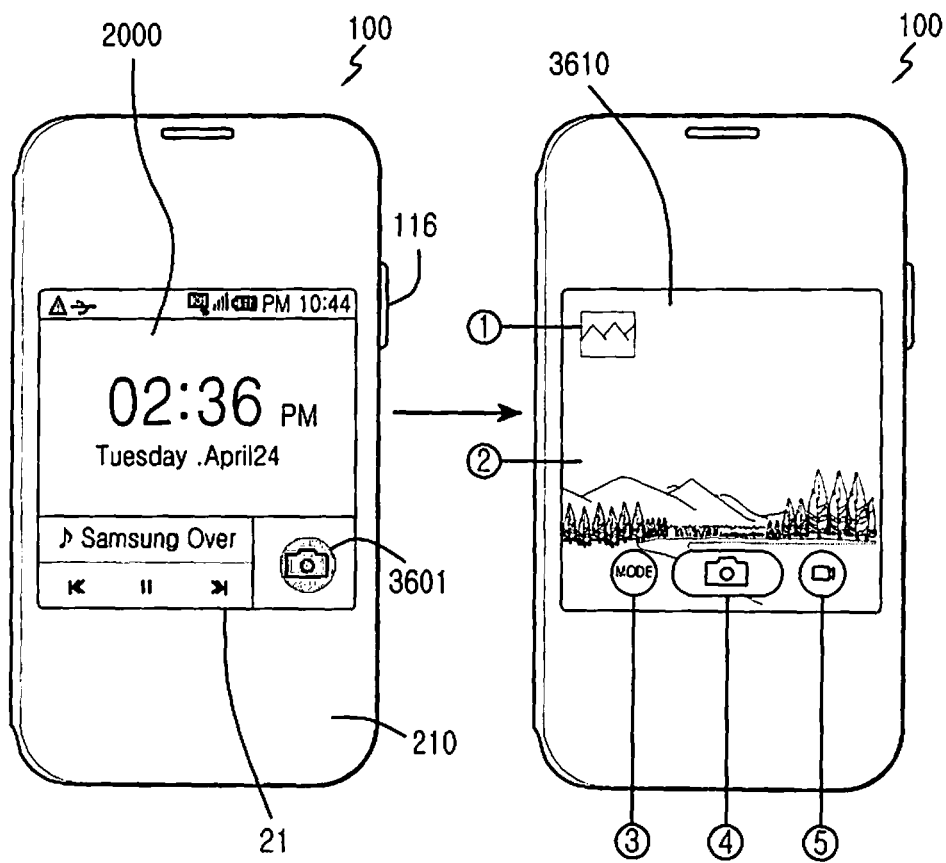
FIGS. 36A to 36B illustrate a reduced display mode of a camera application according to an embodiment of the present invention.

FIGS. 36A to 36B illustrate a reduced display mode of a camera application according to an embodiment of the present invention.

Referring to FIG. 36A, the electronic device 100 displays the default image interface 2000 in a display area corresponding to the window 21 of the first cover portion 210 in response to a pressing of the power button 116 in a closing state of the first cover portion 210. Referring to FIG. 36B, the electronic device 100 activates the camera application in response to a selection of a camera button 3601 of the default image interface 2000, and performs a reduced display mode 3610 of the activated camera application. The reduced display mode 3610 of the camera application displays an image interface through a display area corresponding to the window 21 of the first cover portion 210. The reduced display mode 3610 of the camera application displays an image interface including an album button ①, a view ②, a mode button ③, a shutter button ④, or a movie button ⑤. The reduced display mode 3610 of the camera application displays previously captured images in a form of thumbnails in response to a selection of the album button ① by a user. The reduced display mode 3610 of the camera application displays a preview image or capture image acquired by using the camera through the view ②. The reduced display mode 3610 of the camera application changes a capture mode in response to a selection of the mode button ③ by the user. The reduced display mode 3610 of the camera application captures an image in response to a selection of the shutter button ④ by the user. The reduced display mode 3610 of the camera application captures a video in response to a selection of a movie button ⑤ by the user.

Figure 37A:
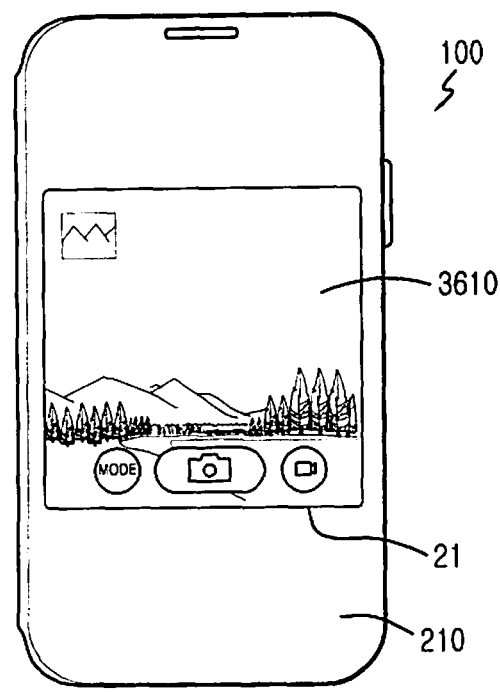
FIGS. 37A to 37B illustrate display modes of a camera application according to an embodiment of the present invention.
Figure 37B:
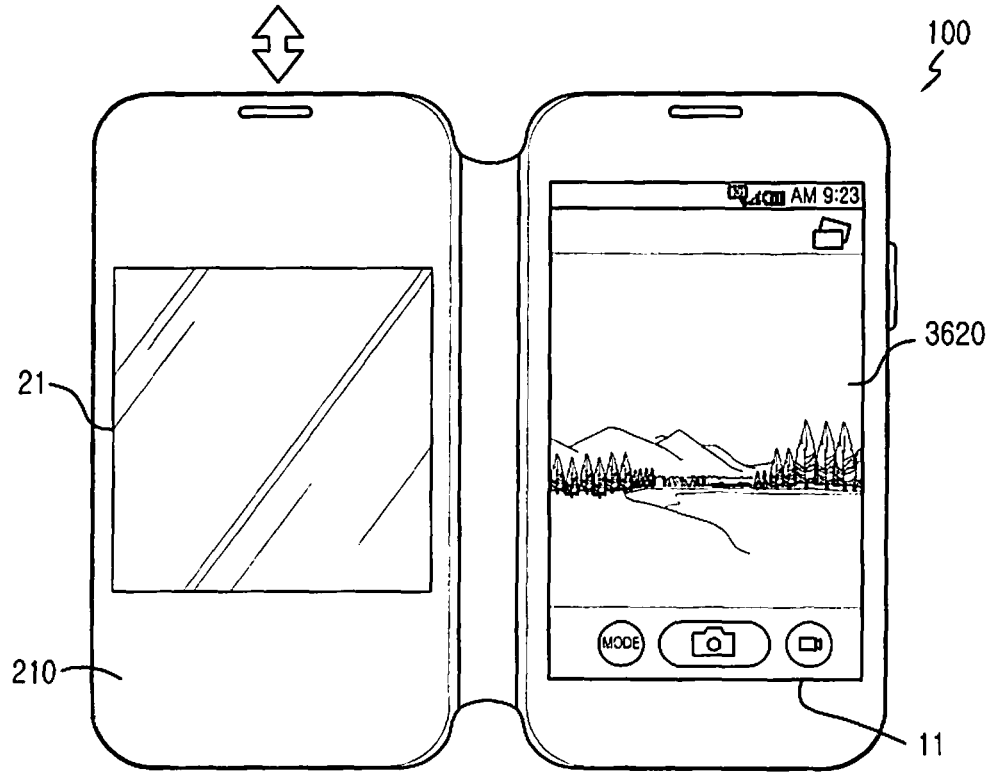

FIGS. 37A to 37B illustrate display modes of a camera application according to an embodiment of the present invention.

Referring to FIG. 37A, the electronic device 100 performs a reduced display mode of the camera application in a state where the first cover portion 210 is closed. The reduced display mode of the camera application displays a preview image or capture image acquired by a camera. Referring to FIG. 37B, when the first cover portion 210 is open, the electronic device 100 transitions from the reduced display mode 3610 of the camera application to the enlarged display mode 3620. The enlarged display mode 3620 of the camera application displays an image interface including an object and function more extended than the reduced display mode 3610 through a full area of the touch screen 11. The enlarged display mode 3620 of the camera application displays a preview image acquired from a camera or an image captured in the reduced display mode 3610.

Figure 38:
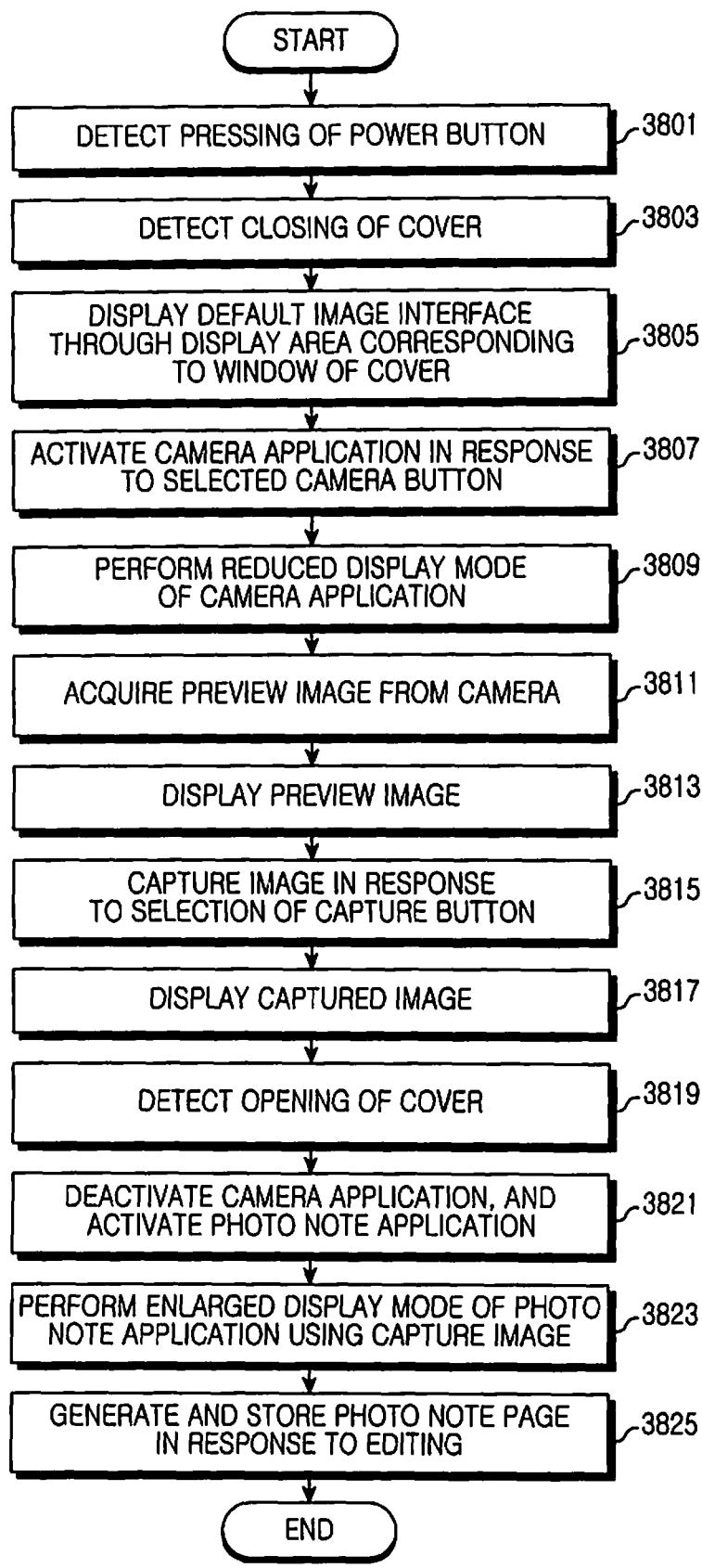
FIG. 38 is a flowchart illustrating a process of displaying a photo note application according to various embodiments of the present invention.

FIG. 38 is a flowchart illustrating a process of displaying a photo note application according to various embodiments of the present invention.

Referring to FIG. 38, in step 3801, the processor 710 (e.g., the application launcher module 1510) detects a pressing of the power button 116. In step 3803, the processor 710 (e.g., the cover opening/closing identification module 1520) detects a closing of the first cover portion 210. In step 3805, the processor 710 (e.g., the application launcher module 1510) displays the default image interface 2000 through a display area corresponding to the window 21 of the first cover portion 210. In step 3807, the processor 710 (e.g., the application launcher module 1510) activates the camera application in response to a selection of a camera button. In step 3809, the processor 710 (e.g., the display module 1540) performs a reduced display mode of the camera application. In step 3811, the processor 710 (e.g., the camera module 1570) acquires a preview image from the camera. In step 3813, the processor 710 (e.g., the display module 1540) displays the preview image in the reduced display mode of the camera application. In step 3815, the processor 710 (e.g., the camera module 1570) captures an image in response to a selection of a capture button. In step 3817, the processor 710 (e.g., the display module 1540) displays an image captured in the reduced display mode of the camera application. In step 3819, the processor 710 (e.g., the cover opening/closing identification module 1520) detects an opening of the first cover portion 210. In step 3821, the processor 710 (e.g., the application launcher module 1510) deactivates the camera application, and activates the photo note application. In step 3823, the processor 710 (e.g., the display module 1540) performs the enlarged display mode of the photo note application which uses the capture image. In step 3825, the processor 710 (e.g., the touch input processing module 1550) generates and stores a photo note page in response to an editing in the enlarged display mode of the photo note application.

Figure 39A:
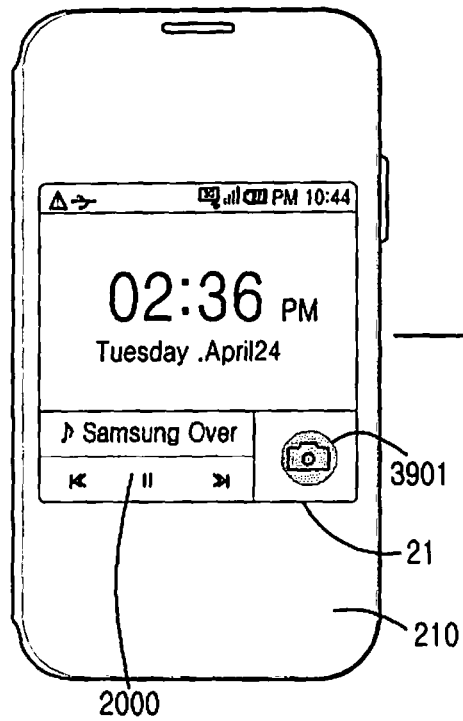
FIGS. 39A to 39C illustrate display modes of a photo note application according to an embodiment of the present invention.
Figure 39B:
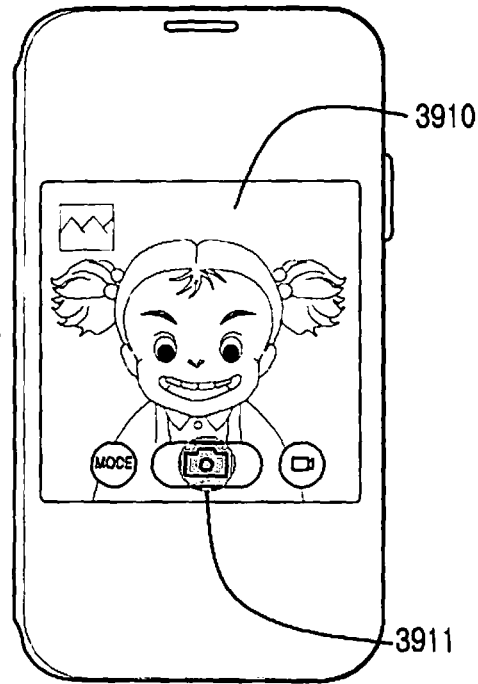
Figure 39C:
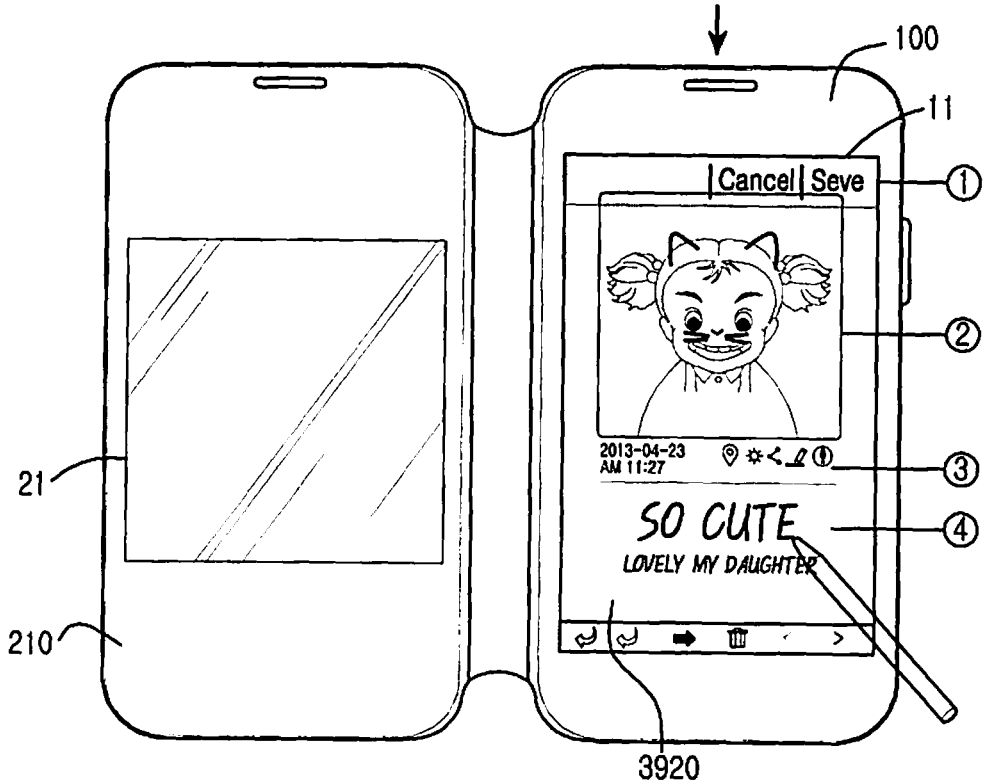

FIGS. 39A to 39C illustrate display modes of a photo note application according to an embodiment of the present invention.

Referring to FIG. 39A, the electronic device 100 displays the default image interface 2000 through a display area corresponding to the window 21 of the first cover portion 210 in response to a pressing of the power button 116 in a closing state of the first cover portion 210. Referring to FIG. 39B, the electronic device 100 activates a camera application in response to a selection of a camera button 3901 by a user in the default image interface 2000, and performs a reduced display mode 3910 of the activated camera application. The reduced display mode 3910 of the camera application displays an image interface to a display area corresponding to the window 21 of the first cover portion 210. The reduced display mode 3910 of the camera application displays a preview image from a camera. The reduced display mode 3910 of the camera application captures an image from the camera in response to a selection of a shutter button 3911 by a user. Referring to FIG. 39C, the electronic device 100 may deactivate the camera application in response to an opening of the first cover portion 210, activates the photo note application, and performs the enlarged display mode 3920 of the photo note application. The enlarged display mode 3920 of the photo note application displays an image interface including a save/cancel button ①, a photo view ②, an information bar ③, or a note page ④ through a full area of the touch screen 11. The enlarged display mode 3920 of the photo note application saves a written note in response to a selection (i.e., a single touch gesture) of the save/cancel button ① by a user. The enlarged display mode 3920 of the photo note application display an image captured in the reduced display mode 3920 of the camera application. The enlarged display mode 3920 of the photo note application displays a capture date, a time, a GPS location, a weather condition, a sharing, a tool, a voice button, a video button, etc., to the information bar ③. The enlarged display mode 3920 of the photo note application displays corresponding information in response to a selection (e.g., a single touch gesture) of a button by the user in the information bar ③. The enlarged display mode 3920 of the photo note application displays a memo based on a touch gesture (e.g., a drag) by the user in the note page ④.

Figure 40:
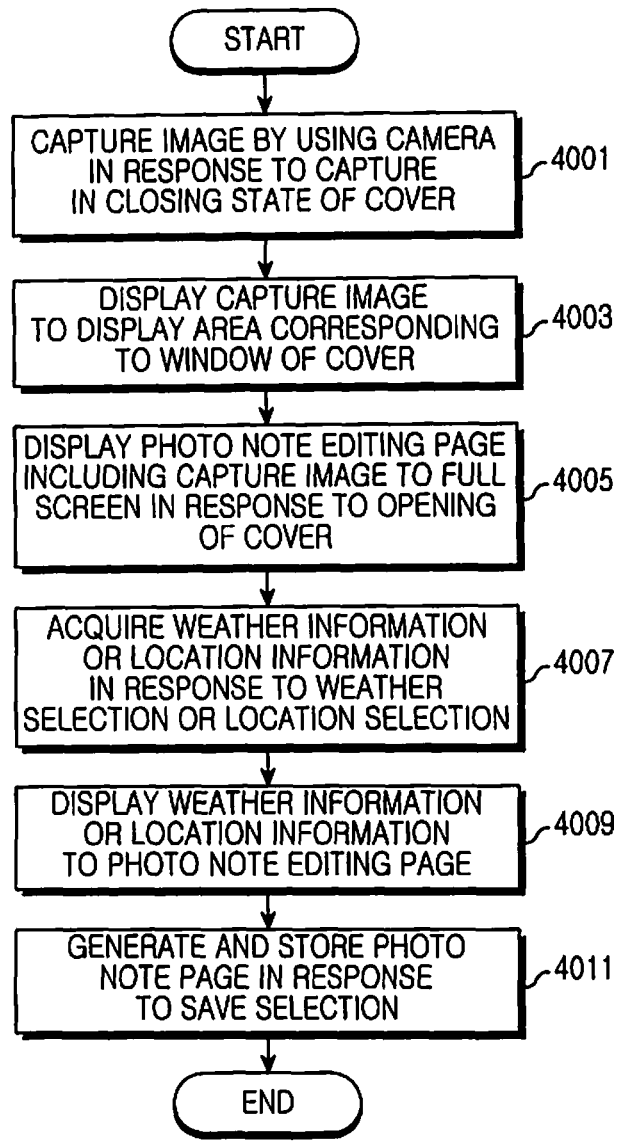
FIG. 40 is a flowchart illustrating a process of generating a photo note page according to various embodiments of the present invention.

FIG. 40 is a flowchart illustrating a process of generating a photo note page according to various embodiments of the present invention.

Referring to FIG. 40, in step 4001, the processor 710 captures an image by using a camera (e.g., the camera module 791) in response to a capture in a closing state of the first cover portion 210. In step 4003, the processor 710 displays the capture image to a display area corresponding to the window 21 of the first cover portion 210. In step 4005, the processor 710 displays a photo editing page including the capture image to a full area of the touch screen 11 in response to an opening of the first cover portion 210. In step 4007, the processor acquires weather information or location information in response to a weather selection or a location selection. In step 4009, the processor 710 displays the weather information or the location information to a photo note editing page. In step 4011, the processor 710 generates and stores the photo note page in response to a save selection.

Figure 41:
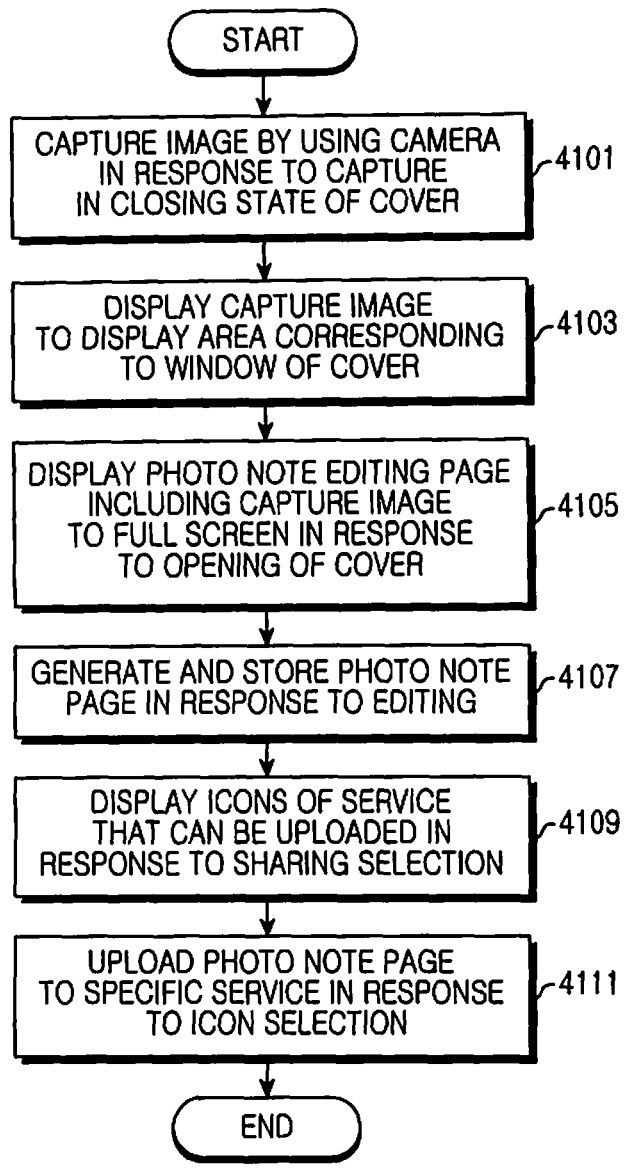
FIG. 41 is a flowchart illustrating a process of generating and sharing a photo note page according to various embodiments of the present invention.

FIG. 41 is a flowchart illustrating a process of generating and sharing a photo note page according to various embodiments of the present invention.

Referring to FIG. 41, in step 4101, the processor 710 captures an image by using a camera (e.g., the camera module 791) in response to a capture in a closing state of the first cover portion 210. In step 4103, the processor 710 displays the capture image to a display area corresponding to the window 21 of the first cover portion 210. In step 4105, the processor 710 displays a photo note editing page including the capture image to a full area of the touch screen 11 in response to an opening of the first cover portion 210. In step 4107, the processor 710 generates and stores a photo note page in response to an editing. In step 4109, the processor 710 displays icons of a service that are uploaded, in response to a sharing selection. In step 4111, the processor 710 updates the photo note page to a specific service in response to an icon selection.

FIGS. 42A to 42D illustrate a photo note editing page according to an embodiment of the present invention. A photo note editing page 4200 displays an image interface including an image captured by using a camera and a button related to various functions.

Figure 42A:
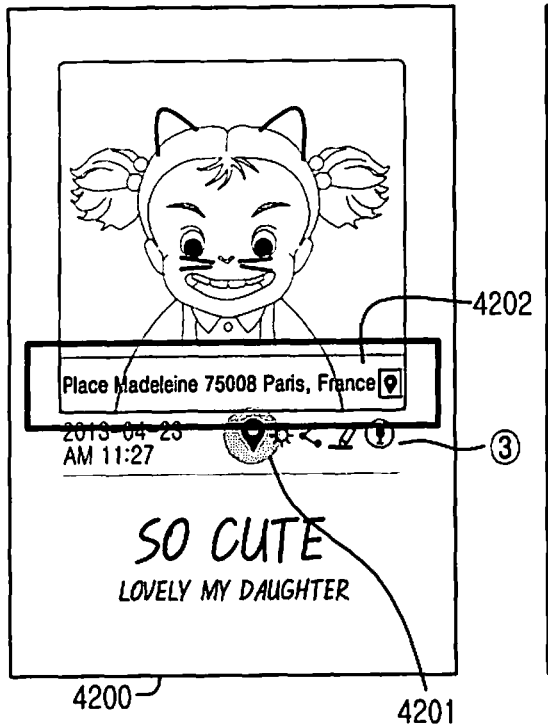
FIGS. 42A to 42D illustrate a photo note editing page according to an embodiment of the present invention.
Figure 42B:
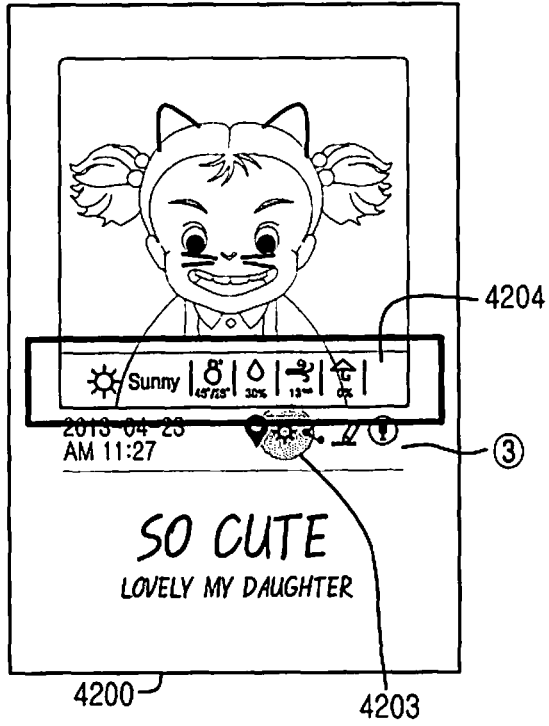
Figure 42C:
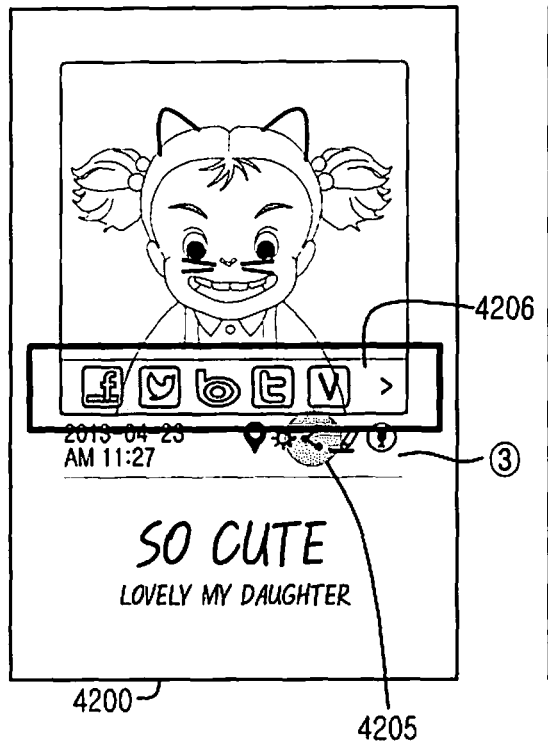
Figure 42D:
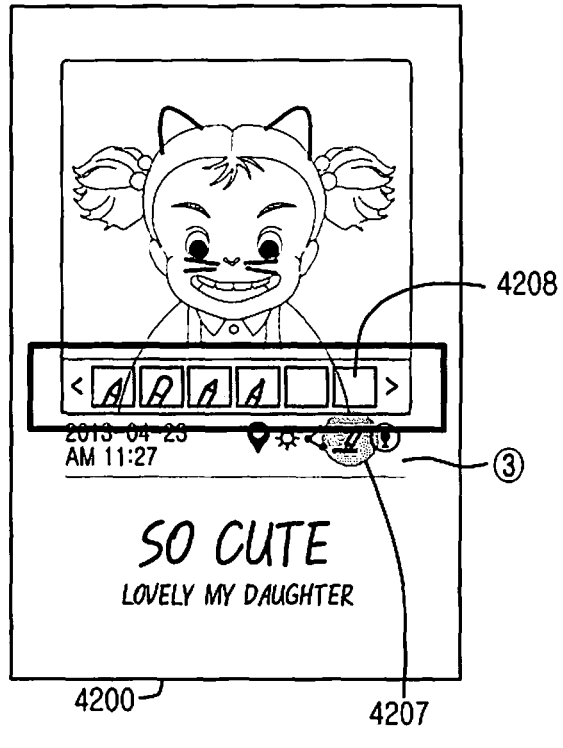

Referring to FIG. 42A, a photo note editing page 4200 displays location information 4202 such as a place, address, etc., of a current time or an image capturing time in response to a selection of a map icon 4201 of an information bar ③ by a user. Referring to FIG. 42B, the photo note editing page 4200 displays weather information 4204 of a current time or an image capturing time in response to a selection of a weather icon 4203 of the information bar ③ by the user. Referring to FIG. 42C, the photo note editing page 4200 displays icons 4206 of a service that are uploaded to an SNS in response to a selection of a sharing icon 4205 of the information bar ③ by the user. Referring to FIG. 42D, the photo note editing page 4200 displays a tool 4208 such as a brush type, color picker, or the like related to the stylus 40 in response to a selection of a tool 4207 of the information bar ③ by the user.

FIGS. 43A to 43C illustrate a process of sharing a photo note page according to an embodiment of the present invention.

Referring to FIG. 43A, a photo note page 4300 displays icons 4303 of a service that are uploaded in response to a selection of a sharing button 4301 by a user. Referring to FIG. 43C, the photo note page 4300 displays transmission information 4305 (e.g., a recipient address, etc.). The photo note page 4300 is updated to a corresponding service (e.g., Facebook®) in response to a transmission selection by a user (e.g., a single touch gesture 4307 for a captured image).

Figure 44:
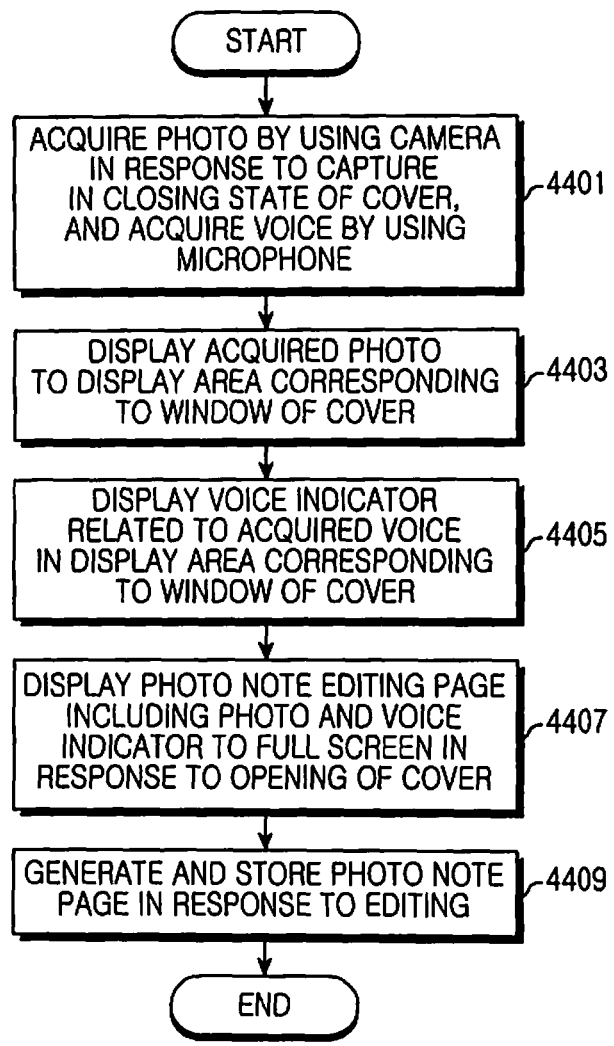
FIG. 44 is a flowchart illustrating a process of generating and storing a photo note page according to various embodiments of the present invention.

FIG. 44 is a flowchart illustrating a process of generating and storing a photo note page according to various embodiments of the present invention.

Referring to FIG. 44, in step 4401, the processor 710 acquires a photo by using a camera in response to a capture in a closing state of the first cover portion 210, and acquires a voice by using a microphone. In step 4403, the processor 710 displays the acquired photo to a display area corresponding to the window 21 of the first cover portion 210. In step 4405, the processor 710 displays a voice indicator related to the acquired voice in a display area corresponding to the window 21 of the first cover portion 210. The voice indicator includes voice-related information and an object related to a voice playback. In step 4407, the processor 710 displays a photo note editing page including the photo and the voice indicator to a full area of the touch screen 11 in response to an opening of the first cover portion 210. In step 4409, the processor 710 generates and stores the photo note page in response to an editing.

Figure 45:
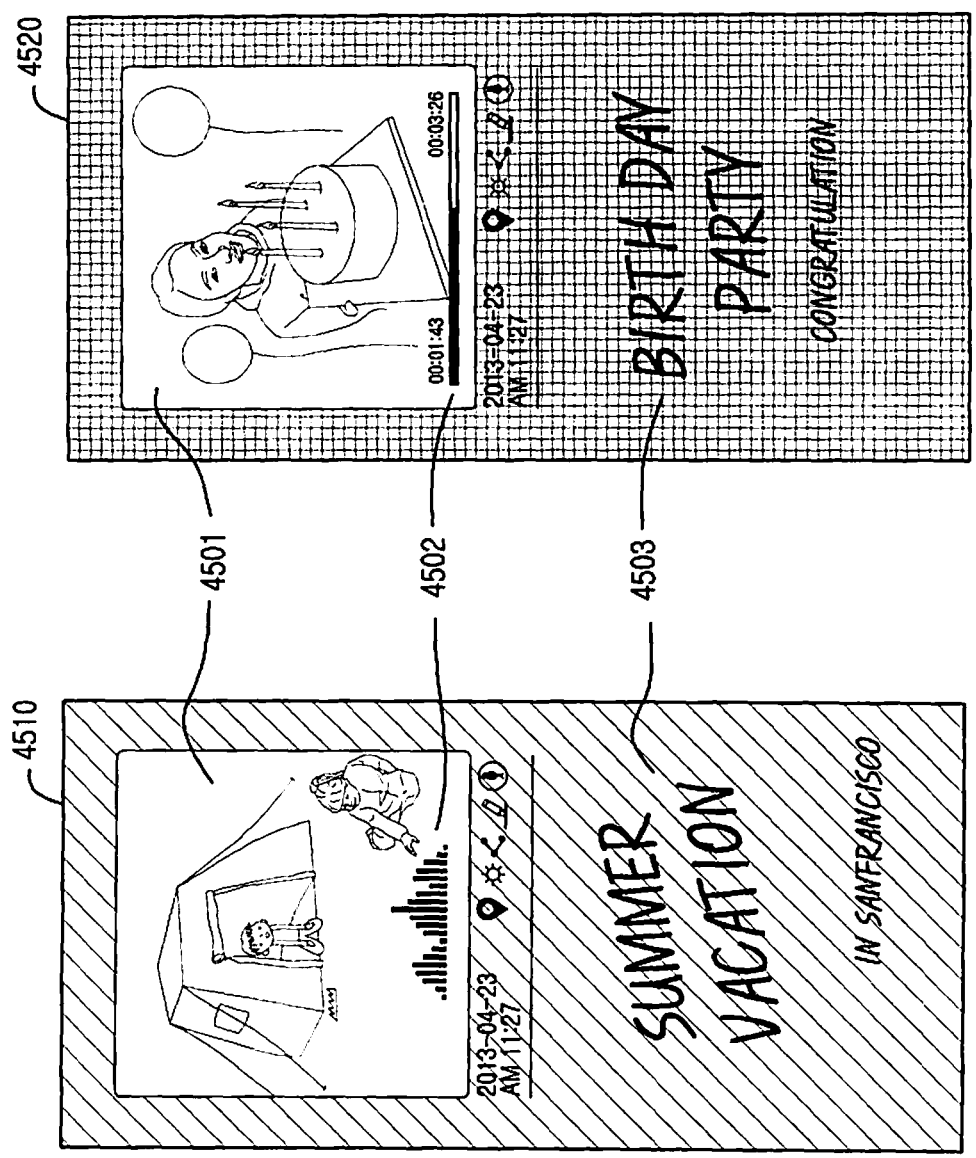
FIG. 45 illustrates a photo note page according to an embodiment of the present invention.

FIG. 45 illustrates a photo note page according to an embodiment of the present invention.

Referring to FIG. 45, a photo note page 4500 includes a photo 4501, a voice indicator 4502, and a memo 4503.

Figure 46:
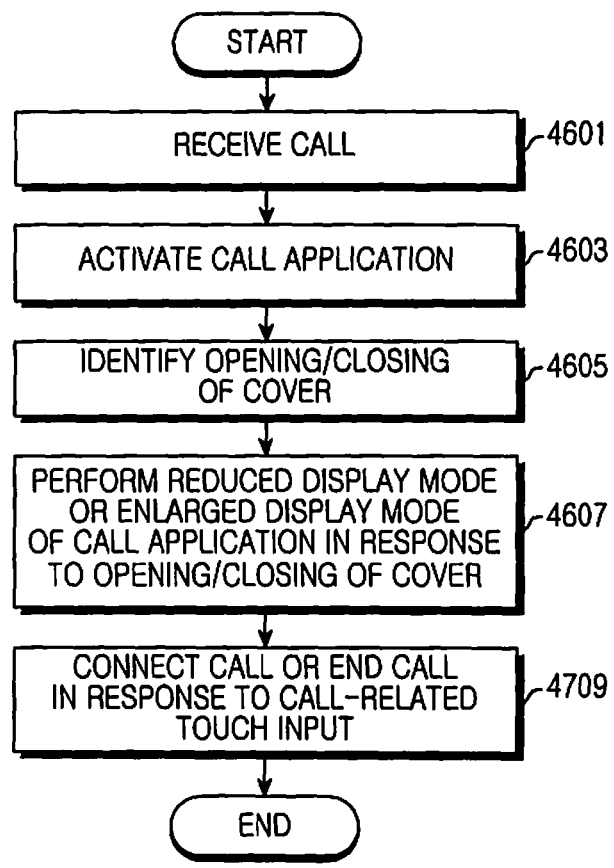
FIG. 46 is a flowchart illustrating a process of displaying a call application according to various embodiments of the present invention.

FIG. 46 is a flowchart illustrating a process of displaying a call application according to various embodiments of the present invention.

Referring to FIG. 46, in step 4601, the processor 710 (e.g., the application launcher module 1510) detects a call reception. In step 4603, the processor 710 (e.g., the application launcher module 1510) activates the call application. In step 4605, the processor 710 (e.g., the cover opening/closing identification module 1520) identifies an opening/closing of the first cover portion 210. In step 4607, the processor 710 (e.g., the display module 1540) performs a reduced display mode or enlarged display mode of the call application in response to the opening/closing of the first cover portion 210. In step 4609, the processor 710 (e.g., the touch input processing module 1550) connects a call or may end the call in response to a call-related touch input.

Figure 47A:
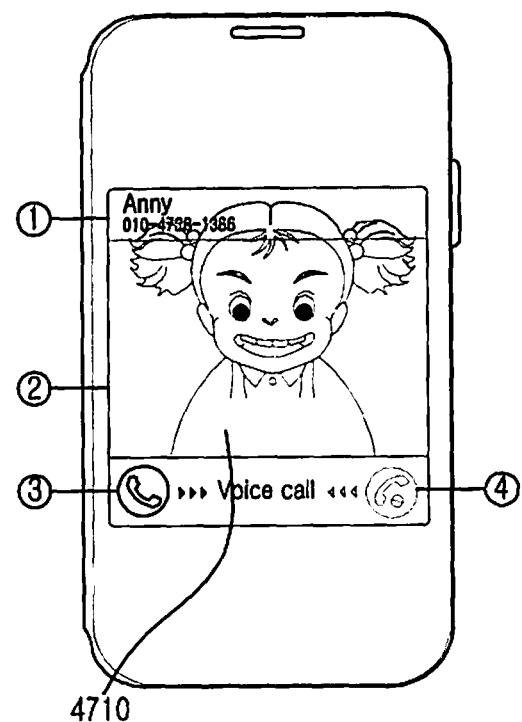
FIGS. 47A to 47B illustrate display modes of a call application according to an embodiment of the present invention.
Figure 47B:
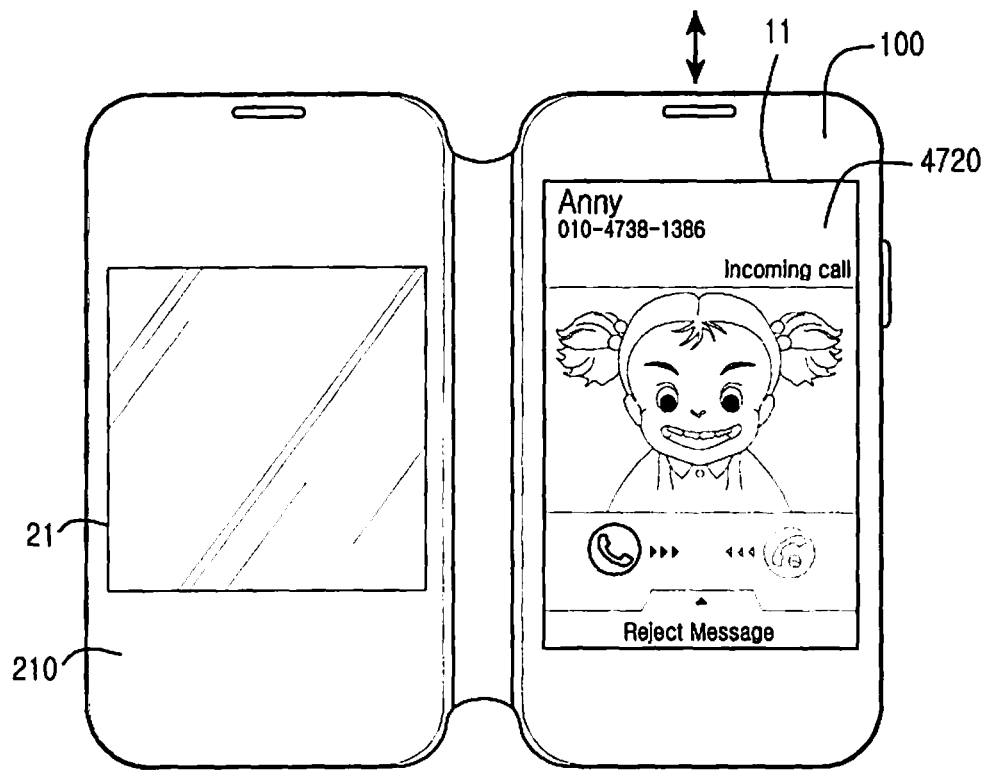

FIGS. 47A to 47B illustrate display modes of a call application according to an embodiment of the present invention.

Referring to FIG. 47A, the electronic device 100 activates the call application in response to a call reception in a closing state of the first cover portion 210, and performs a reduced display mode 4710 of the activated call application. The reduced display mode 4710 of the call application displays a call-related image interface to a display area corresponding to the window 21 of the first cover portion 210. The reduced display mode 4710 of the call application displays caller information (i.e., a name, a phone number, etc.) ①, a view ②, a phone reception button ③, or a phone cancel button ④. The reduced display mode 4710 of the call application displays a caller-related photo through the view ②. The reduced display mode 4710 of the call application connects a call in response to a user's touch gesture for moving the phone reception button ③ to the right. The reduced display mode 4710 of the call application ends the call in response to a user's touch gesture for moving the phone cancel button ④ to the left. Referring to FIG. 47B, the electronic device 100 performs an enlarged display mode 4720 of the call application in response to an opening of the first cover portion 210. The enlarged display mode 4720 of the call application displays an image interface including an object and function more extended than the reduced display mode 4710.

Figure 48:
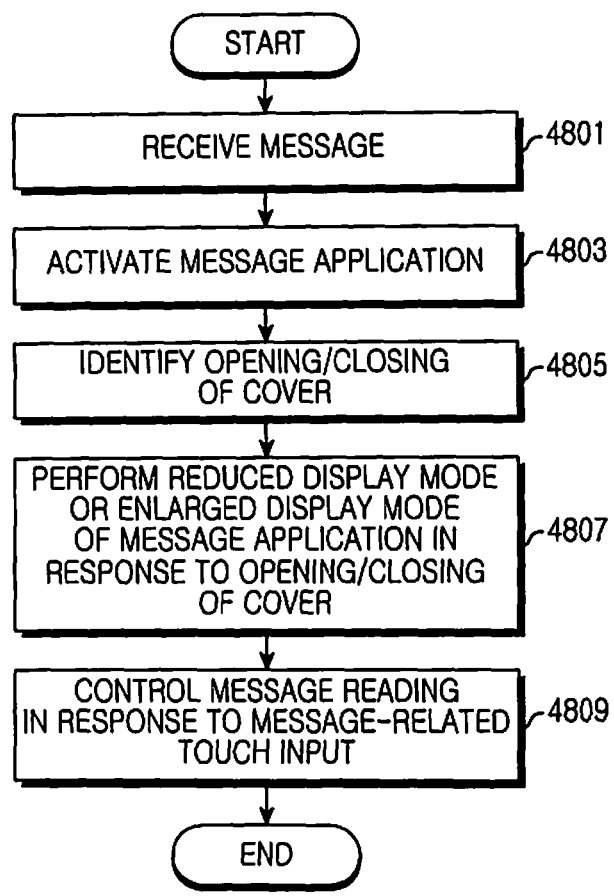
FIG. 48 is a flowchart illustrating a process of displaying a message application according to various embodiments of the present invention.

FIG. 48 is a flowchart illustrating a process of displaying a message application according to various embodiments of the present invention.

Referring to FIG. 48, in step 4801, the processor 710 (e.g., the application launcher module 1510) detects a message reception. In step 4803, the processor 710 (e.g., the application launcher module 1510) activates the message application. In step 4805, the processor 710 (e.g., the cover opening/closing identification module 1520) identifies an opening/closing of the first cover portion 210. In step 4807, the processor 710 (e.g., the display module 1540) performs a reduced display mode or enlarged display mode of the message application in response to the opening/closing of the first cover portion 210. In step 4809, the processor 710 (e.g., the touch input processing module 1550) controls a message reading in response to a message-related touch input.

Figure 49:
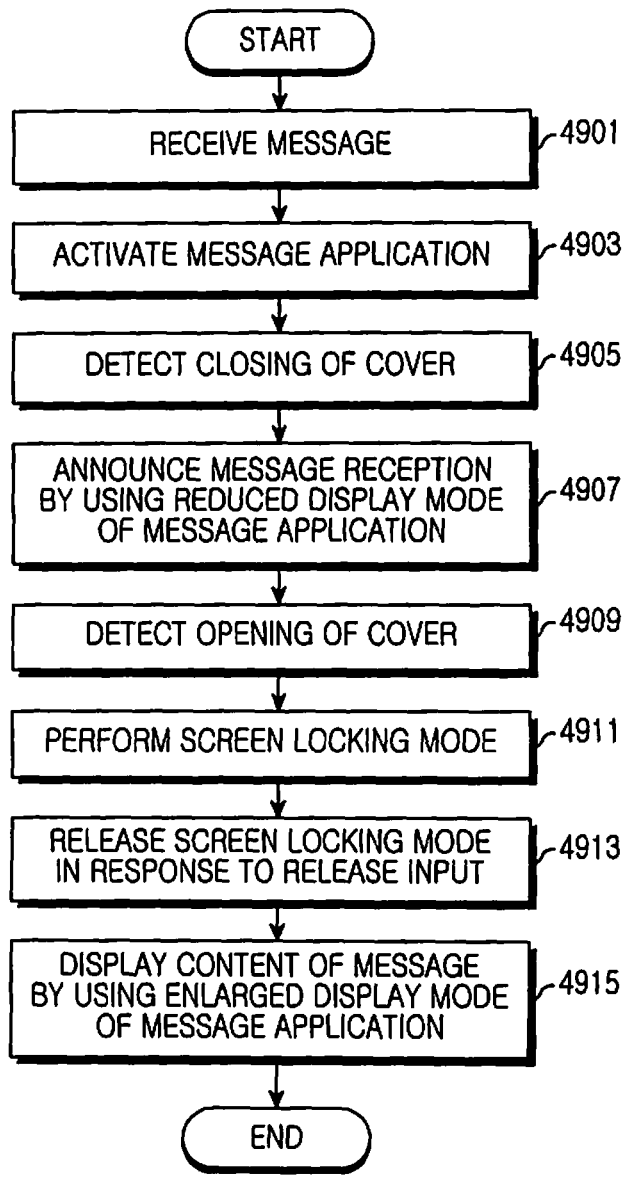
FIG. 49 is a flowchart illustrating a process of displaying a message application according to various embodiments of the present invention.

FIG. 49 is a flowchart illustrating a process of displaying a message application according to various embodiments of the present invention.

Referring to FIG. 49, in step 4901, the processor 710 (e.g., the application launcher module 1510) detects a message reception. In step 4903, the processor 710 (e.g., the application launcher module 1510) activates the message application. In step 4905, the processor 710 (e.g., the cover opening/closing identification module 1520) detects a closing of the first cover portion 210. In step 4907, the processor 710 (e.g., the display module 1540) announces a message reception by using a reduced display mode of the message application. In step 4909, the processor 710 (e.g., the cover opening/closing identification module 1520) detects an opening of the first cover portion 210. In step 4911, the processor 710 (e.g., the display module 1540) performs a touch screen locking mode. In step 4913, the processor 710 (e.g., the touch input processing module 1550) releases the screen locking mode in response to a release input. In step 4915, the processor 710 (e.g., the display module 1540) displays a content of a message by using an enlarged display mode of the message application.

FIGS. 50A to 50D illustrate display modes of a message application according to an embodiment of the present invention.

Figure 50:
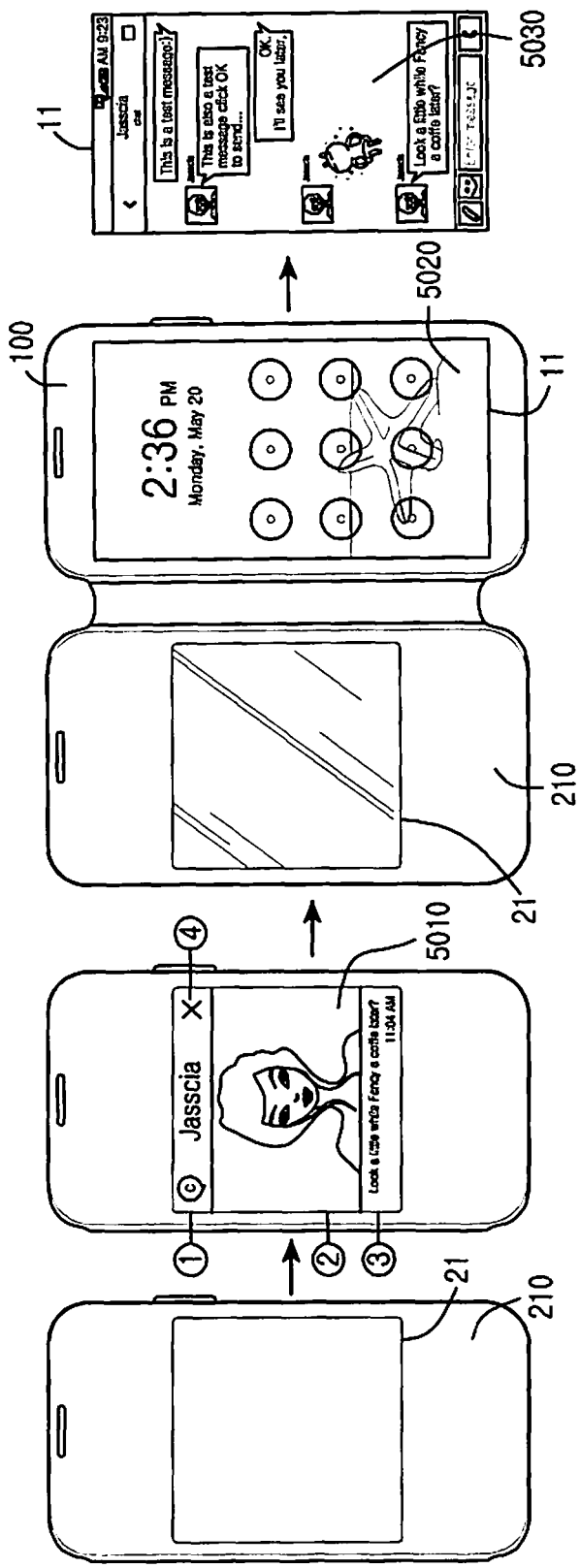
FIGS. 50A to 50D illustrate display modes of a message application according to an embodiment of the present invention.

Referring to FIG. 50A, the electronic device 100 deactivates the touch screen 11 in a closing state of the first cover portion 210. Referring to FIG. 50B, the electronic device 100 activates the message application in response to a message reception in the closing state of the first cover portion 210, and performs a reduced display mode 5010 of the activated message application. The reduced display mode 5010 of the message application displays an image interface to a display area corresponding to the window 21 of the first cover portion 210. The reduced display mode 5010 of the message application displays an image interface including a caller ①, a caller photo ②, a message content ③, an end button ④, etc. The reduced display mode 5010 of the message application deactivates the message application in response to a selection of the end button ④ by a user. Referring to FIG. 50C, the electronic device 100 performs a screen locking mode 5020 in response to an opening of the first cover portion 210. The screen locking mode 5020 may be a touch pattern input mechanism as illustrated. The screen locking mode 5020 may be a password or pin number input mechanism. Referring to FIG. 50D, the screen locking mode 5020 is released in response to a release input, and an enlarged display mode 5030 of the message application is performed. The enlarged display mode 5030 of the message application displays the content of a reception message. The enlarged display mode 5030 of the message application displays an image interface through a full area of the touch screen 11. The enlarged display mode 5020 of the message application displays an image interface including an object and function more extended than the reduced display mode 5010.

Figure 51:
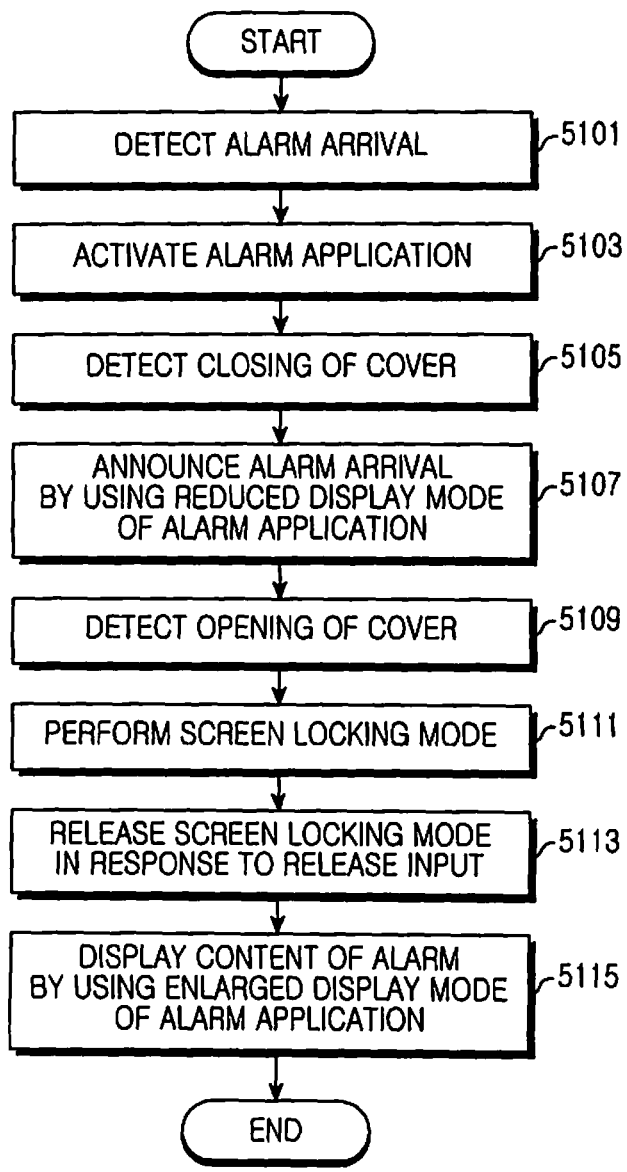
FIG. 51 is a flowchart illustrating a process of displaying an alarm application according to various embodiments of the present invention.

FIG. 51 is a flowchart illustrating a process of displaying an alarm application according to various embodiments of the present invention.

Referring to FIG. 51, in step 5101, the processor 710 (e.g., the application launcher module 1510) detects an alarm arrival. In step 5103, the processor 710 (e.g., the application launcher module 1510) activates the alarm application. In step 5105, the processor 710 (e.g., the cover opening/closing identification module 1520) detects a closing of the first cover portion 210. In step 5107, the processor 710 (e.g., the display module 1540) announces the alarm arrival by using a reduced display mode of the alarm application. In step 5109, the processor 710 (e.g., the cover opening/closing identification module 1520) detects an opening of the first cover portion 210. In step 5111, the processor 710 (e.g., the display module 1540) performs a screen locking mode. In step 5113, the processor 710 (e.g., the touch input processing module 1550) releases the screen locking mode in response to a release input. In step 5115, the processor 710 (e.g., the display module 1540) displays a content of an alarm by using an enlarged display mode of the alarm application.

FIGS. 52A to 52D illustrate display modes of an alarm application according to an embodiment of the present invention.

Figure 52:
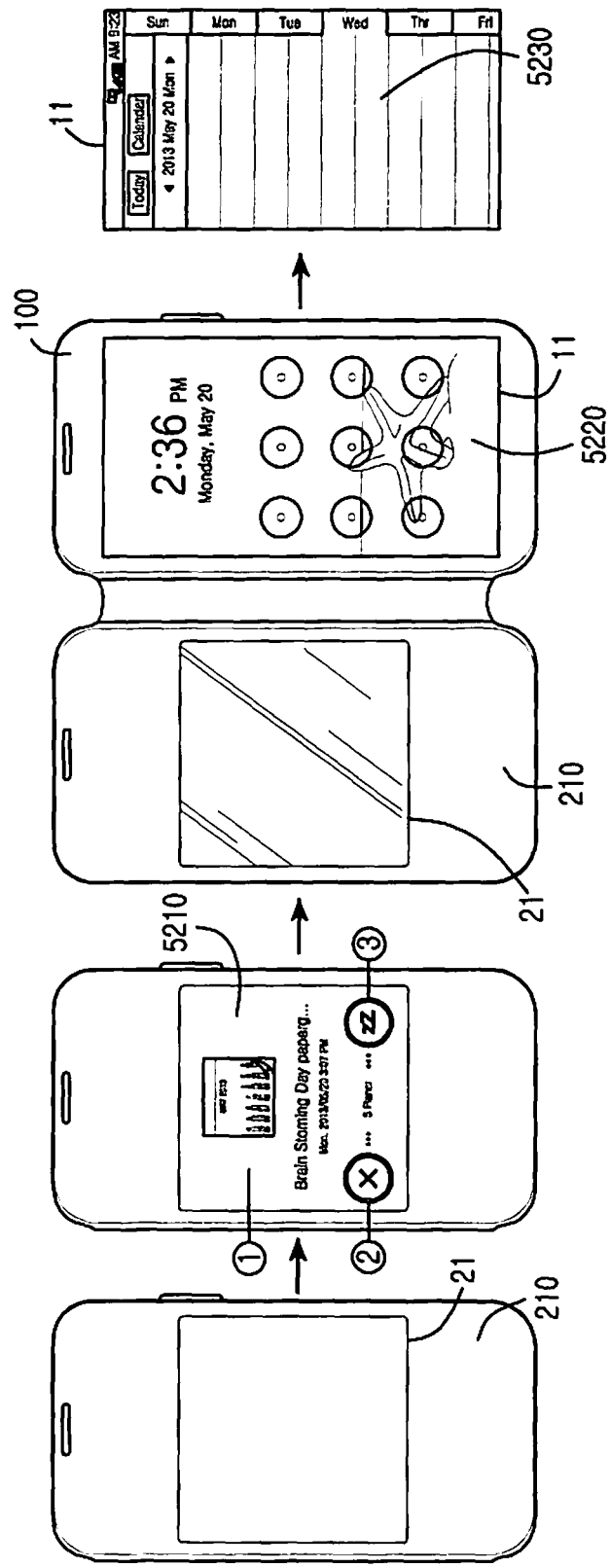
FIGS. 52A to 52D illustrate display modes of an alarm application according to an embodiment of the present invention.

Referring to FIG. 52A, the electronic device 100 deactivates the touch screen 11 in a closing state of the first cover portion 210. Referring to FIG. 52B, the electronic device 100 activates the alarm application in response to an alarm arrival in a closing state of the first cover portion 210, and performs a reduced display mode 5210 of the activated alarm application. The reduced display mode 5210 of the alarm application displays an image interface to a display area corresponding to the window 21 of the cover 210. The reduced display mode 5210 of the alarm application includes alarm information (e.g., content, a date, a time, etc.) ①, an end button ②, or a standby button ③. The reduced display mode 5210 of the alarm application deactivates the alarm application in response to a user's touch gesture for moving the end button ② to the right, and deactivates the touch screen 11. The reduced display mode 5210 of the alarm application allows an alarm to be on standby in response to a user's touch gesture for moving the standby button ③ to the left. Referring to FIG. 52C, the electronic device 100 performs a screen locking mode 5220 in response to an opening of the cover 210. Referring to FIG. 52D, the screen locking mode 5220 is released in response to a release input, and performs an enlarged display mode 5230 of the alarm application. The enlarged display mode 5230 of the alarm application displays a content of an alarm.

Figure 53:
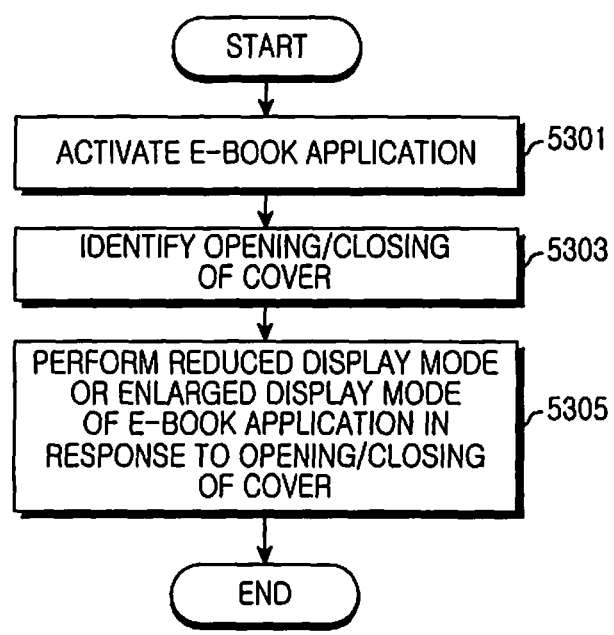
FIG. 53 is a flowchart illustrating a process of displaying an e-book application according to various embodiments of the present invention.

FIG. 53 is a flowchart illustrating a process of displaying an e-book application according to various embodiments of the present invention.

Referring to FIG. 53, in step 5301, the processor 710 (e.g., the application launcher module 1510) activates the e-book application. In step 5303, the processor 710 (e.g., the cover opening/closing identification module 1520) identifies an opening/closing of the first cover portion 210. In step 5305, the processor 710 (e.g., the display module 1540) performs a reduced display mode or enlarged display mode of the e-book application in response to the opening/closing of the first cover portion 210. The reduced display mode of the e-book application displays an e-book related image interface to a display area corresponding to the window 21 of the first cover portion 210. The enlarged display mode of the e-book application displays the e-book related image interface to a full area of the touch screen 11.

Figure 54B:
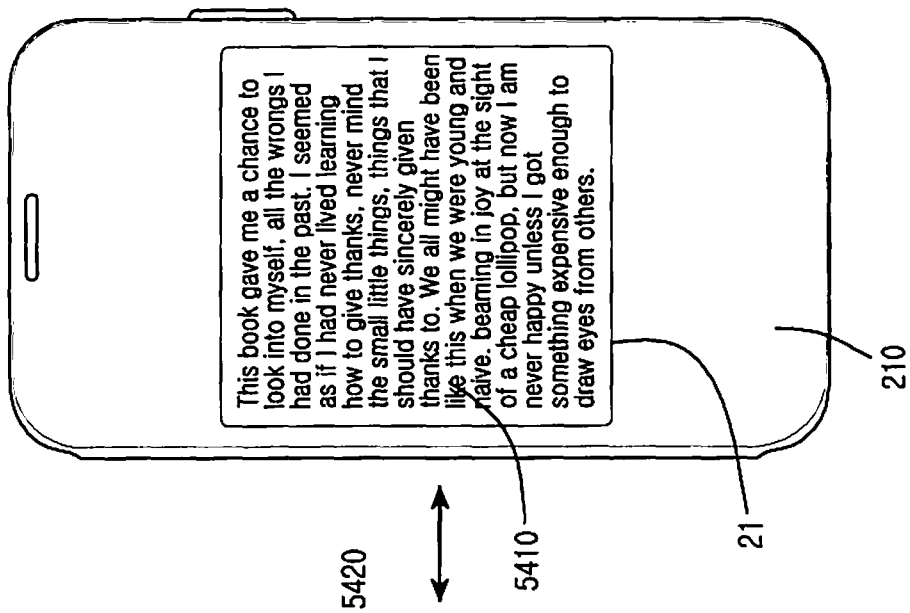
FIGS. 54A to 54B illustrate display modes of an e-book application according to an embodiment of the present invention.
Figure 54A:
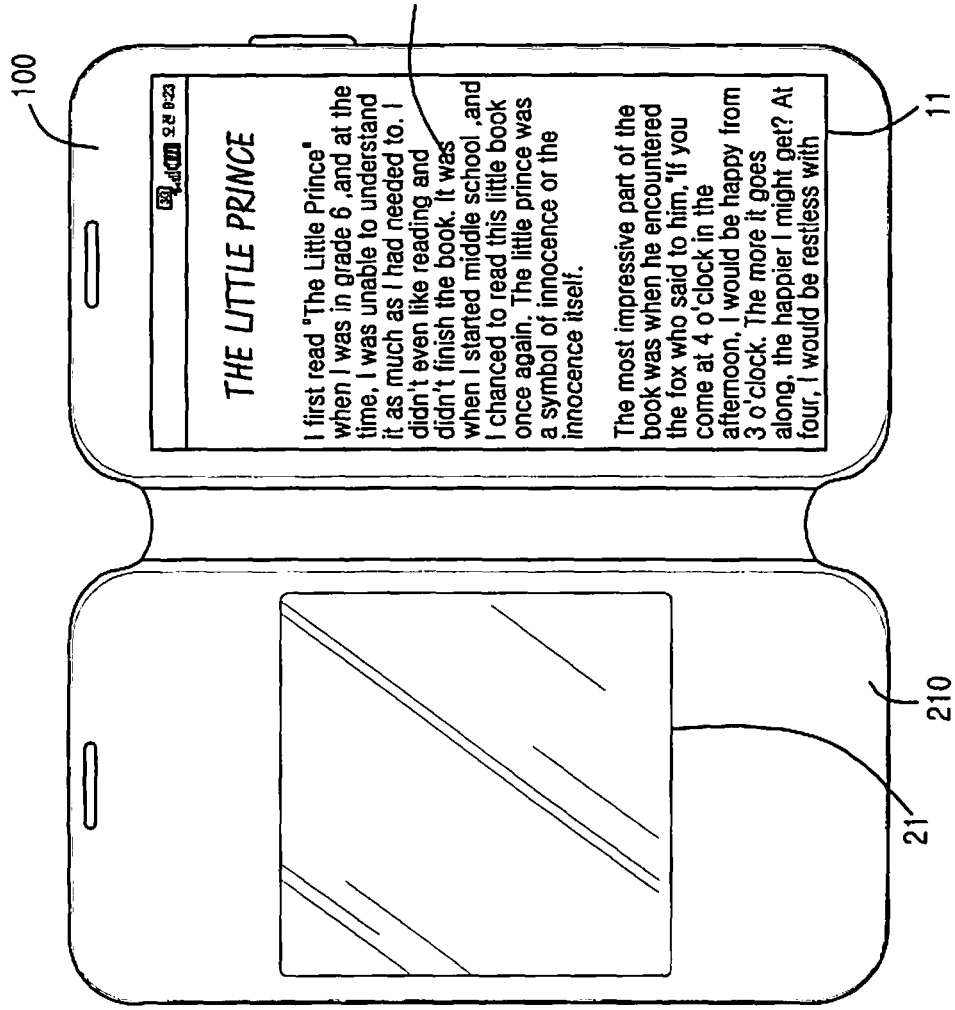

FIGS. 54A to 54B illustrate display modes of an e-book application according to an embodiment of the present invention.

Referring to FIG. 54A, the electronic device 100 performs an enlarged display mode 5420 of an activated e-book application in response to an opening of the first cover portion 210. Referring to FIG. 54B, the electronic device 100 performs a reduced display mode 5410 of the activated e-book application in response to a closing of the first cover portion 210. The enlarged display mode 5420 and reduced display mode 5410 of the e-book application control (e.g., enlarge, reduce, scroll, etc.) a display in response to a user's touch gesture.

Figure 55:
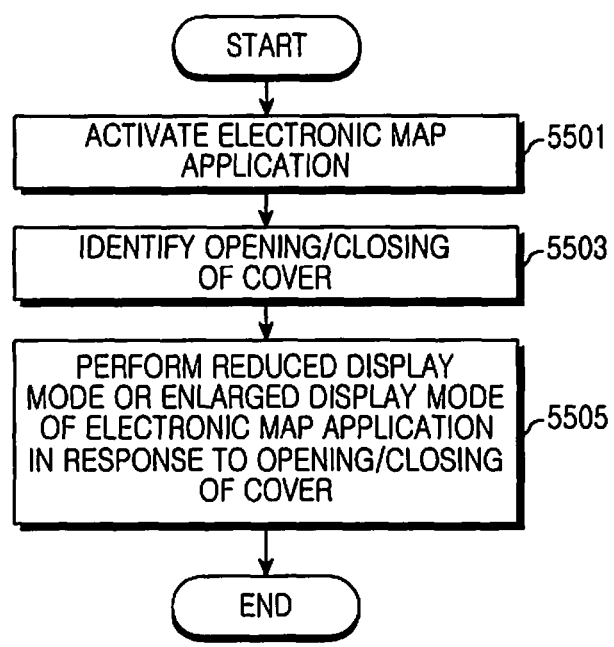
FIG. 55 is a flowchart illustrating a process of displaying an electronic map application according to various embodiments of the present invention.

FIG. 55 is a flowchart illustrating a process of displaying an electronic map application according to various embodiments of the present invention.

Referring to FIG. 55, in step 5501, the processor 710 (e.g., the application launcher module 1510) activates the electronic map application. In step 5501, the processor 710 (e.g., the cover opening/closing identification module 1520) identifies an opening/closing of the first cover portion 210. In step 5505, the processor 710 (e.g., the display module 1540) performs a reduced display mode or enlarged display mode of the electronic map application in response to the opening/closing of the first cover portion 210. The reduced display mode of the electronic map application displays an electronic map related image interface to a display area corresponding to the window 21 of the first cover portion 210. The enlarged display mode of the electronic map application displays the electronic map related image interface to a full area of the touch screen 11.

Figure 56:
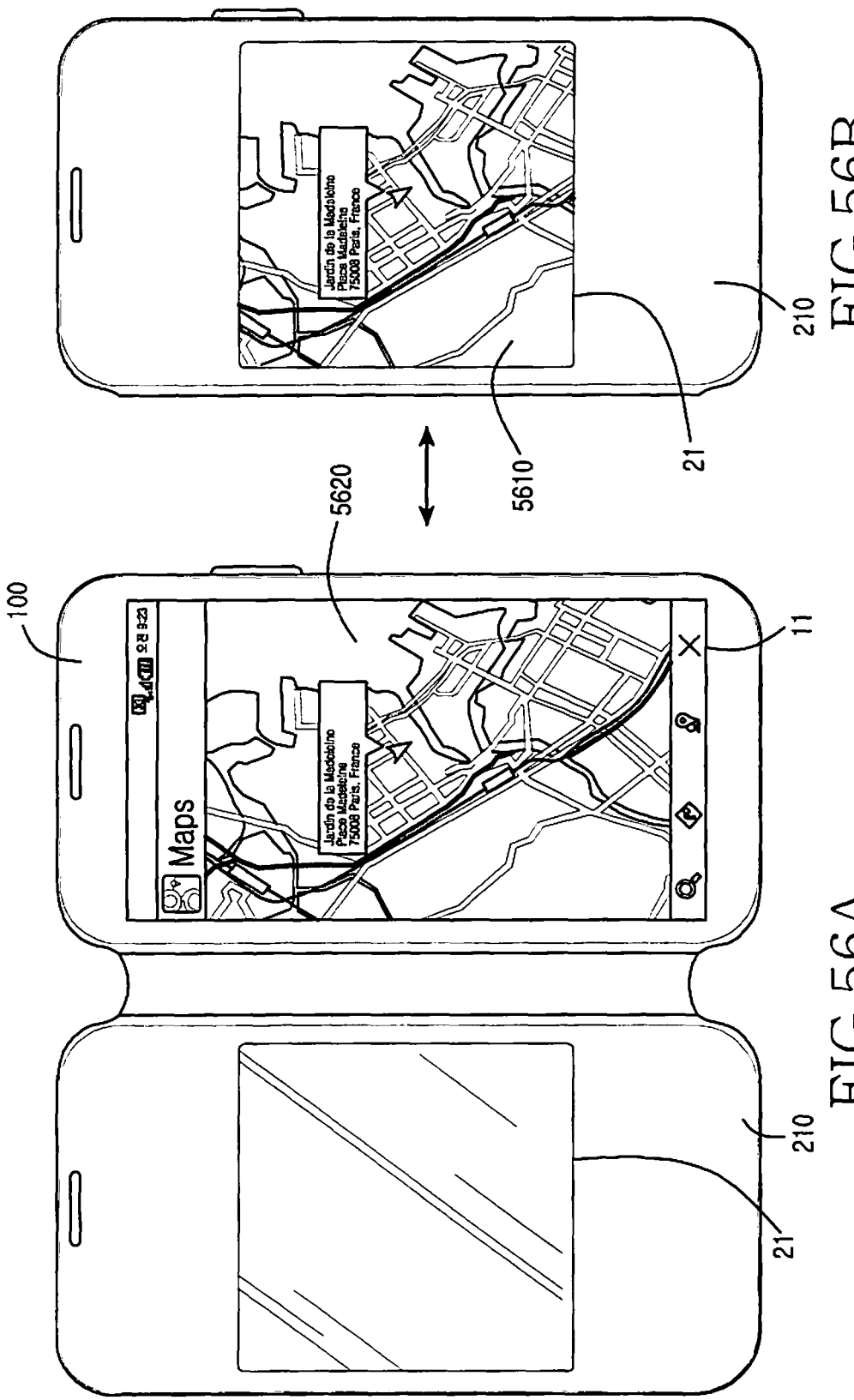
FIGS. 56A to 56B illustrate display modes of an electronic map application according to an embodiment of the present invention.

FIGS. 56A to 56B illustrate display modes of an electronic map application according to an embodiment of the present invention.

Referring to FIG. 56A, the electronic device 100 performs an enlarged display mode 5620 of an activated electronic map application in response to an opening of the first cover portion 210. Referring to FIG. 56B, the electronic device 100 performs a reduced display mode 5610 of an activated electronic map application in response to a closing of the first cover portion 210. The enlarged display mode 5620 and reduced display mode 5610 of the electronic map application control (e.g., enlarge, reduce, scroll, etc.) a display in response to a user's touch gesture.

Figure 57:
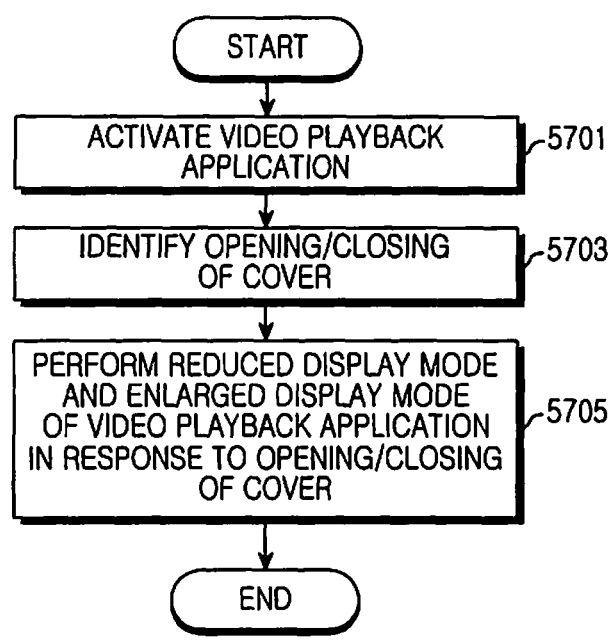
FIG. 57 is a flowchart illustrating a process of displaying a video playback application according to various embodiments of the present invention.

FIG. 57 is a flowchart illustrating a process of displaying a video playback application according to various embodiments of the present invention.

Referring to FIG. 57, in step 5701, the processor 710 (e.g., the application launcher module 1510) activates the video playback application. In step 5703, the processor 710 (e.g., the cover opening/closing identification module 1502) identifies an opening/closing of the cover 210. In step 5705, the processor 710 (e.g., the display mode 1540) performs a reduced display mode and enlarged display mode of the video playback application in response to the opening/closing of the first cover portion 210. The reduced display mode of the video playback application displays a video playback related image interface to a display area corresponding to the window 21 of the first cover portion 210.

The enlarged display mode of the video playback application displays the video playback related image interface to an overall area of the touch screen 11.

FIGS. 58A to 58B illustrate display modes of a video playback application according to an embodiment of the present invention.

Referring to FIG. 58A, the electronic device 100 performs an enlarged display mode 5820 of an activated video playback application in response to an opening of the first cover portion 210. Referring to FIG. 58B, the electronic device 100 performs a reduced display mode 5810 of the activated video playback application in response to a closing of the first cover portion 210. The enlarged display mode 5820 and reduced display mode 5810 of the video playback application control (e.g., play back, stop, pause, enlarge, reduce, etc.) a display in response to a user's touch gesture.

Since an electronic device displays an image interface through a display area corresponding to a window of a cover in a closing state of the cover and performs a specific function in response to a touch input for the image interface, a user controls the electronic device without having to open the cover.

Methods based on the embodiments disclosed in the claims and/or specification of the present invention may be implemented in hardware, software, or a combination of both.

When implemented in software, computer readable recording medium for storing one or more programs (i.e., software modules) may be provided. The one or more programs stored in the computer readable recording medium are configured for execution performed by one or more processors in the electronic device. The one or more programs include instructions for allowing the electronic device to execute the methods based on the embodiments disclosed in the claims and/or specification of the present invention.

The program (i.e., the software module or software) may be stored in a random access memory, a non-volatile memory including a flash memory, a Read Only Memory (ROM), an Electrically Erasable Programmable Read Only Memory (EEPROM), a magnetic disc storage device, a Compact Disc-ROM (CD-ROM), Digital Versatile Discs (DVDs) or other forms of optical storage devices, and a magnetic cassette. Alternatively, the program may be stored in a memory configured in combination of all or some of these storage media. In addition, the configured memory may be plural in number.

While the present invention has been shown and described with reference to embodiments thereof, it will be understood by those skilled in the art that various changes in form and details may be made therein without departing from the spirit and scope of the present invention as defined by the appended claims.

What is claimed is:

1. A method in an electronic device, the method comprising:
    displaying a content of an application on a first area of a touch screen in a first state in which the electronic device is not covered by a cover including a window;
    detecting that the electronic device is covered by the cover while the content is displayed; and
    in response to detecting that the electronic device is covered by the cover, displaying a first portion of the content of the application on a second area of the touch screen in a second state in which the electronic device is covered by the cover, wherein the second area is smaller than the first area,
    wherein a size and a position of the second area within which the first portion of the content is displayed in the second state corresponds to a size and a position of the window of the cover, respectively,
    wherein the size and the position of the second area are set based on information on the cover,
    wherein the first portion of the content is displayed in the first state and the second state, and a second portion of the content is displayed in the first state and is not displayed in the second state, and
    wherein the first portion of the content includes a first object and a second object overlapping each other.

2. The method of claim 1, wherein the size of the window of the cover is equal to the size of the second area within which the first portion of the content is displayed in the second state.

3. The method of claim 1, wherein displaying the content comprises displaying the content in response to an input.

4. The method of claim 1, further comprising:
    detecting whether the application is a camera application;
    acquiring an image from a camera; and
    displaying the image.

5. The method of claim 1, further comprising:
    detecting whether the application is a notice application;
    displaying a notice item; and
    in response to a selection of the notice item, displaying a content of the selected notice item.

6. The method of claim 5, wherein the notice item includes at least one of a message, a mail, an alarm, a wakeup call, or a schedule.

7. The method of claim 1, further comprising:
    detecting whether the application is a call application; and
    connecting an incoming call or ending the incoming call in response to a touch input.

8. The method of claim 1, further comprising:
    displaying a lock screen if the second state is changed to the first state;
    releasing a locked screen in response to a release input; and
    displaying the content of the application.

9. The method of claim 1, further comprises detecting an occurrence of at least one event in the second state.

10. The method of claim 9, wherein the at least one event includes at least one of a call reception, a message reception, a specific time arrival, or a stylus detachment.

11. The method of claim 1, further comprises:
    displaying a default image interface in the second state; and
    displaying an application in response to at least one touch input with respect to the default image interface in the second state.

12. The method of claim 11, wherein the at least one touch input with respect to the default image interface includes a flicking gesture or an icon selection.

13. The method of claim 1, further comprising:
    detecting a type of the cover; and
    changing a display of the first portion of the content according to the type of the cover.

14. An electronic device comprising:
    a touch screen;
    at least one sensor arranged to detect an opening or closing of a cover including a window;
    at least one processor; and
    a memory arranged to store information related to a plurality of applications which are driven by the at least one processor;

wherein the at least one processor is configured to:

control the touch screen to display a content of an application on a first area of the touch screen in a first state in which the electronic device is not covered by the cover;

detect that the electronic device is covered by the cover while the content is displayed; and in response to detecting that the electronic device is covered by the cover, control the touch screen to display a first portion of the content of the application a second area of the touch screen in a second state in which the electronic device is covered by the cover, wherein the second area is smaller than the first area, wherein a size and a position of the second area within which the first portion of the content is displayed in the second state corresponds to a size and a position of the window of the cover, respectively, wherein the size and the position of the second area are set based on information on the cover, wherein the first portion of the content is displayed in the first state and the second state, and a second portion of the content is displayed in the first state and is not displayed in the second state, and wherein the first portion of the content includes a first object and a second object overlapping each other.

15. The electronic device of claim 14, wherein the size of the window of the cover is equal to the size of the second area within which the first portion of the content is displayed in the second state.

16. The electronic device of claim 14, wherein the at least one processor is further configured to control the touch screen to display the content in response to an input.

17. The electronic device of claim 14, wherein the at least one processor is further configured to detect an occurrence of at least one of a call reception, a message reception, a specific time arrival, or a stylus detachment.

18. The electronic device of claim 14, further comprising a camera, wherein the at least one processor is further configured to:
 detect whether the application is a camera application,
 acquire an image from a camera, and
 control the touch screen to display the image.

19. The electronic device of claim 14,
 wherein the cover has an ID chip module having unique state information, and
 wherein the at least one processor is further configured to:
 detect a type of the cover on the basis of the unique state information of the ID chip module of the cover, and
 change a display of the first portion of the content according to the type of the cover.

* * * * *